(12) United States Patent
Apte et al.

(10) Patent No.: US 11,354,284 B2
(45) Date of Patent: Jun. 7, 2022

(54) SYSTEM AND METHOD FOR MIGRATION OF A LEGACY DATASTORE

(71) Applicant: ATOS SYNTEL, INC., Troy, MI (US)

(72) Inventors: Abhijit Anil Apte, Pune (IN); Harikrishnan Sivadasan Nair, Mumbai (IN); Akhila Chapalgaonkar, Pune (IN); Sudhir Vyankatesh Karhadkar, Mumbai (IN)

(73) Assignee: ATOS FRANCE, Bezons (FR)

( * ) Notice: Subject to any disclaimer, the term of this patent is extended or adjusted under 35 U.S.C. 154(b) by 132 days.

(21) Appl. No.: 16/900,290

(22) Filed: Jun. 12, 2020

(65) Prior Publication Data
US 2020/0394164 A1    Dec. 17, 2020

Related U.S. Application Data

(60) Provisional application No. 62/861,794, filed on Jun. 14, 2019.

(51) Int. Cl.
*G06F 16/21*       (2019.01)
*G06F 16/28*       (2019.01)
*G06F 16/22*       (2019.01)
*G06F 16/2455*     (2019.01)
*G06F 16/2453*     (2019.01)

(52) U.S. Cl.
CPC ........ *G06F 16/214* (2019.01); *G06F 16/2282* (2019.01); *G06F 16/24532* (2019.01); *G06F 16/24552* (2019.01); *G06F 16/284* (2019.01)

(58) Field of Classification Search
CPC ...... G06F 8/51; G06F 16/2452; G06F 16/258; G06F 8/447
USPC .......................................... 707/609
See application file for complete search history.

(56) References Cited

U.S. PATENT DOCUMENTS

| | | | | |
|---|---|---|---|---|
| 6,999,930 B1* | 2/2006 | Roberts | ................. | G10L 15/193 |
| | | | | 379/88.01 |
| 2006/0059253 A1* | 3/2006 | Goodman | ............... | G06Q 10/06 |
| | | | | 709/223 |
| 2012/0254258 A1* | 10/2012 | Gao | ......................... | G06F 16/21 |
| | | | | 707/803 |
| 2015/0242194 A1* | 8/2015 | Vargas | ....................... | G06F 8/51 |
| | | | | 717/137 |
| 2017/0206245 A1* | 7/2017 | Zhang | ................... | G06F 16/213 |
| 2018/0218044 A1* | 8/2018 | Wong | ................. | G06F 16/24554 |

* cited by examiner

*Primary Examiner* — Hung T Vy
(74) *Attorney, Agent, or Firm* — Arc IP Law, PC; Joseph J. Mayo

(57) ABSTRACT

System and method for migration of a legacy datastore include converting legacy datastore information from the legacy datastore to a target database system information. The target database system information belongs to a target database management system. A legacy datastore call is mapped to a data manipulation language (DML) statement. The legacy datastore call requests the legacy datastore information. Scripting language for the target database management system is generated using the DML statement.

38 Claims, 25 Drawing Sheets

IMS DB Structure

SYN_EMP

| | SYN_EMPNO | SYN_ENAME | SYN_DESIGNATION | SYN_MANAGER | SYN_SALARY |
|---|---|---|---|---|---|
| 🔑 Primary Key | 10001 | Jacob | Manager | Harry | 40000 |
| | 10002 | Jack | Consultant | Noah | 50000 |
| | 10003 | Charlie | Manager | George | 60000 |

SYSTEM AND METHOD FOR MIGRATION OF A LEGACY DATASTORE

PRIORITY APPLICATION

This non-provisional application claims the benefit of priority of U.S. Provisional Patent Application No. 62/861,794, filed on Jun. 14, 2019, which is hereby incorporated herein by reference in its entirety.

FIELD OF INVENTION

Embodiments of the present invention are generally directed to a system and a method for migration of a legacy datastore.

BACKGROUND

Legacy datastores (for instance, an information management system database ("IMS DB"), an integrated database management system ("IDMS"), ADABAS (an acronym for adaptable database system) by SOFTWARE AG, a virtual storage access method ("VSAM") and other legacy datastores) are very complex and difficult to maintain or expand for the future needs. Legacy datastores can be difficult to integrate with new systems because of non-extensibility, incompatibility and less openness of the underlying hardware and software of legacy systems. In today's marketplace, businesses must have the ability to rapidly change their information technology ("IT") systems, and therefore modern technologies are needed to provide the necessary agility. It is difficult to achieve agility using a legacy datastore. It is very difficult to find trained programmers with knowledge on legacy datastores, as well.

Now, the legacy datastores mentioned above are discussed in further detail.

An IMS DB, as shown in FIG. 1, is a legacy datastore in which individual entity types are implemented as segments in a hierarchical structure. Segment is the smallest amount of data that can be transferred by a single IMS DB operation. The hierarchical structure is based on the relationship between segments and the access paths that are required by the applications.

A single segment can have multiple child segments, but only one physical parent segment. However, there can be multiple logical parents/logical child relations in IMS DB. The segment with no physical parent segment (e.g., the one at the top) is called a root segment.

All the parent/child occurrences for a given root segment are grouped together in a data language/interface or a data language/one ("DL/I") database record. The collection of all these database records is a DL/I database.

The maximum number of different segment types is 255 per hierarchical data structure. A maximum of 15 segment levels can be defined in a hierarchical data structure. There is no restriction on the number of occurrences of each segment type, except as imposed by physical access method limits.

IMS DBs are defined in a database definition ("DBD"). A DBD contains at least the following information: database name, access methods, segment names, parent/child relationship, key field names, search field names, length and location.

An IMS DB uses a DL/I, which serves as the interface language that programmers use for accessing the database in an application program.

An IDMS is a network database management system. An IDMS database is a collection of records or files of different types and having relationships between them. Records are stored in pages and accessed on hashed keys or a relationship. Indexes provide direct and ordered access based on key values, and indexes are stored on pages. Records are mapped and pre-formatted into "areas." Areas are each a contiguous sequence of pages and are mapped onto physical datasets, records or files. A predetermined or set number of files make up an IDMS database. An IDMS database definition is available to an application through schema and subschema.

ADABAS is a high-performance, multi-threaded database management system. An ADABAS database consists of three system files: data storage, associator and work storage.

The data storage of an ADABAS database is a storage unit of user data. The user data can be stored in a compressed form.

The associator of an ADABAS database contains internal storage information that manages the data for the entire database, for instance, a field definition table, an address converter to find a block containing a record, an inverted list used for querying the database, and other similar information.

The work storage contains temporary work files, for instance, a scratch file for intermediate results and logging. The work storage also contains a command log, a protection log, and/or a recovery log. The command log records information from the control block of each ADABAS command that is issued. The command log provides an audit trail that can be used for debugging and for monitoring the use of resources. The protection log contains before-images and after-images of records and other elements that generated in response to changes are made to the database. The recovery log records additional information that ADABAS Recovery Aid uses to construct a recovery job stream.

An VSAM is an access method that organizes and maintains data in VSAM files. An VSAM arranges records by index key, relative record number and/or relative byte address. The following are the four types of VSAM data sets: key-sequenced data set ("KSDS"), entry-sequence data set ("ESDS"), relative record data set (RRDS), and linear data set (LDS).

In a KSDS, each record has one or more key fields and a record can be retrieved or inserted using a key value. A KSDS provides random access to data.

An ESDS stores records in sequential order, and allows records to be accessed sequentially or randomly using a relative byte address ("RBA").

A RRDS allows retrieval of records using a relative record number ("RRN"), which is the sequence number relative to the first record.

A LDS is a byte-stream dataset. Data can be accessed as byte-addressable strings in virtual storage.

SUMMARY

In an embodiment, a system configured for migration of a legacy datastore includes a processor; and a memory storing a program for execution by the processor, the program including instructions for converting legacy datastore information from a legacy datastore to target database system information, wherein the target database system information belongs to a target database management system, mapping a legacy datastore call to at least one data manipulation language (DML) statement, the legacy datastore call requesting the legacy datastore information, and generating scripting language for the target database management system using the at least one DML statement.

In an embodiment, the target database management system is a NoSQL database.

In an embodiment, the target database management system is a relational database management system (RDBMS) or a non-relational database management system.

In an embodiment, the converting of the legacy datastore information includes, reading the legacy datastore information from a corresponding copybook from the at least one legacy datastore, wherein the legacy datastore information is to be migrated from a source database management system, and if a predetermined number of OCCURS clauses are present in the legacy datastore information, (i) creating a separate child table and (ii) adding a primary key of a parent table as a foreign key in the separate child table and a sequence number field as a key in the separate child table.

In an embodiment, the converting of the legacy datastore information includes, reading the legacy datastore information from a corresponding copybook from the at least one legacy datastore, wherein the legacy datastore information is to be migrated from a source database management system, and if a predetermined number of REDEFINES clauses are present in the legacy datastore information, (i) creating a separate child table for each of the REDEFINES clauses and (ii) adding a primary key of a parent table as a foreign key in the separate child table and a sequence number field as a key in the separate child table of each of the REDEFINES clauses.

In an embodiment, the mapping of the legacy datastore call to the at least one DML statement includes retrieving a qualified segment search argument (SSA), wherein the qualified SSA specifies the legacy datastore information, and wherein the legacy datastore information is a segment definition, and constructing at least one DML statement from command code in the qualified SSA.

In an embodiment, the generating of the scripting language for the target database management system using the at least one DML statement includes replacing the legacy datastore call with the at least one DML statement, and the at least one DML statement is equivalent to the legacy datastore call.

In an embodiment, the generating of the scripting language for the target database management system using the at least one DML statement further includes identifying steps containing legacy datastore program by reading at least one source statement in source scripting language, replacing steps containing the legacy datastore program with skeleton data.

In an embodiment, the generating of the scripting language for the target database management system using the at least one DML statement includes identifying legacy datastore programming steps in a scripting language (SL) procedure, and replacing the identified legacy datastore programming steps with a terminal monitor program in the SL procedure.

In an embodiment, the converting of the legacy datastore information includes, reading the legacy datastore information from a corresponding copybook from the at least one legacy datastore, wherein the legacy datastore information is to be migrated from a source database management system, and if a predetermined number of multi-value (MU) or periodic group (PE) clauses are present in the legacy datastore information, (i) creating a separate child table and (ii) adding a primary key of a parent table as a foreign key in the separate child table and a sequence number field as a key in the separate child table.

In an embodiment, the mapping of the legacy datastore call to the at least one DML statement includes reading an integrated data dictionary (IDD) file to obtain a record structure, and identifying at least one selected from relationships, keys and data types based on the record structure.

In an embodiment, the generating of the scripting language for the target database management system using the at least one DML statement includes generating a data extraction program that extracts the legacy datastore information from the legacy datastore, and the scripting language runs the data extraction program and uploads the legacy datastore information into the target database management system.

In an embodiment, the instructions further include at least one selected from storing in an in-memory database or using an in-memory data grid, using database parallel execution framework or parallel processing framework, and storing data in a cache.

In an embodiment, a method of migration of a legacy datastore includes converting legacy datastore information from the legacy datastore to target database system information, wherein the target database system information belongs to a target database management system, mapping a legacy datastore call to at least one data manipulation language (DML) statement, the legacy datastore call requesting the legacy datastore information, and generating scripting language for the target database management system using the at least one DML statement.

In an embodiment, the target database management system is a NoSQL database.

In an embodiment, the target database management system is a relational database management system (RDBMS) or a non-relational database management system.

In an embodiment, the converting of the legacy datastore information includes, reading the legacy datastore information from a corresponding copybook from the at least one legacy datastore, wherein the legacy datastore information is to be migrated from a source database management system, and if a predetermined number of OCCURS clauses are present in the legacy datastore information, (i) creating a separate child table and (ii) adding a primary key of a parent table as a foreign key in the separate child table and a sequence number field as a key in the separate child table.

In an embodiment, the converting of the legacy datastore information includes, reading the legacy datastore information from a corresponding copybook from the at least one legacy datastore, wherein the legacy datastore information is to be migrated from a source database management system, and if a predetermined number of REDEFINES clauses are present in the legacy datastore information, (i) creating a separate child table for each of the REDEFINES clauses and (ii) adding a primary key of a parent table as a foreign key in the separate child table and a sequence number field as a key in the separate child table of each of the REDEFINES clauses.

In an embodiment, the mapping of the legacy datastore call to the at least one DML statement includes retrieving a qualified segment search argument (SSA), wherein the qualified SSA specifies the legacy datastore information, and wherein the legacy datastore information is a segment definition, and constructing at least one DML statement from command code in the qualified SSA.

In an embodiment, the generating of the scripting language for the target database management system using the at least one DML statement includes replacing the legacy datastore call with the at least one DML statement, and the at least one DML statement is equivalent to the legacy datastore call.

In an embodiment, the generating of the scripting language for the target database management system using the at least one DML statement further includes identifying steps containing legacy datastore program by reading at least one source statement in source scripting language, replacing steps containing the legacy datastore program with skeleton data.

In an embodiment, the generating of the scripting language for the target database management system using the at least one DML statement includes identifying legacy datastore programming steps in a scripting language (SL) procedure, and replacing the identified legacy datastore programming steps with a terminal monitor program in the SL procedure.

In an embodiment, the converting of the legacy datastore information includes, reading the legacy datastore information from a corresponding copybook from the at least one legacy datastore, wherein the legacy datastore information is to be migrated from a source database management system, and if a predetermined number of multi-value (MU) or periodic group (PE) clauses are present in the legacy datastore information, (i) creating a separate child table and (ii) adding a primary key of a parent table as a foreign key in the separate child table and a sequence number field as a key in the separate child table.

In an embodiment, the mapping of the legacy datastore call to the at least one DML statement includes reading an integrated data dictionary (IDD) file to obtain a record structure, and identifying at least one selected from relationships, keys and data types based on the record structure.

In an embodiment, the generating of the scripting language for the target database management system using the at least one DML statement includes generating a data extraction program that extracts the legacy datastore information from the legacy datastore, and the scripting language runs the data extraction program and uploads the legacy datastore information into the target database management system.

In an embodiment, the instructions further include at least one selected from storing in an in-memory database or using an in-memory data grid, using database parallel execution framework or parallel processing framework, and storing data in a cache.

In an embodiment, a non-transitory computer readable medium having instructions embodied thereon that, when executed by a processor, cause the processor to perform operations including converting legacy datastore information from a legacy datastore to target database system information, wherein the target database system information belongs to a target database management system, mapping a legacy datastore call to at least one data manipulation language (DML) statement, the legacy datastore call requesting the legacy datastore information, and generating scripting language for the target database management system using the at least one DML statement.

In an embodiment, the target database management system is a NoSQL database.

In an embodiment, the target database management system is a relational database management system (RDBMS) or a non-relational database management system.

In an embodiment, the converting of the legacy datastore information includes, reading the legacy datastore information from a corresponding copybook from the at least one legacy datastore, wherein the legacy datastore information is to be migrated from a source database management system, and if a predetermined number of OCCURS clauses are present in the legacy datastore information, (i) creating a separate child table and (ii) adding a primary key of a parent table as a foreign key in the separate child table and a sequence number field as a key in the separate child table, and if a predetermined number of REDEFINES clauses are present in the legacy datastore information, (i) creating a separate child table for each of the REDEFINES clauses and (ii) adding a primary key of a parent table as a foreign key in the separate child table and a sequence number field as a key in the separate child table of each of the REDEFINES clauses.

In an embodiment, the mapping of the legacy datastore call to the at least one DML statement includes retrieving a qualified segment search argument (SSA), wherein the qualified SSA specifies the legacy datastore information, and wherein the legacy datastore information is a segment definition, and constructing the at least one DML statement from command code in the qualified SSA.

In an embodiment, the generating of the scripting language for the target database management system using the at least one DML statement includes replacing the legacy datastore call with the at least one DML statement, and the at least one DML statement is equivalent to the legacy datastore call.

In an embodiment, the generating of the scripting language for the target database management system using the at least one DML statement further includes identifying steps containing legacy datastore program by reading at least one source statement in source scripting language, replacing steps containing the legacy datastore program with skeleton data.

In an embodiment, the generating of the scripting language for the target database management system using the at least one DML statement includes identifying legacy datastore programming steps in a scripting language (SL) procedure, and replacing the identified legacy datastore programming steps with a terminal monitor program in the SL procedure.

In an embodiment, the converting of the legacy datastore information includes, reading the legacy datastore information from a corresponding copybook from the at least one legacy datastore, wherein the legacy datastore information is to be migrated from a source database management system, and if a predetermined number of multi-value (MU) or periodic group (PE) clauses are present in the legacy datastore information, (i) creating a separate child table and (ii) adding a primary key of a parent table as a foreign key in the separate child table and a sequence number field as a key in the separate child table.

In an embodiment, the mapping of the legacy datastore call to the at least one DML statement includes reading an integrated data dictionary (IDD) file to obtain a record structure, and identifying at least one selected from relationships, keys and data types based on the record structure.

In an embodiment, the generating of the scripting language for the target database management system using the at least one DML statement includes generating a data extraction program that extracts the legacy datastore information from the legacy datastore, and the scripting language runs the data extraction program and uploads the legacy datastore information into the target database management system.

In an embodiment, the instructions further include at least one selected from storing in an in-memory database or using an in-memory data grid, using database parallel execution framework or parallel processing framework, and storing data in a cache.

BRIEF DESCRIPTION OF THE DRAWINGS

Embodiments will be more clearly understood from the following detailed description taken in conjunction with the accompanying drawings. FIGS. 1-18B represent non-limiting, embodiments as described herein.

FIG. 1 is a diagram of an information management system database structure.

FIG. 3 is a flow diagram for the generation of a data migration program in accordance with an embodiment.

FIG. 4 is diagram of two-level hierarchy of an IMS database structure according to an embodiment.

FIG. 5 is a relational database structure according to an embodiment.

FIG. 6 is diagram of three-level hierarchy of an IMS database structure according to an embodiment.

FIG. 7 is a relational database structure according to an embodiment.

FIG. 8 is a process flow for normalization of OCCURS clauses in accordance with an embodiment.

FIG. 9 is a process flow for normalization of REDEFINES clauses in accordance with an embodiment.

FIG. 12 is a block diagram of an electronic device in accordance with an embodiment.

FIG. 14 is a relational database structure according to an embodiment.

FIG. 16 is a IDMS structure according to an embodiment.

FIG. 17 is RDBMS schema for a IDMS structure according to an embodiment.

FIG. 18B is a diagram of a system configured for conversion of ADABAS in a DB management system in accordance with an embodiment.

DETAILED DESCRIPTION

Embodiments of the present invention are generally directed to a system and a method for migration of a legacy datastore using a database management system ("MS") migration module.

"Legacy datastore," as used herein, refers to storage hardware and/or storage software that is functional, but is either outdated and/or unsupported.

According to embodiments, migration of a legacy datastore (for instance, an information management system database ("IMS DB"), an integrated database management system ("IDMS"), ADABAS (an acronym for adaptable database system), or a virtual storage access method ("VSAM")) to a target DB management system (for instance, a relational database management system ("RDBMS")) is performed by converting the legacy datastore into target DB schemas of the target DB management system. For instance, the IMS DB is converted into target relational DB schemas for the RDBMS. Next, the application programs of the legacy datastore are converted by mapping calls for the legacy datastore to data manipulation language (DML) (for instance, structured query language ("SQL") statements). Then, scripting language (for instance, job control language ("JCL")) is remediated such that, instead of calling IMS programs, programs accessing the target DB management system are called.

However, embodiments are not limited to migration of a legacy datastore to a RDBMS. For instance, embodiments apply to the migration of a legacy datastore to a non-relational SQL ("NoSQL") DB management system or Big-Data. A NoSQL DB management system provides a mechanism for storage and retrieval of data that is modeled in means other than the tabular relations used in relational databases. BigData provides a mechanism for processing, managing and analyzing large, complex datasets, which include non-structured and/or structured data.

Next, the conversion of an initial DB management system into target database schemas of a target DB management system will be described in further detail.

The database MS migration module according to embodiments of the present application can automatically convert segment definition(s) of an initial DB management system into target table definition(s) of a target DB management system. For instance, IMS segment definitions can be automatically converted into target RDBMS table definitions.

In an embodiment, the segment definition is a hierarchical data structure of containers, functions, and Boolean logic that is used to define the segment.

In an embodiment, the mapping of data type, and the setting of column size and primary/foreign keys are performed automatically.

Figure 1:
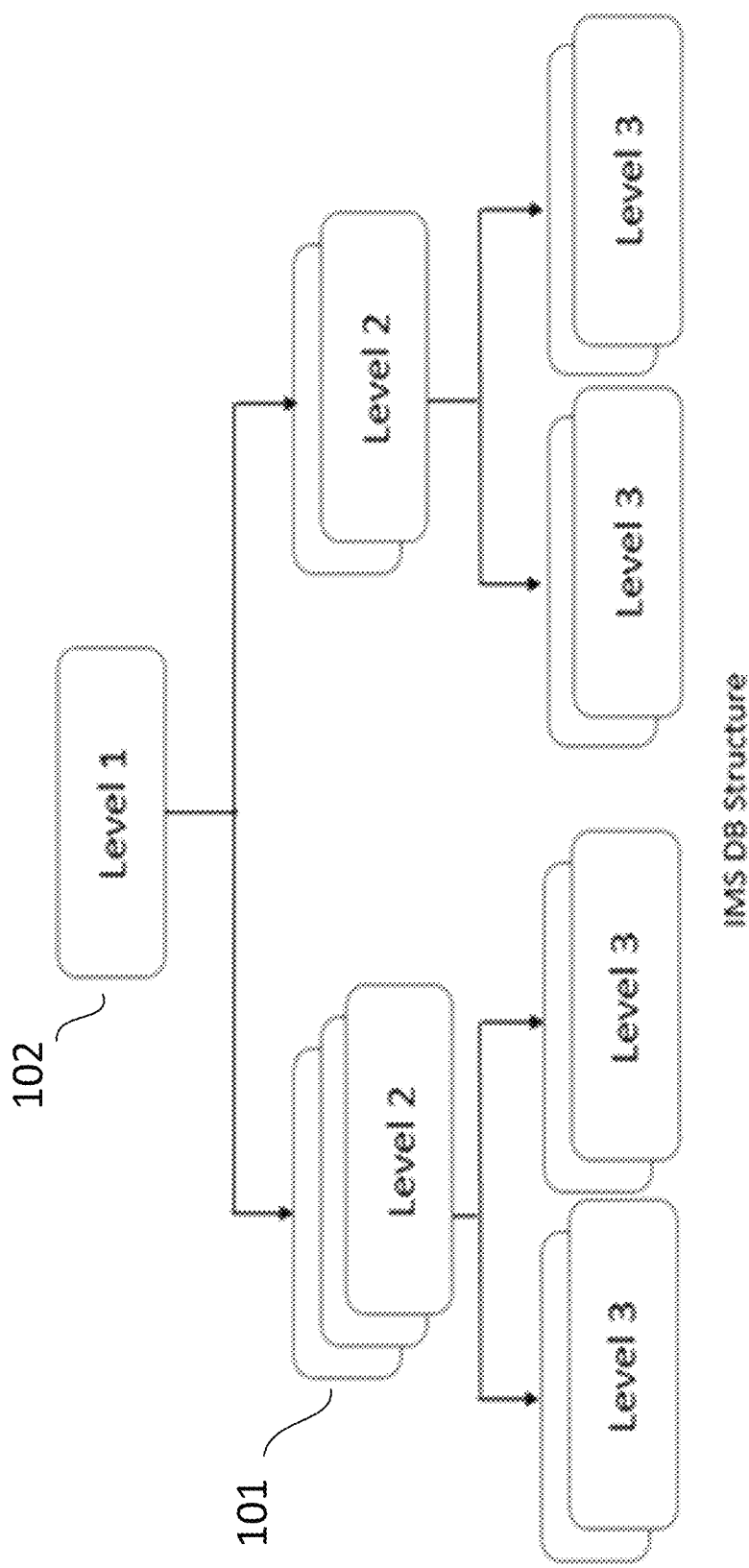
Figure 2A:
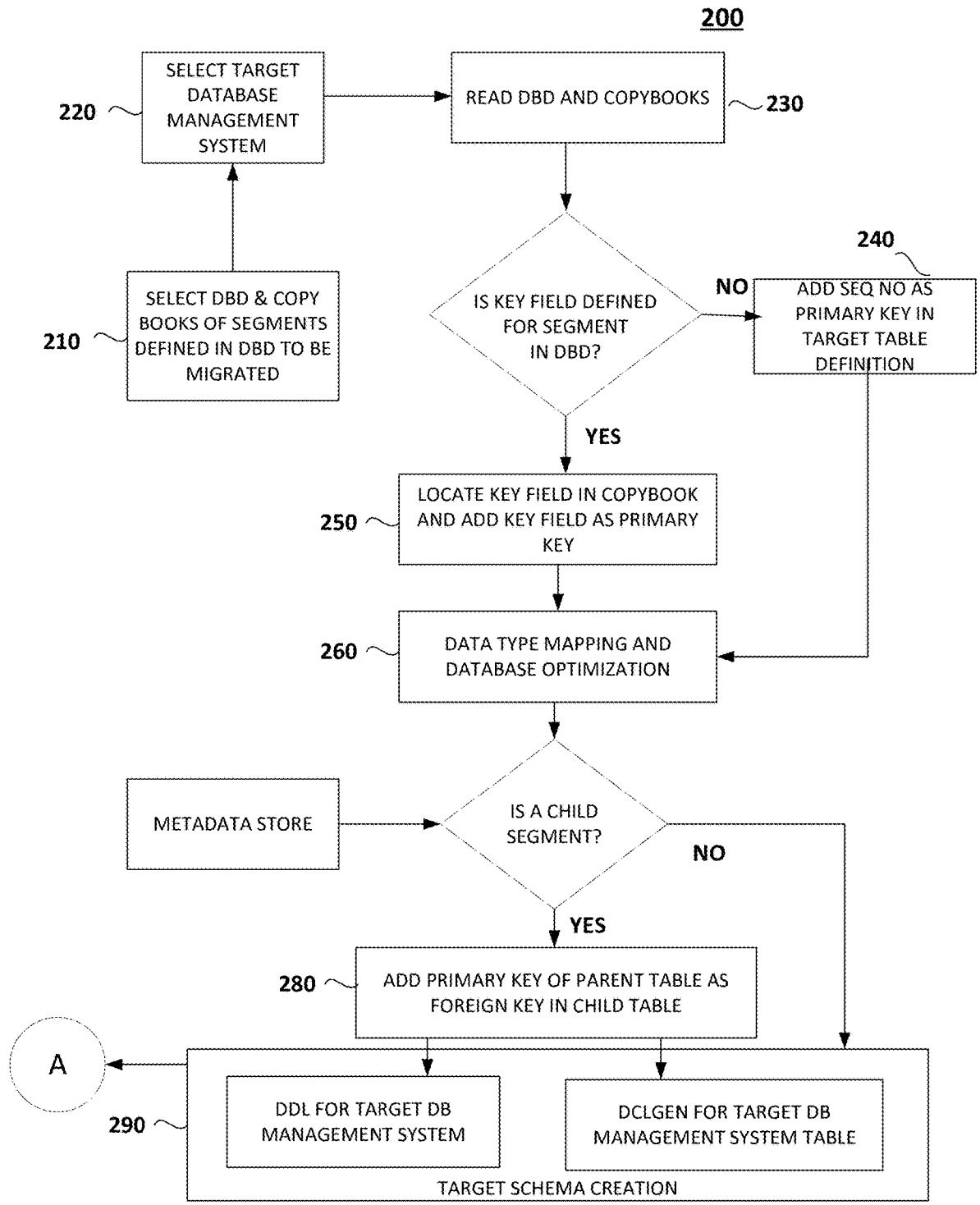
FIG. 2A is a flow diagram of IMS conversion in accordance with an embodiment.

FIG. 2A is a flow diagram of the creation of target DB schemas by converting segment definitions to table definitions in accordance with an embodiment.

Figure 2B:
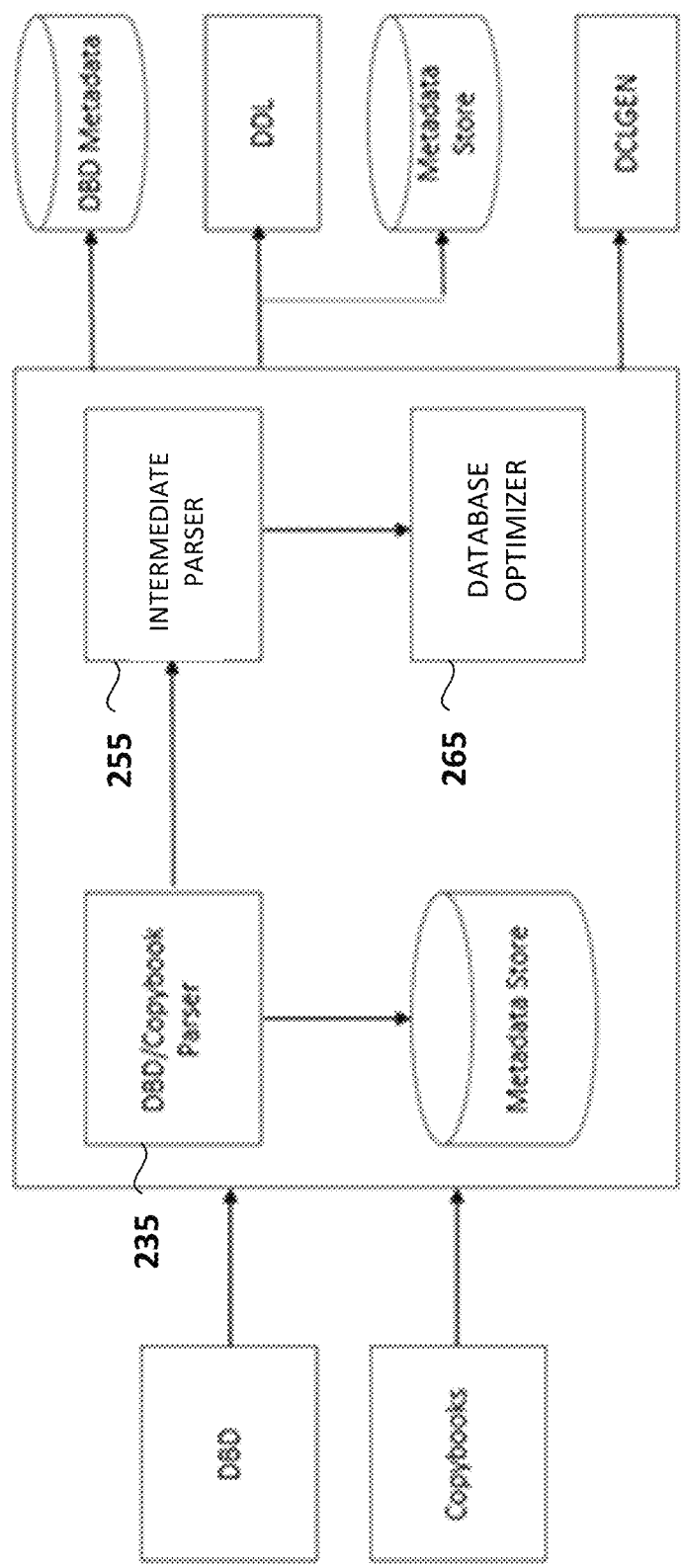
FIG. 2B is diagram of a system configured for conversion of IMS in a DB management system in accordance with an embodiment.

FIG. 2B is diagram of a system configured for creation of target DB schemas by converting segment definitions to table definitions in accordance with an embodiment.

Referring to FIGS. 2A and 2B, a user selects (i) database definition(s) ("DBD") and (ii) copy book(s) of all segments defined in the DBD to be migrated, at 210. Then, at 220, the user selects the target DB management system (e.g., DB2 developed by IBM, ORACLE RDMBS developed by the Oracle Corporation, or a similar DB management system).

A DBD/Copybook parser 235 in the database MS migration module reads segment names and parent/child relationships from the DBD file, and reads segment definition(s) from corresponding copy books, at 230.

If the key field is not defined for segments in the DBD, at 240, the database MS migration module adds a sequence number as primary key in the target table definition.

If the key field is defined for segments in the DBD, at 250, the key field is identified by locating the field having keyword SEQ in the segment definition as shown below.

SEGM NAME=SYNDEPT,BYTES=43,PARENT=0
      FIELD NAME=(DNO,SEQ,U),BYTES=3,START=1,
        TYPE=C

In an embodiment, after locating the key field in the segment definition, the system retrieves the symbolic name, starting position, and length of the key field. In above example, DNO is the symbolic name of the key field, the length of the key field is 3 bytes, and the key field starts from the first byte. The database MS migration module then locates the corresponding fields in the segment copybook, and maps the corresponding fields as primary key of the target DB management system table (e.g., the target RDBMS table).

As part of database optimization, separate child tables are created for segment copybooks having OCCURS clauses with a large array size or REDEFINES clauses with a greater number of elementary items to ensure that the database is normalized. The function of intermediate parser 255 shown in FIG. 2B is to carve out the structure of child tables from the segment copybook having REDEFINES or OCCURS clauses if normalization is required for target table.

At 260 in FIG. 2A, database optimizer 265 in the database MS migration module automatically performs the data type mapping and sets the column size. The user is given the option to change the target data type/column size, if required. The database MS migration module reads the source segment copybook, and maps the segment field data type to target database table column data type as shown in TABLES 1 and 2 discussed below. The database MS migration module checks the source field data type and field size, and maps to corresponding target database table column data type and column size. The mapping shown below in Tables 1 and 2 for DB2 and ORACLE RDBMS, respectively. However, the target DB management system can be any relational or non-relational DB management system.

In an embodiment, in order to map data, the database MS migration module reads a source segment copybook, and maps a segment field data type to a target database table column data type as shown below in TABLES 1 and 2. The database MS migration module checks the source field data type and field size, and maps to corresponding target database table column data type and column size. The mapping shown below in TABLES 1 and 2 are for DB2 and ORACLE RDBMS, respectively. However, as stated above, embodiments are not thereto, and the target DB management system can be any relational or non-relational DB management system.

TABLE 1

| Cobol Data type | Length of host variable | DB2 Data type |
| --- | --- | --- |
| PIC X(10) | 10 bytes | CHAR(10) or VARCHAR(10) |

TABLE 1-continued

| Cobol Data type | Length of host variable | DB2 Data type |
| --- | --- | --- |
| PIC 9(5) | 5 bytes | NUMERIC(5) |
| PIC 9(7)V99 | 9 bytes | NUMERIC(9, 2) |
| PIC S9(5)V9(2) | 7 bytes | NUMERIC(7, 2) |
| 9(01) to 9(04) COMP | 2 bytes | SMALLINT |
| 9(05) to 9(09) COMP | 4 bytes | INTEGER |
| S9(10) to S9(18)COMP | 8 bytes | BIGINT |
| USAGE IS COMP-1 | 4 bytes | REAL |
| USAGE IS COMP-2 | 8 bytes | DOUBLE |
| S9(9)V99 COMP-3 | 6 bytes | DECIMAL(11, 2) |
| S9(5) COMP-3 | 3 bytes | DECIMAL(5, 0) |

TABLE 2

| Cobol Data type | Length of host variable | Oracle Data type |
| --- | --- | --- |
| PIC X(10) | 10 bytes | CHAR(10) or VARCHAR2(10) |
| PIC 9(5) | 5 bytes | NUMBER(5) |
| PIC 9(7)V99 | 9 bytes | NUMBER(9, 2) |
| PIC S9(5)V9(2) | 7 bytes | NUMBER(7, 2) |
| 9(01) to 9(04) COMP | 2 bytes | NUMBER(5) |
| 9(05) to 9(09) COMP | 4 bytes | NUMBER(10) |
| S9(10) to S9(18)COMP | 8 bytes | NUMBER(19) |
| USAGE IS COMP-1 | 4 bytes | BINARY_FLOAT |
| USAGE IS COMP-2 | 8 bytes | BINARY_DOUBLE |
| S9(9)V99 COMP-3 | 6 bytes | NUMBER(11, 2) |
| S9(5) COMP-3 | 3 bytes | NUMBER(5,0) |

Referring back to FIG. 2A, if the segment is a child segment in the above sequence definition, the key of the parent segment will be added as foreign key in the target table for the child segment, at 280.

In an embodiment, the database MS migration module handles conversion of segments with an OCCURS clause in the copybook in a different way depending on the number of occurrences of the clause. If the OCCURS clause appears more than 5 times, a separate child table is created and the primary key of the parent table is added as foreign key in the child table along with sequence number field as key. If the OCCURS clause appears less than or equal to 5 times, a single character type column is defined to store all occurrences of array elements along with additional space for storing a delimiter.

The OCCURS clause is used to define a table/array in the COBOL language. All elements in the array have the data description. The array can be defined as single dimensional or two dimensional.

In an embodiment, a separate child table is created for segment copybooks having the OCCURS clause with a large array size to ensure that the database is normalized.

In an embodiment, the default cut-off value for creation of a separate table for the OCCURS clause is kept as 5, but the database MS migration module also gives the user the option to create or not to create separate table for the OCCURS clause according to the user's choice.

In another embodiment, the database MS migration module handles conversion of segments with REDEFINES clauses in the copybook in a different way. If there are multiple REDEFINES clauses of a large group item (with more than 5 elementary items), then separate child tables are created for each REDEFINES clause, and the primary key of the parent table is added as a foreign key in the child tables along with sequence number field as the key.

If the REDEFINES clause is done on less than 5 variables, separate columns are defined in the same table for each redefined variable.

According to an embodiment, the REDEFINES clause is used to define a storage area for data items with different data descriptions. If some of the data items are not used simultaneously, then the storage area can be used for other data items by redefining the storage area using the REDEFINES clause.

In an embodiment, a separate child table is created for segment copybooks having REDEFINES clauses with more number of elementary items to ensure that the database is normalized.

The default cut-off value for the creation of a separate table for REDEFINES clauses is kept as 5 according to an embodiment, but the database MS migration module also gives the user the option to create, or not to create separate table for REDEFINES clauses according to the user's choice.

At 290, target DB schemas of the target DB management system are created. In particular, each IMS segment mentioned in the DBD is converted to corresponding target DB management system tables (for instance, relational database tables), and declaration generators ("DCLGENs") of target tables are created.

Figure 3:
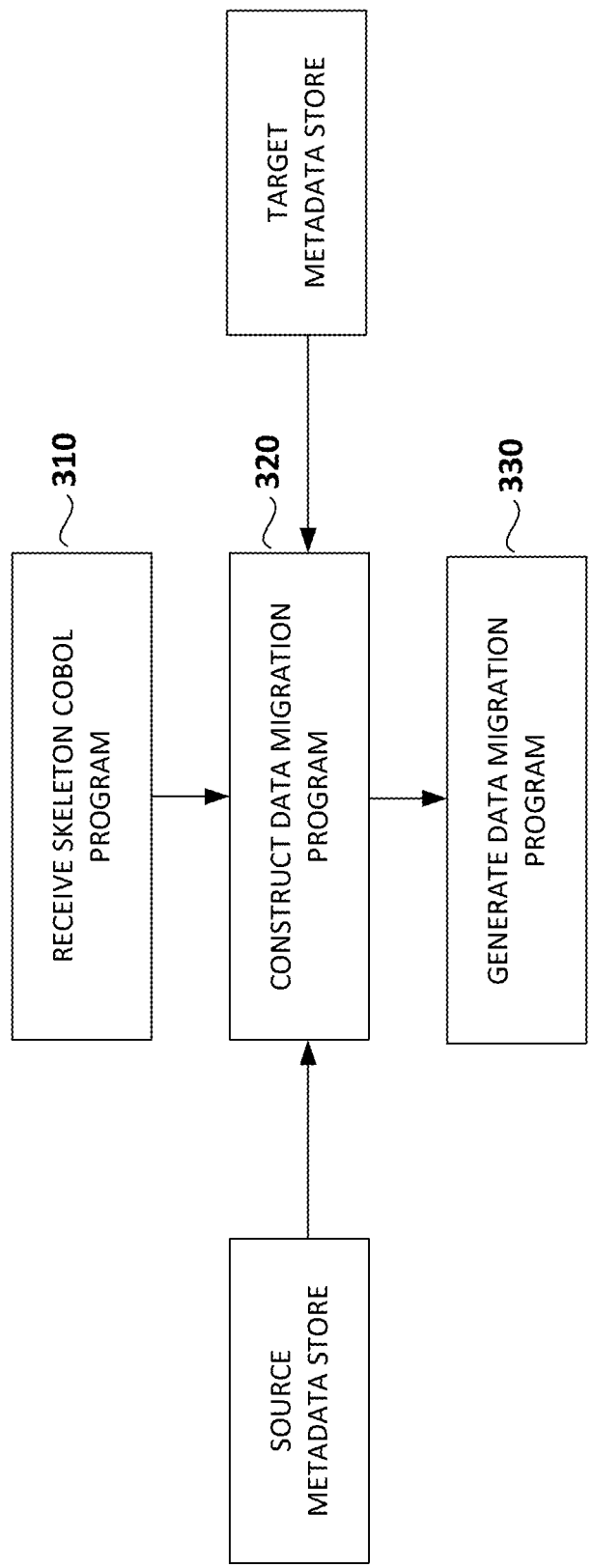

FIG. 3 is a flow diagram for the generation of a data migration program in accordance with an embodiment.

Referring to FIG. 3, the database MS migration module can receive a skeleton COBOL program at 310, and construct a data migration program at 340 using source metadata from a source metadata store and target metadata from a target metadata store.

In an embodiment, the database MS migration module has the ability to optimize the new RDBMS schema with integrity constraints. The database MS migration module adds constraints, such as, NOT NULL, UNIQUE, CHECK, PRIMARY KEY and FOREIGN KEY, or a similar constraint. The database MS migration module also has the facility for space trimming, data type casting, inserting default values, indexing, database normalization or a similar functionality.

The database MS migration module generates a final data migration program based on target schema and jobs that can run the data migration programs at 330.

The examples below are of two level hierarchy and three level hierarchy, respectively.

Example—Two-Level Hierarchy

Figure 4:
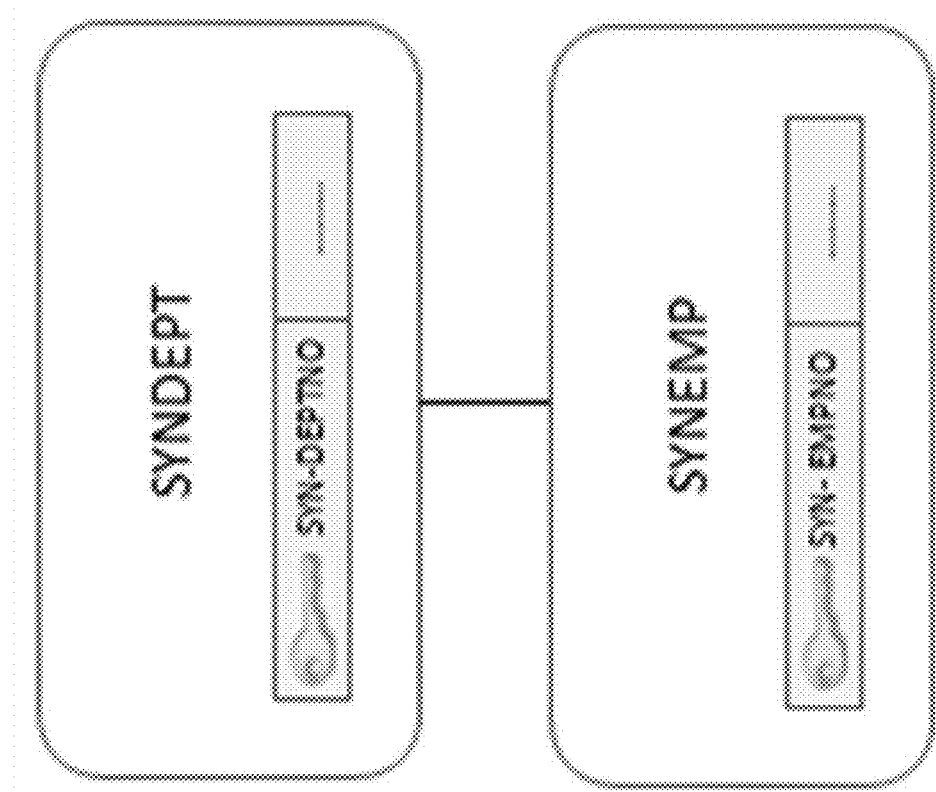

FIG. 4 is diagram of two-level hierarchy of an IMS database structure according to an embodiment.

Referring to FIG. 4, IMS database structure 400 contains segment SYNDEPT as the parent and SYNEMP as the child segment.

The DBD is a follows:
DBD NAME=SYNEMPDB,ACCESS=(HDAM,OSAM), RMNAME=(DFSHDC40,2,21000)
DATASET DD1=SYNEMPDD,DEVICE=3380, SIZE=8192,FRSPC=(0,0)
SEGM NAME=SYNDEPT,BYTES=43,PARENT=0
FIELD NAME=(DNO,SEQ,U),BYTES=3,START=1, TYPE=C
SEGM NAME=SYNEMP,BYTES=60,PARENT=DEPT
FIELD NAME=(ENO,SEQ,U),BYTES=5,START=1, TYPE=C The structure of the segments are as follows:
SYNDEPT

| Field Name | Bytes | Comments |
|---|---|---|
| SYN-DEPTNO | 3 | Key Field |
| SYN-DNAME | 20 | |
| SYN-LOC | 20 | |

SYNEMP

| Field Name | Bytes | Comments |
|---|---|---|
| SYN-EMPNO | 5 | Key Field |
| SYN-ENAME | 20 | |
| SYN-DESIGNATION | 20 | |
| SYN-MANAGER | 5 | |
| SYN-SALARY | 7 | |

Figure 5:
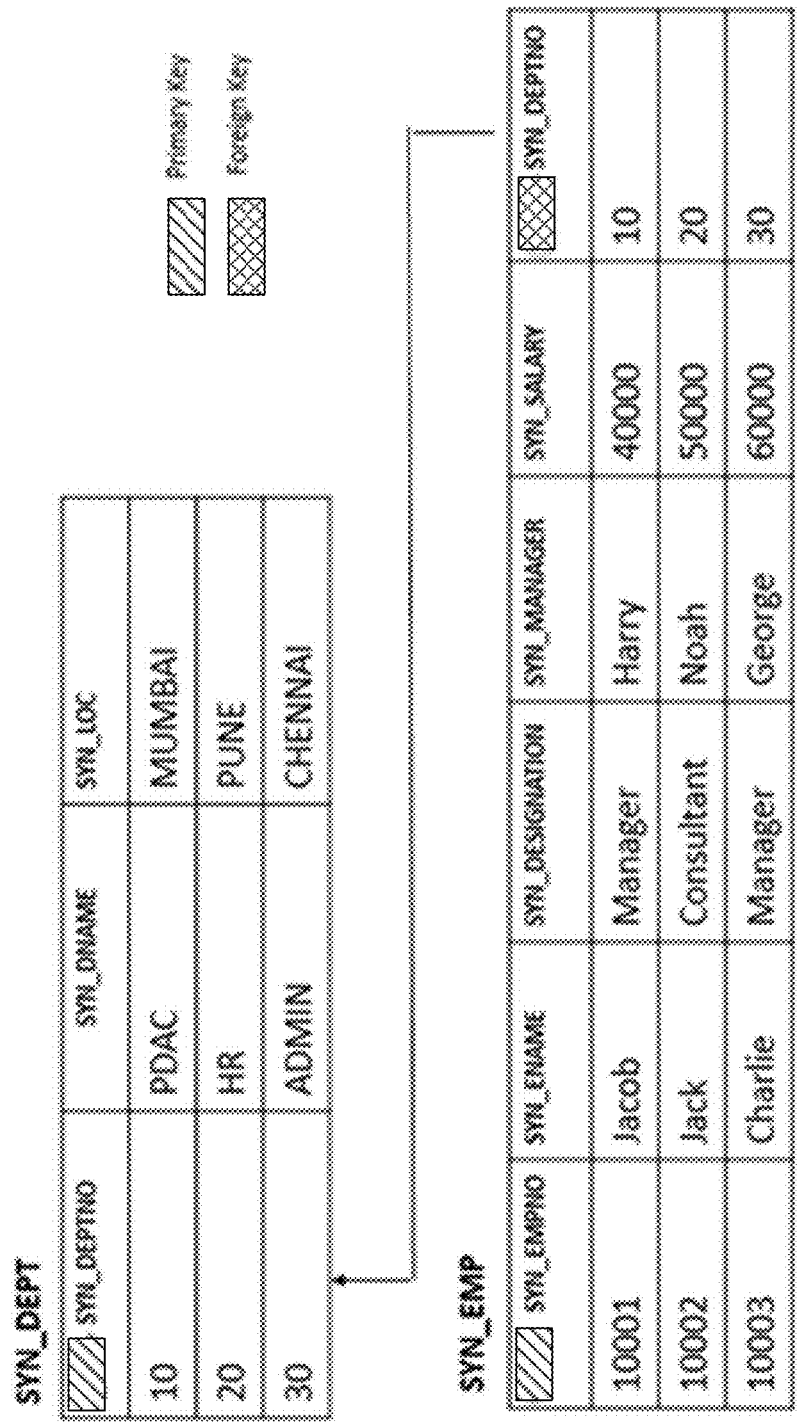

FIG. 5 is a relational database structure according to an embodiment.

Referring to FIG. 5, relational database structure 500 is created from the conversion of the IMS database structure 400 shown in FIG. 4.

Example—Three-Level Hierarchy

Figure 6:
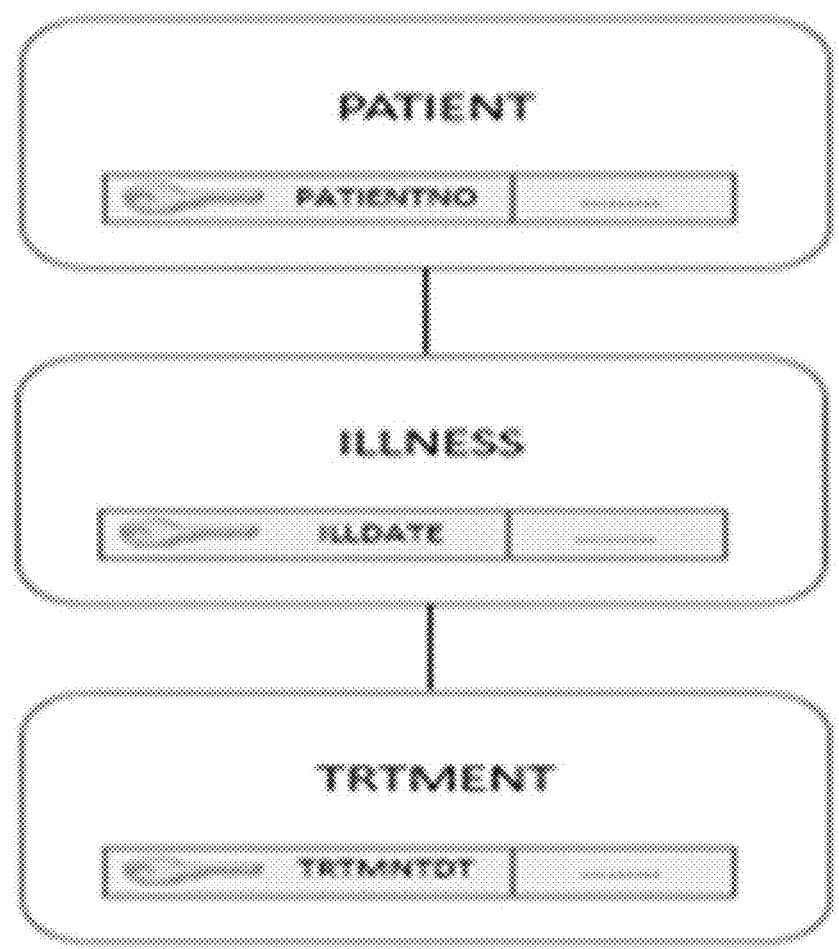

FIG. 6 is diagram of three-level hierarchy of an IMS database structure according to an embodiment.

Referring to FIG. 6, IMS database structure 600 contains segment PATIENT as the parent, segment ILLNESS is at the second level, and segment TREATMENT is at the third level.

The DBD is as follows:
DBD NAME=MEDICDB,ACCESS=(HDAM,OSAM), RMNAME=(DFSHDC40,2,21000)
DATASET DD1=MEDICHDB,DEVICE=3380, SIZE=8192,FRSPC=(0,0)
SEGM NAME=PATIENT,BYTES=60,PARENT=0
FIELD NAME=(PATNO,SEQ,U),BYTES=10,START=1
SEGM NAME=ILLNESS,BYTES=28, PARENT=PATIENT
FIELD NAME=(ILLDT,SEQ,U),BYTES=8,START=1
SEGM NAME=TRTMENT,BYTES=55, PARENT=ILLNESS
FIELD NAME=(TRTDT,SEQ,M),BYTES=8,START=11
The structure of the segments are as follows:
PATIENT

| Field Name | Bytes | Comments |
|---|---|---|
| PATIENTNO | 10 | Key Field |
| NAME | 20 | |
| ADDRESS | 30 | |

ILLNESS

| Field Name | Bytes | Comments |
|---|---|---|
| ILLDATE | 8 | Key Field |
| ILLNAME | 20 | |

TRTMENT

| Field Name | Bytes | Comments |
|---|---|---|
| SEQNO | 10 | |
| TRTMNTDT | 10 | |
| MEDICINE | 20 | |
| QUANTITY | 5 | |
| DOCTOR | 10 | |

Figure 7:
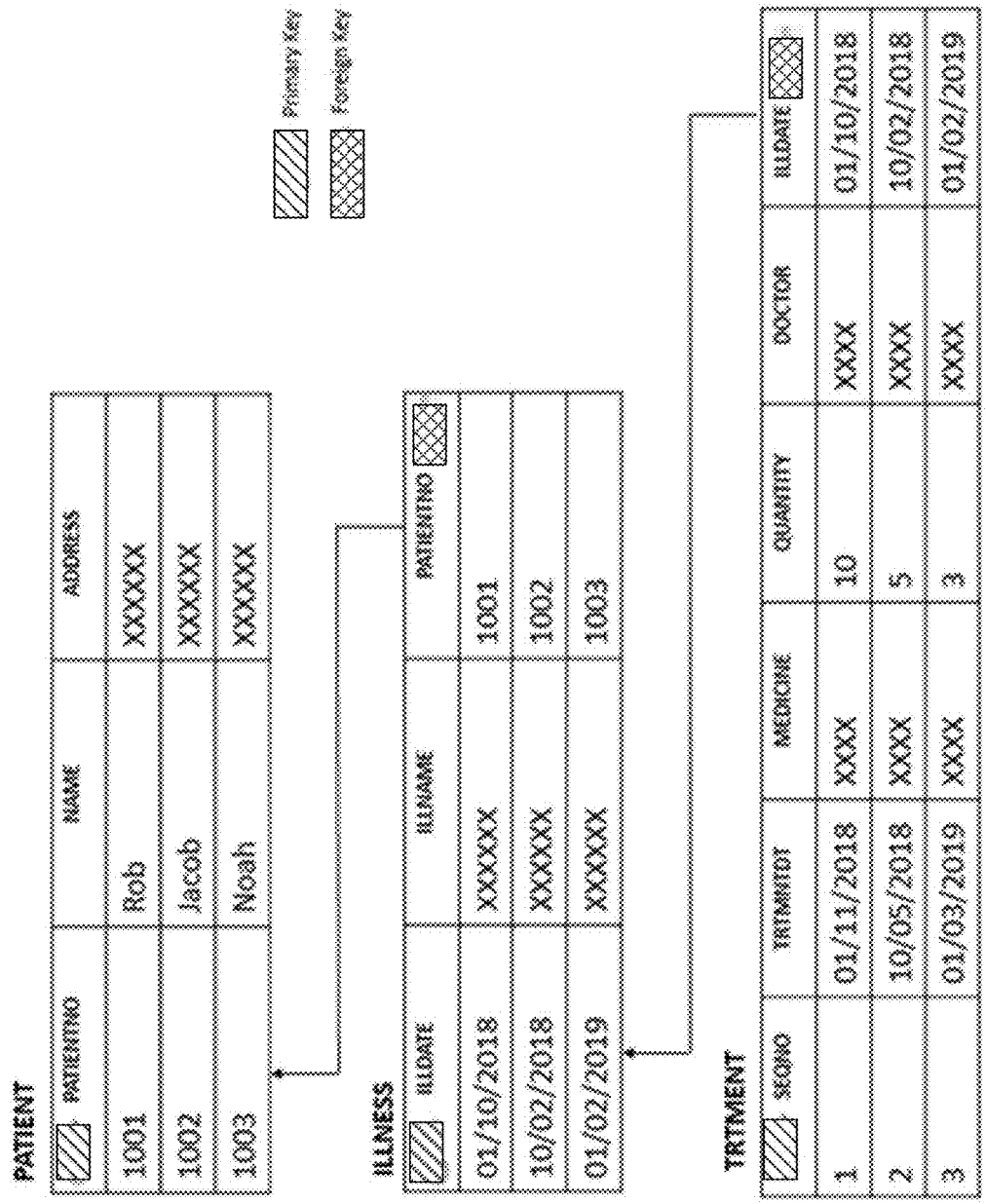

FIG. 7 is a relational database structure according to an embodiment.

Referring to FIG. 7, relational database structure 700 is created by converting the IMS database structure 600 shown in FIG. 6.

As discussed above, in the creation of target DB schemas, the database MS migration module has the ability to optimize the target schema while migrating from an IMS DB (or another legacy datastore) to a target DB management system (see FIG. 2A at 260). Database/datastore optimization involves maximizing the speed and efficiency with which data is retrieved.

Next, the conversion of a virtual storage access method ("VSAM") into target DB schemas of the target DB management system will be described. For instance, the VSAM is converted into target relational DB schemas for the RDBMS.

Figure 13A:
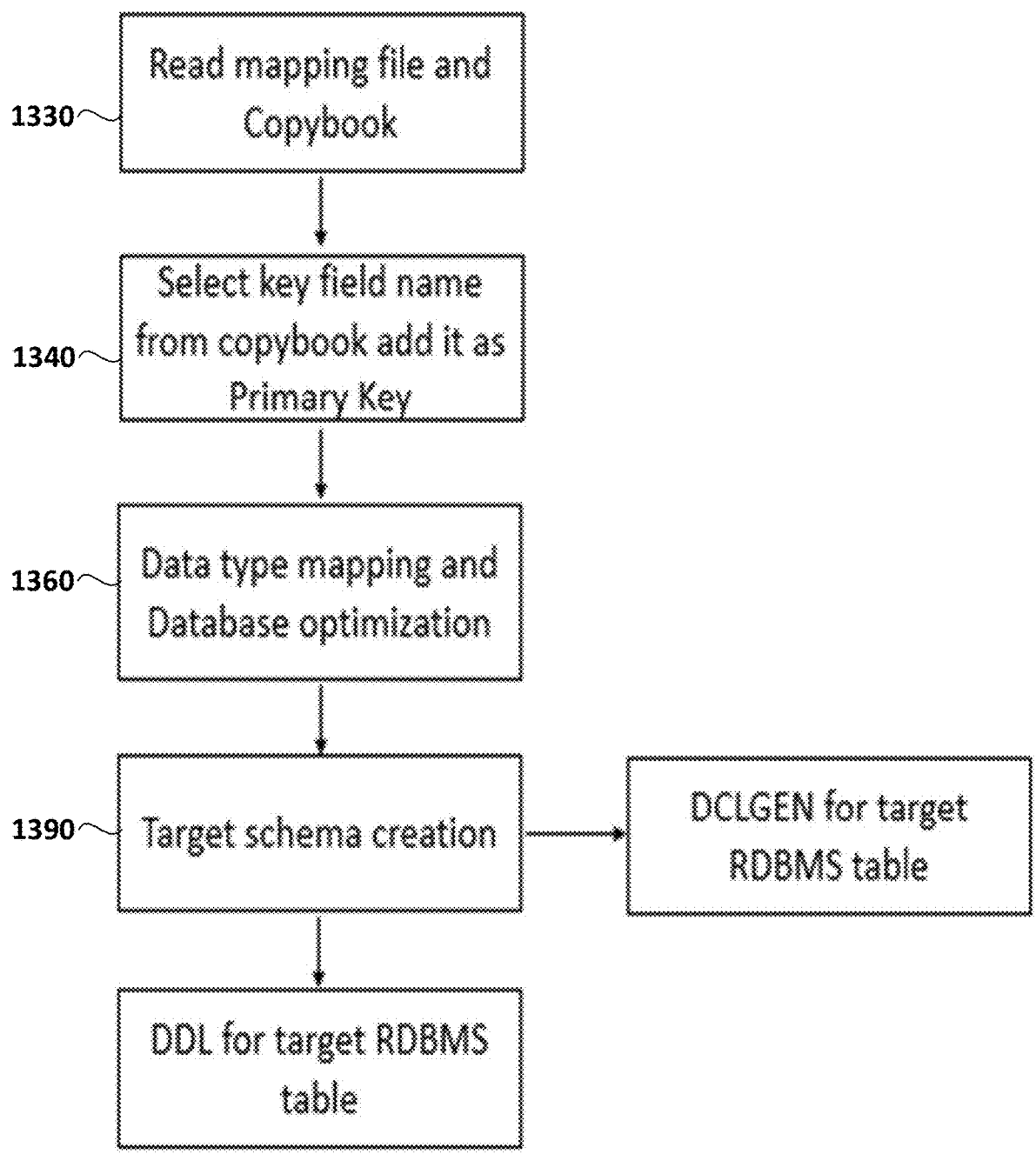
FIG. 13A is a flow diagram of VSAM conversion according to an embodiment.

FIG. 13A is a flow diagram of VSAM conversion according to an embodiment.

Figure 13B:
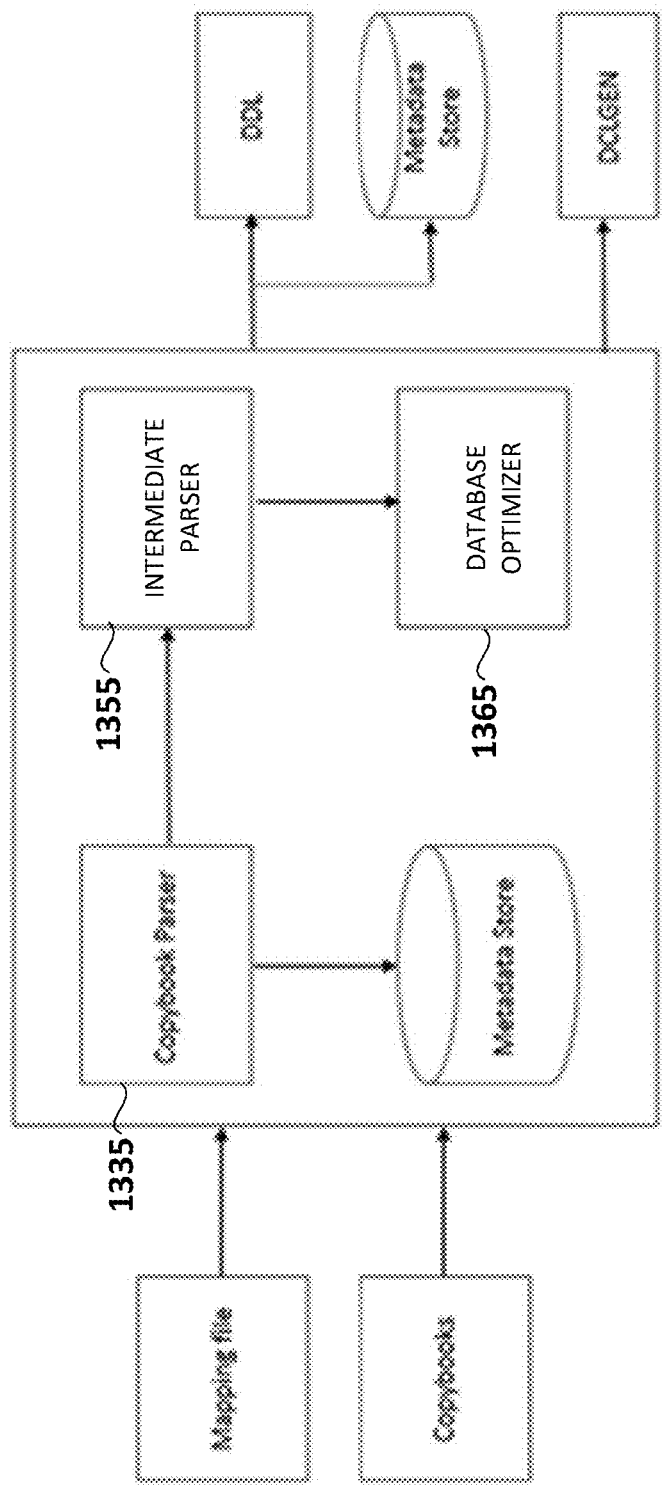
FIG. 13B is a diagram of a system configured for conversion of VSAM in a DB management system in accordance with an embodiment.

FIG. 13B is a diagram of a system configured for conversion of VSAM in a DB management system in accordance with an embodiment.

In an embodiment, an user selects a physical file name, a logical file name and a copy book of all VSAM files to be migrated. The mapping of the physical file, the logical file and the VSAM file copybook is stored in a mapping file.

The user selects the key field names of each VSAM file. These key fields will be used as a primary key in the target RDBMS table.

The user also selects the target relational database (for instance, DB2, ORACLE, or a similar database).

Referring to FIGS. 13A and 13B, a copybook parser 1335 in a database MS migration module automatically performs the data type mapping, and sets the column size, at 1330. The user is given the option to change the target data type and/or column size, if necessary or required. At 1330, the database MS migration module also reads the source VSAM file copybook, and maps the field data type, or source field data type, to a target DB table column data type.

The database MS migration module checks the field data type (or the source field data type) and field size, and maps to corresponding target DB table column data type and column size. In the mapping shown in FIGS. 13A and 13B are for DB2 and ORACLE, however, the target DB can be any RDBMS or NoSQL database.

At 1340, the database MS migration module adds the key field name, selected by the user, as a primary key in the target table definition.

As part of database optimization, at 1360, a database optimizer 1365 in the database MS migration module handles conversion of VSAM file copybooks with OCCURS clause in the copybook structure in a different way. If the OCCURS clause appears more than 5 times, a separate child table is created and the primary key of the parent table is added as a foreign key in the child table along with sequence number field as key. If the OCCURS clause appears 5 times or less, a single character type column is defined to store all occurrences of array elements along with additional space for storing the delimiter.

The OCCURS clause is used to define a table/array in the COBOL language. All elements in the array have the data description. The array can be defined as single dimensional or two dimensional.

In an embodiment, a separate child table is created for copybooks having the OCCURS clause with a large array size to ensure that the database is normalized.

In an embodiment, the default cut-off value for creation of a separate table for the OCCURS clause is kept as 5, but the database MS migration module also gives the user the option to create or not to create separate table for the OCCURS clause according to the user's choice.

In an embodiment, the database MS migration module handles conversion of VSAM files copybooks with REDEFINES clauses in the copybook structure in a different way. If there are multiple REDEFINES clauses of a large group item (with more than 5 elementary items), then separate child tables are created for each REDEFINES clause, and the primary key of the parent table is added as a foreign key in the child tables along with sequence number field as the key.

If the REDEFINES clause is done on less than 5 variables, separate columns are defined in the same table for each redefined variable.

According to an embodiment, the REDEFINES clause is used to define a storage area for data items with different data descriptions. If some of the data items are not used simultaneously, then the storage area can be used for other data items by redefining the storage area using the REDEFINES clause.

In an embodiment, a separate child table is created for source file copybooks having REDEFINES clauses with more number of elementary items to ensure that the database is normalized.

The default cut-off value for the creation of a separate table for REDEFINES clauses is kept as 5 according to an embodiment, but the database MS migration module also gives the user the option to create, or not to create separate table for REDEFINES clauses according to the user's choice.

The function of intermediate parser 1355 shown in FIG. 13B is to carve out the structure of child tables from the VSAM file copybook having REDEFINES or OCCURS clauses if normalization is required for target table.

At 1390 in FIG. 13A, target DB schemas of the target DB management system are created. In particular, each VSAM file structure is converted to corresponding target DB management system tables (for instance, relational database tables), and declaration generators ("DCLGENs") and data definition language ("DDL") of target tables are created.

The following is an example of a VSAM to RDBMS schema creation. The structure of VSAM file is as follows.

SYNEMP

| Field Name | Bytes | Comments |
|---|---|---|
| SYN-EMPNO | 5 | Key Field |
| SYN-ENAME | 20 | |
| SYN-DESIGNATION | 20 | |
| SYN-MANAGER | 5 | |
| SYN-SALARY | 7 | |

The database MS migration module converts above VSAM file structure into relational database structure 1400 as shown in FIG. 14.

Next, the conversion of an integrated database management system ("IDMS") into target DB schemas of the target DB management system will be described. For instance, the IDMS is converted into target relational DB schemas for the RDBMS.

Figure 15A:
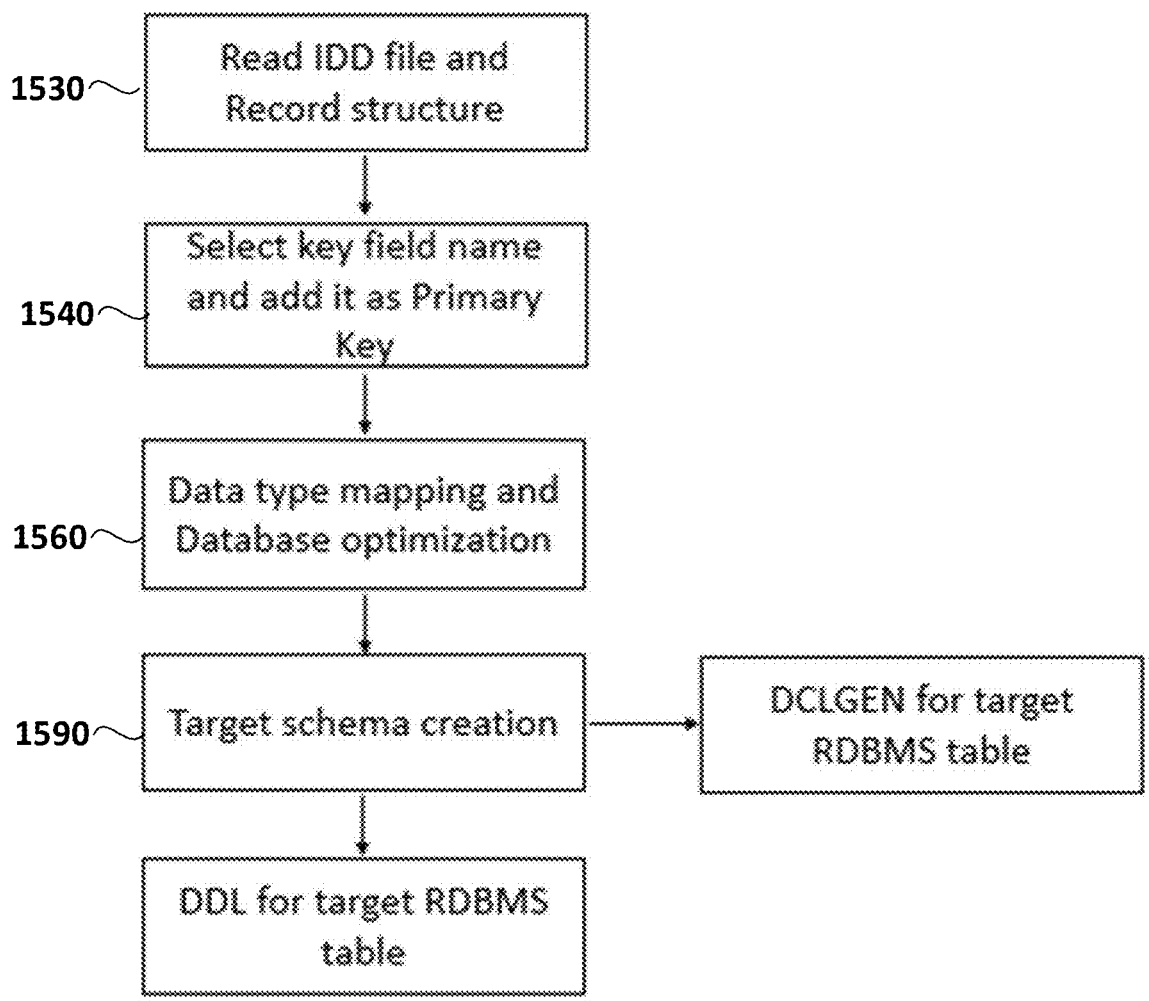
FIG. 15A is a flow diagram of IDMS conversion according to an embodiment.

FIG. 15A is a flow diagram of IDMS conversion according to an embodiment.

Figure 15B:
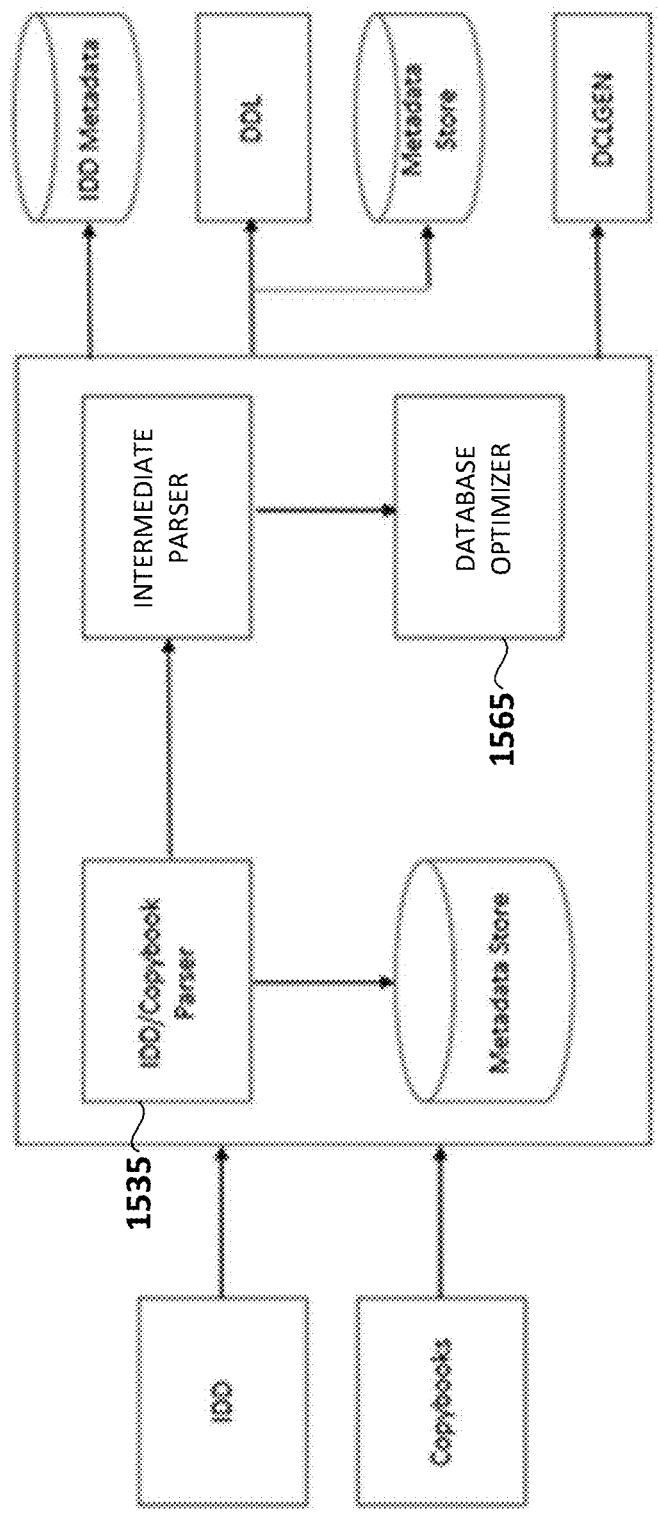
FIG. 15B is a diagram of a system configured for conversion of IDMS in a DB management system in accordance with an embodiment.

FIG. 15B is a diagram of a system configured for conversion of IDMS in a DB management system in accordance with an embodiment.

In an embodiment, an user selects integrated data dictionary ("IDD") files and the record structure for migration.

In an embodiment, the user also selects the target relational database (for instance, DB2, ORACLE, or a similar database).

Referring to FIGS. 15A and 15B, at 1530, a IDD/copybook parser 1535 in a database MS migration module reads the IDD file(s) to fetch the record structure, and sets details to identify relationships, keys and/or data types based on the record structure.

At 1540, the database MS migration module selects and adds the key field name as a primary key in the target table definition.

At 1560, a data optimizer 1565 of the database MS migration module automatically performs the data type mapping and sets the column size.

In an embodiment, the user is given the option to change the target data type and/or column size, if required or necessary.

At 1590, target DB schemas of the target DB management system are created. In particular, each IDMS record structure is converted to corresponding target DB management system tables (for instance, relational database tables), and declaration generators ("DCLGENs") and data definition language ("DDL") of target tables are created.

Figure 16:
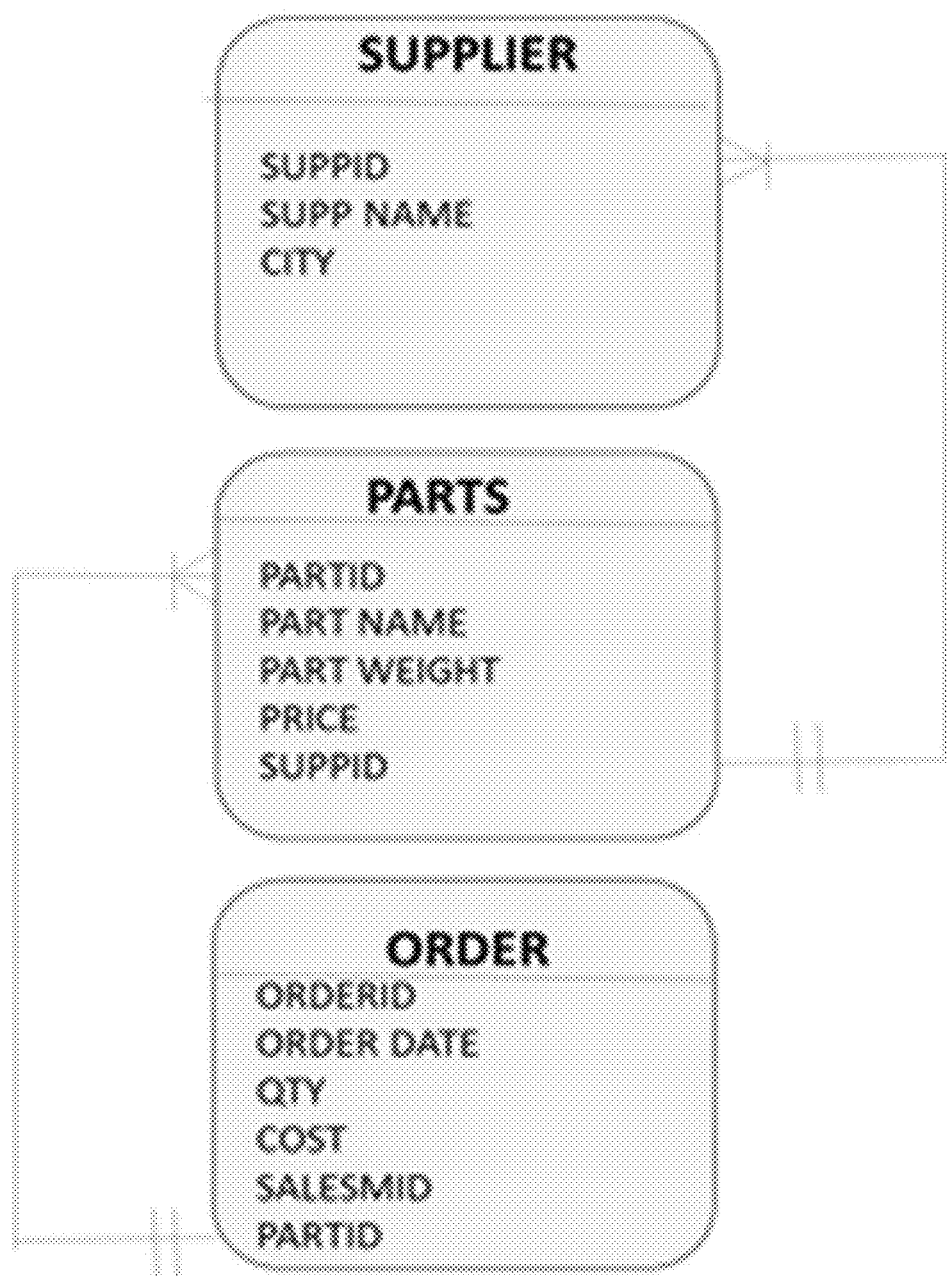
Figure 17:
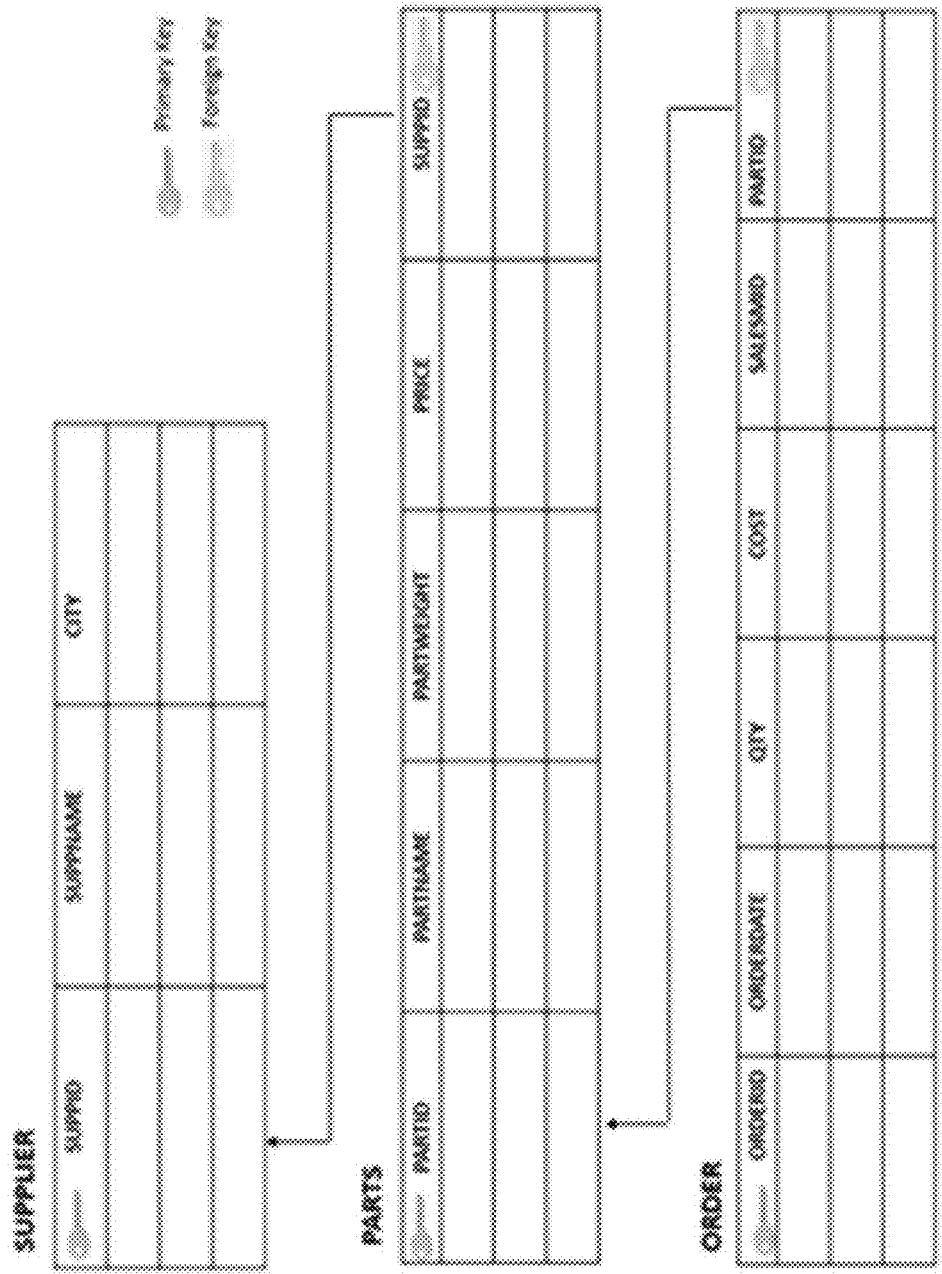

In an example of IDMS schema migration, IDMS structure 1600 is as shown in FIG. 16. The system converts the IDMS structure 1600 to RDBMS schema 1700 as shown in FIG. 17.

Next, the conversion of ADABAS (an acronym for adaptable database system) into target DB schemas of the target DB management system will be described. For instance, the ADABAS is converted into target relational DB schemas for the RDBMS.

Figure 18A:
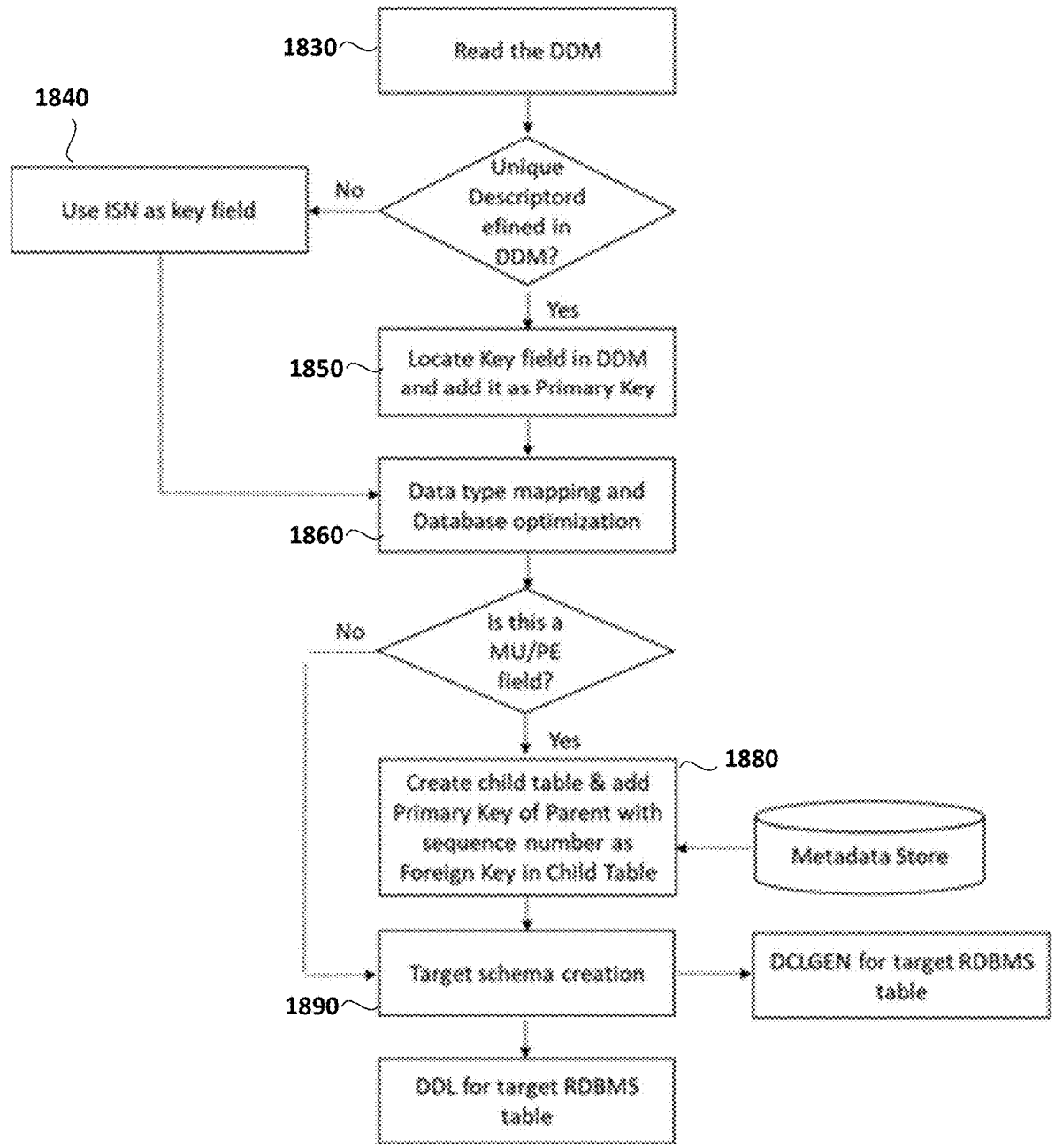
FIG. 18A is a flow diagram of ADABAS conversion according to an embodiment.

FIG. 18A is a flow diagram of ADABAS conversion according to an embodiment.

Figure 18B:
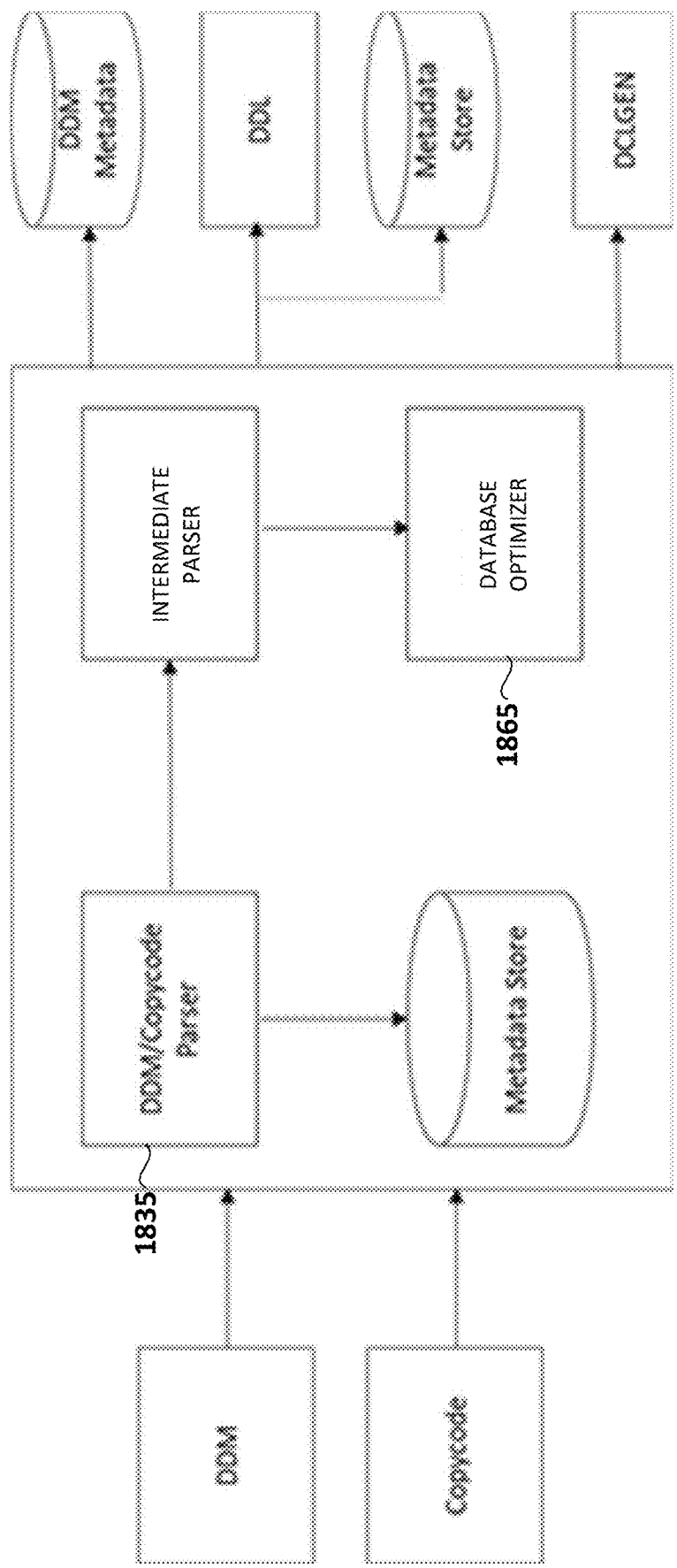

FIG. 18B is a diagram of a system configured for conversion of ADABAS in a DB management system in accordance with an embodiment.

In an embodiment, a user selects a data definition model ("DDM") and views of the files to be migrated.

In an embodiment, the user also selects the target relational database (for instance, DB2, ORACLE, or a similar database).

Referring to FIGS. 18A and 18B, a DDM/copybook parser 1835 in the database MS migration module reads the file definition from corresponding DDM, at 1830.

If a file has no unique descriptor, then the database MS migration module takes the internal sequence number ("ISN") as the primary key in the target table, at 1840.

If a file has a unique descriptor, then the database MS migration module identifies the key field by locating the field having keyword UQ in the definition. For instance, see the following definition.

FNDEF='01, AA, 6, A, DE, UQ, NU'
Field: EMPLOYEE-ID

After locating the key field definition of the file, the database MS migration module retrieves the symbolic name, starting position and/or length of the key field. In the above example, AA is the symbolic name of the key field and the length of the key field is 6 bytes, and the key field starts from the first byte. The system then locates the corresponding fields in the copybook, and map them as the primary key of the target RDBMS table, at 1850.

At 1860, a data optimizer 1865 in the database MS migration module automatically performs the data type mapping, and sets the column size.

The user is given the option to change the target data type/column size, if required or necessary.

At 1860, the data optimizer 1865 reads the source DDM, and maps the data type to target database table column data type. The database MS migration module checks the source field data type and the field size, and maps each to a corresponding target database table column data type and column size.

In the mapping shown in FIGS. 18A and 18B are for DB2 and ORACLE, however, the target DB can be any RDBMS or NoSQL database.

In an embodiment, the database MS migration module handles conversion of multi-value ("MU") and periodic group ("PE") fields in a different way. If the number of MU or PE occurrences is more than 5 times, a separate child table is created, and the primary key of the parent table is added as the foreign key in the child table along with sequence number field as key, at 1880. If the number of MU or PE occurrence is less than or equal to 5 times, a single character type column is defined to store all occurrences of array elements along with additional space for storing the delimiter In an embodiment, MU fields are equivalent to single dimensional arrays, and PE fields are equivalent to two dimensional arrays.

In an embodiment, a default cut-off value for creation of separate table is kept as an occurrence of 5.

In an embodiment, the database MS migration module also gives the user the option to create, or not to create, a separate table for a number of occurrence according to the user's choice.

At 1890, target DB schemas of the target DB management system are created. In particular, each DDM record structure is converted to corresponding target DB management system tables (for instance, relational database tables), and declaration generators ("DCLGENs") and data definition language ("DDL") of target tables are created.

According to an embodiment, the following database optimization techniques are used in the database MS migration module.

Database Normalization—The system is configured to make a decision whether to normalize, or de-normalize, the target schema depending on the structure of the source database segment. Segments having the OCCURS clause with more than 5 times, and the REDEFINES clause with more than 5 elementary items, are normalized. The primary key of the parent table is added as a foreign key in the child tables along with sequence number field as key.

In an embodiment, separate child tables are created for segment copybooks having the OCCURS clause with large array size, or the REDEFINES clause with more number of elementary items, to ensure that the database is normalized.

In an embodiment, the default cut-off value for creation of a separate table for the OCCURS clause(s) and the REDE- FINES clause(s) is kept as 5, but the database MS migration module also gives the user the option to create, or not to create, a separate table for OCCURS/REDEFINES clauses according to the user's choice.

In an embodiment, only the fields with the OCCURS clauses and the REDEFINES clauses may be considered automatically by the database MS migration module for normalization. However, the database MS migration module also gives the user the flexibility to normalize the target table as per user's requirement.

Examples of the handling of OCCURS clauses and REDEFINES clauses are provided below.

Example—Handling OCCURS Clause

Figure 8:
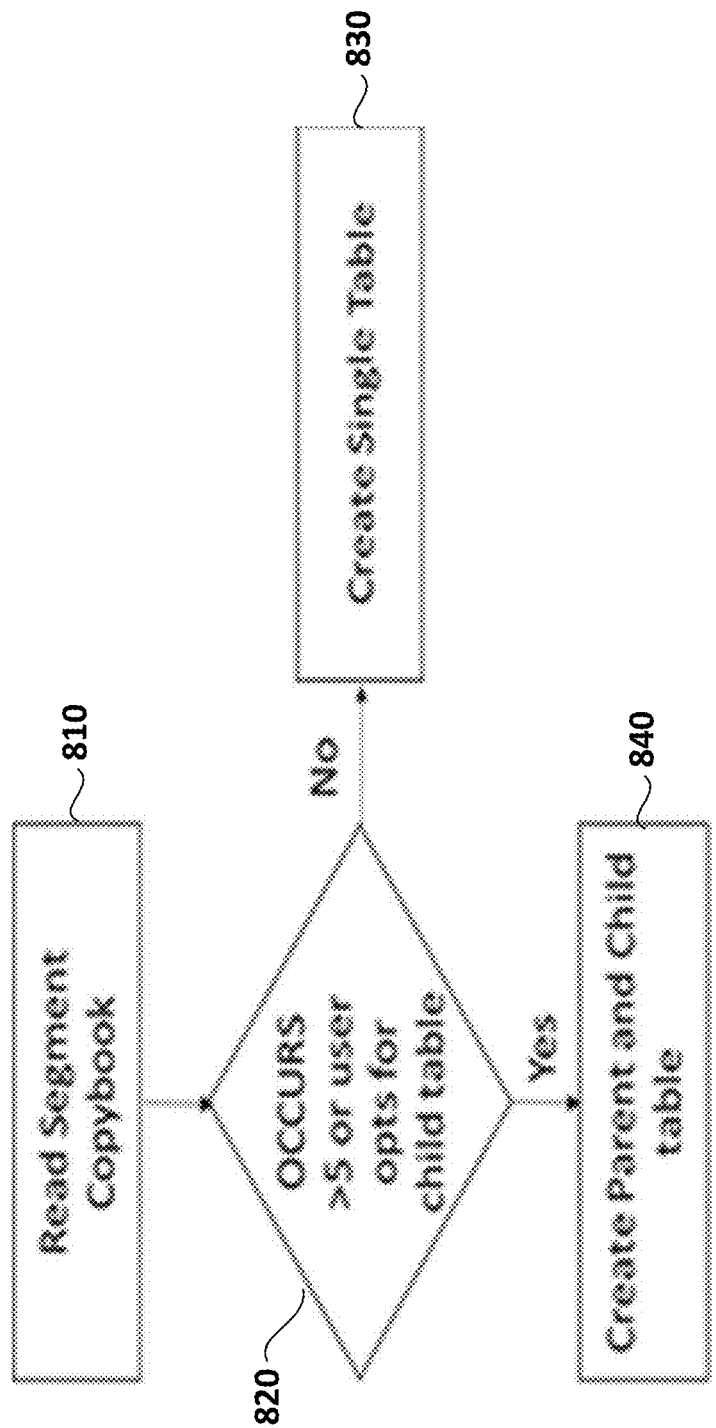

FIG. 8 is a process flow for normalization of OCCURS clauses in accordance with an embodiment.

Referring to FIG. 8, the segment copy book is read, at 810.

At 820, the database MS migration module determines if the segment has the OCCURS clause more than 5 times.

If the segment has the OCCURS clause more than 5 times, the database MS migration module creates the following parent and child tables, at 840:

```
01 SYNDEPT.
  05 SYN-DEPTNO   PIC 9(03). (Key Field)
  05 SYN-DNAME    PIC X(20).
  05 LOCATION     OCCURS 10 TIMES
    10 SYN-LOC    PIC X(20).
```

Parent Table

| Column Name | Data Type | Comments |
|---|---|---|
| SYN_DEPTNO | NUMERIC(3, 0) | Primary Key |
| SYN_DNAME | VARCHAR(20) | |

Child Table

| Column Name | Data Type | Comments |
|---|---|---|
| SEQUENCE_NO | NUMERIC(10, 0) | Primary Key |
| SYN_DEPTNO | NUMERIC(3, 0) | Foreign Key |
| SYN_LOC | NUMERIC(20) | |

If the segment does not have the OCCURS clause more than 5 times, the database MS migration module creates a single table, at 830.

A REDEFINES clause is used to define a storage area with a different data description. If some of the data items are not used simultaneously, then the storage area can be used for other data items by redefining the storage area using REDEFINES clause.

A separate child table is created for segment copybooks having REDEFINES with more number of elementary items to ensure that the database is normalized. As mentioned above, the default cut-off value for the creation of a separate table for REDEFINES clauses is kept as 5, but the database MS migration module also gives the user the option to create or not to create separate table for REDEFINES according to the user's choice.

Example—Handling REDEFINES Clause

Figure 9:
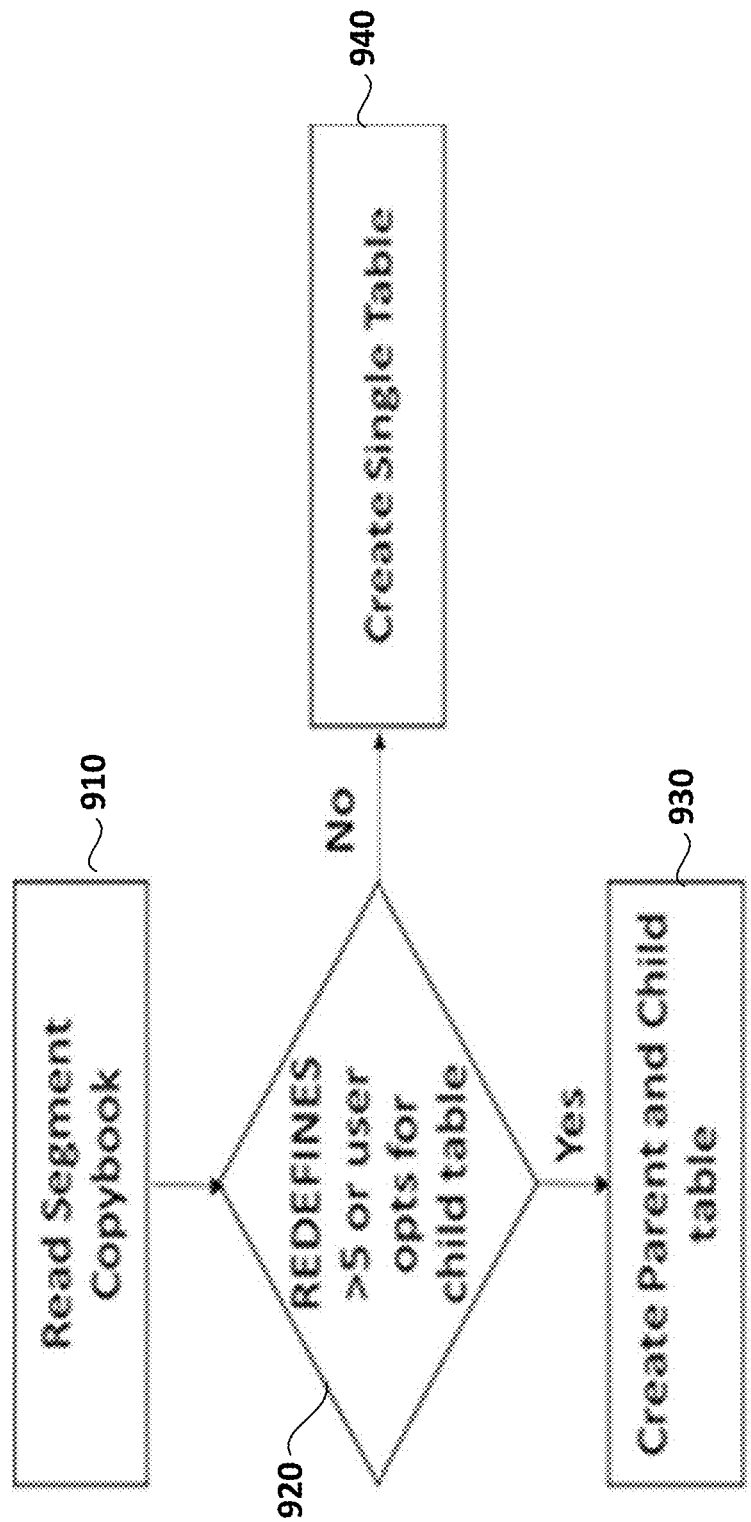

FIG. 9 is a process flow for normalization of REDEFINES clauses in accordance with an embodiment.

Referring to FIG. 9, the segment copy book is read, at 910.

At 920, the database MS migration module determines if the segment has the REDEFINES clause less than 5 times.

If the segment has the REDEFINES clause less than 5 times, the database MS migration module creates the following parent and child tables, at 930:

```
01 STUDENT
  05 STUDENT-NO PIC X(5).
  05 STUDENT-NAME PIC X(20).
  05 MARKS PIC X(18).
  05 SEMESTER1 REDEFINES MARKS.
    10 S1-MARK1 PIC 9(3).
    10 S1-MARK2 PIC 9(3).
    10 S1-MARK3 PIC 9(3).
    10 S1-MARK4 PIC 9(3).
    10 S1-MARK5 PIC 9(3).
    10 S1-MARK6 PIC 9(3).
  05 SEMESTER2 REDEFINES MARKS.
    10 S2-MARK1 PIC 9(3).
    10 S2-MARK2 PIC 9(3).
    10 S2-MARK3 PIC 9(3).
    10 S2-MARK4 PIC 9(3).
    10 S2-MARK5 PIC 9(3).
    10 S2-MARK6 PIC 9(3).
```

Parent Table STUDENT

| Column Name | Data Type | Comments |
|---|---|---|
| STUDENT-NO | CHAR(5) | Primary Key |
| STUDENT-NAME | VARCHAR(20) | |

Child Table SEMESTER1

| Column Name | Data Type | Comments |
|---|---|---|
| SEQUENCE_NO | NUMERIC(10,0) | Primary Key |
| STUDENT_NO | CHAR(5) | Foreign Key |
| S1_MARK1 | NUMERIC(3,0) | |
| S1_MARK2 | NUMERIC(3,0) | |
| S1_MARK3 | NUMERIC(3,0) | |
| S1_MARK4 | NUMERIC(3,0) | |
| S1_MARK5 | NUMERIC(3,0) | |
| S1_MARK6 | NUMERIC(3,0) | |

Child Table SEMESTER2

| Column Name | Data Type | Comments |
|---|---|---|
| SEQUENCE_NO | NUMERIC(10,0) | Primary Key |
| STUDENT_NO | CHAR(5) | Foreign Key |
| S2_MARK1 | NUMERIC(3,0) | |
| S2_MARK2 | NUMERIC(3,0) | |
| S2_MARK3 | NUMERIC(3,0) | |
| S2_MARK4 | NUMERIC(3,0) | |
| S2_MARK5 | NUMERIC(3,0) | |
| S2_MARK6 | NUMERIC(3,0) | |

If the segment does not have the REDEFINES clause less than 5 times, the database MS migration module creates a single table, at 940.

As mentioned above, another database optimization technique used by the database MS migration module is constraints.

Constraints—A constraint is a rule that is used for optimization purposes. The database MS migration module is capable of enforcing constraints such as NOT NULL, UNIQUE, CHECK, PRIMARY KEY and FOREIGN KEY. Examples of the use of constraints are as follows:

```
CREATE TABLE SYN_DEPT (
    SYN_DEPTNO          NUMERIC(3) NOT NULL,
    SYN_DNAME           VARCHAR(20) NOT NULL,
    SYN_LOC             VARCHAR(20) NOT NULL,
    PRIMARY KEY (SYN_DEPTNO)
)
CREATE TABLE SYN_EMP (
    SYN_EMPNO           NUMERIC(5) NOT NULL,
    SYN_DEPTNO          NUMERIC(3) NOT NULL,
    SYN_ENAME           VARCHAR(20),
    SYN_DESIGNATION     VARCHAR(20),
    SYN_MANAGER         NUMERIC(5),
    SYN_SALARY          NUMERIC(7),
    PRIMARY KEY (SYN_EMPNO)
)
ALTER TABLE SYN_EMP
    FOREIGN KEY (SYN_DEPTNO)
    REFERENCES SYN_DEPT(SYN_DEPTNO)
```

Yet another database optimization technique used by the database MS migration module is a database index.

Database Index—A database index is a data structure which is used to quickly locate and access data in a database table. The database MS migration module automatically creates indexes on primary keys, and the user has the option to create indexes on other columns as well if required.

In an embodiment, the database MS migration module also creates indexes on key fields. The following are examples of the creation of indexes:

```
CREATE UNIQUE INDEX SYN_DEPT_IX
    ON SYN_DEPT (SYN_DEPTNO ASC)
CREATE UNIQUE INDEX SYN_EMP_IX
    ON SYN_EMP (SYN_EMPNO ASC)
```

The database MS migration module is also configured to handle data type casting, space trimming, adding/changing referential integrity, adding/changing primary keys, adding or removing columns, changing the size of the target table columns, or similar functions. For example, a date stored in numeric format in a legacy datastore can be converted to DATE type in a target DB management system. The database MS migration module also automatically selects variable length character type VARCHAR (instead of fixed length character type CHAR), if the size of the character column is greater than 10 bytes.

Next, the conversion of application programs of a legacy datastore by mapping calls for the legacy datastore to data manipulation language ("DML") statements is described in further detail.

The database MS migration module is configured to automatically convert legacy datastore calls to equivalent DML statements in COBOL programs. The database MS migration module also performs code optimization.

Figure 10A:
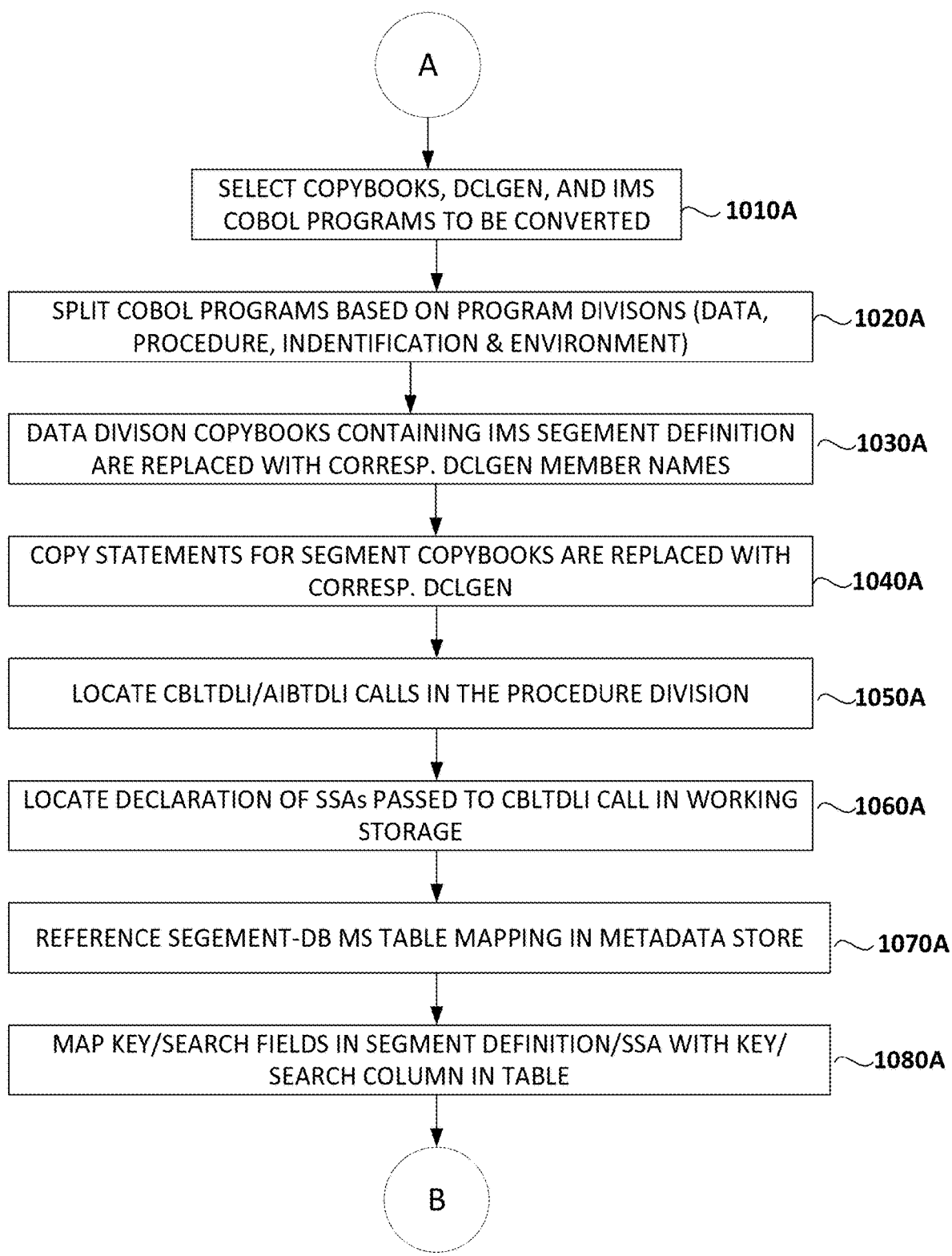
FIG. 10A is a flow diagram of conversion of application programs in an DB management system having an IMS database structure by mapping calls for the DB management system to SQL statements in accordance with an embodiment.

FIG. 10A is a flow diagram of conversion of application programs in an DB management system having an IMS database structure by mapping calls for the DB management system to SQL statements in accordance with an embodiment.

Figure 10B:
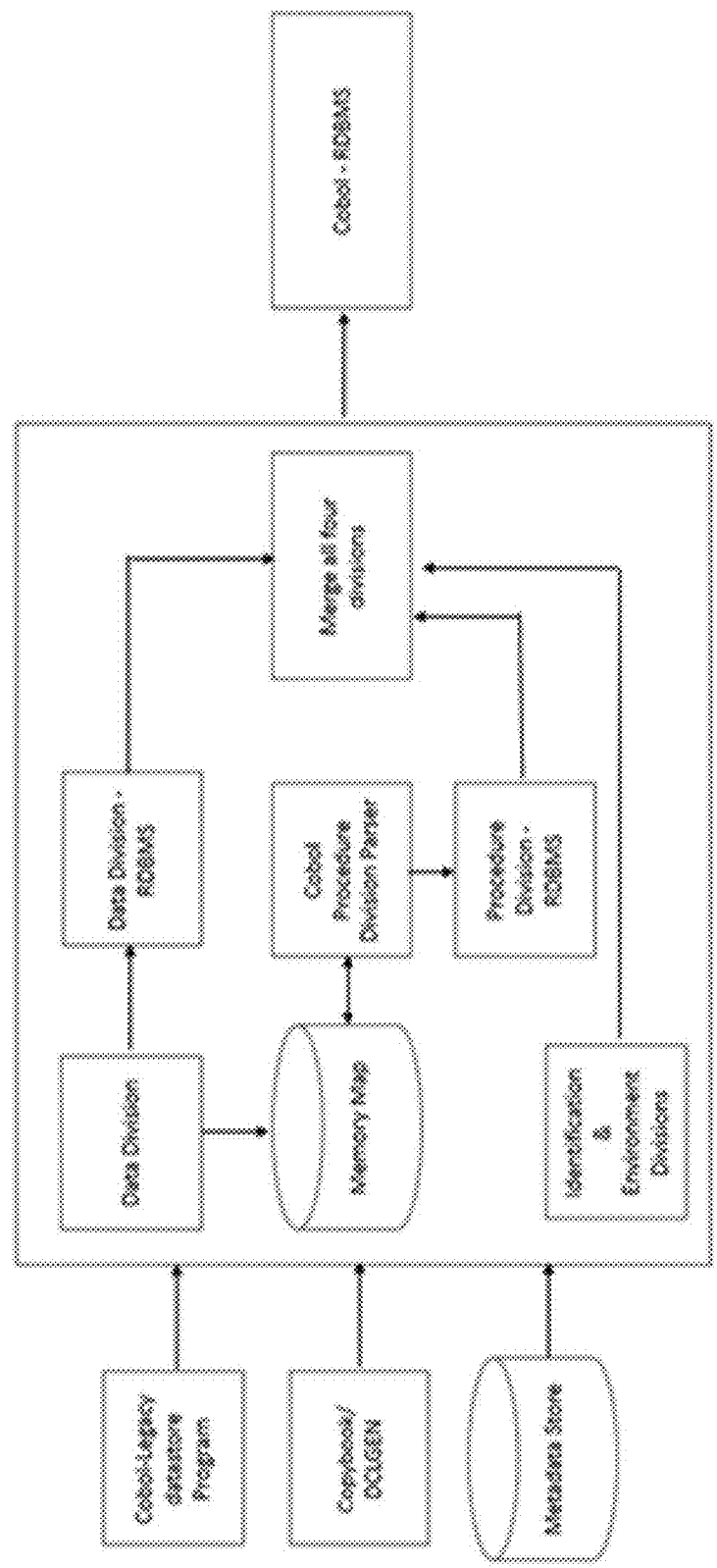
FIG. 10B is a diagram of a system configured for conversion of application programs in an DB management system by mapping calls for the DB management system to DML statements in accordance with an embodiment.

FIG. 10B is a diagram of a system configured for conversion of application programs in an DB management system by mapping calls for the DB management system to DML statements in accordance with an embodiment.

Figure 10C:
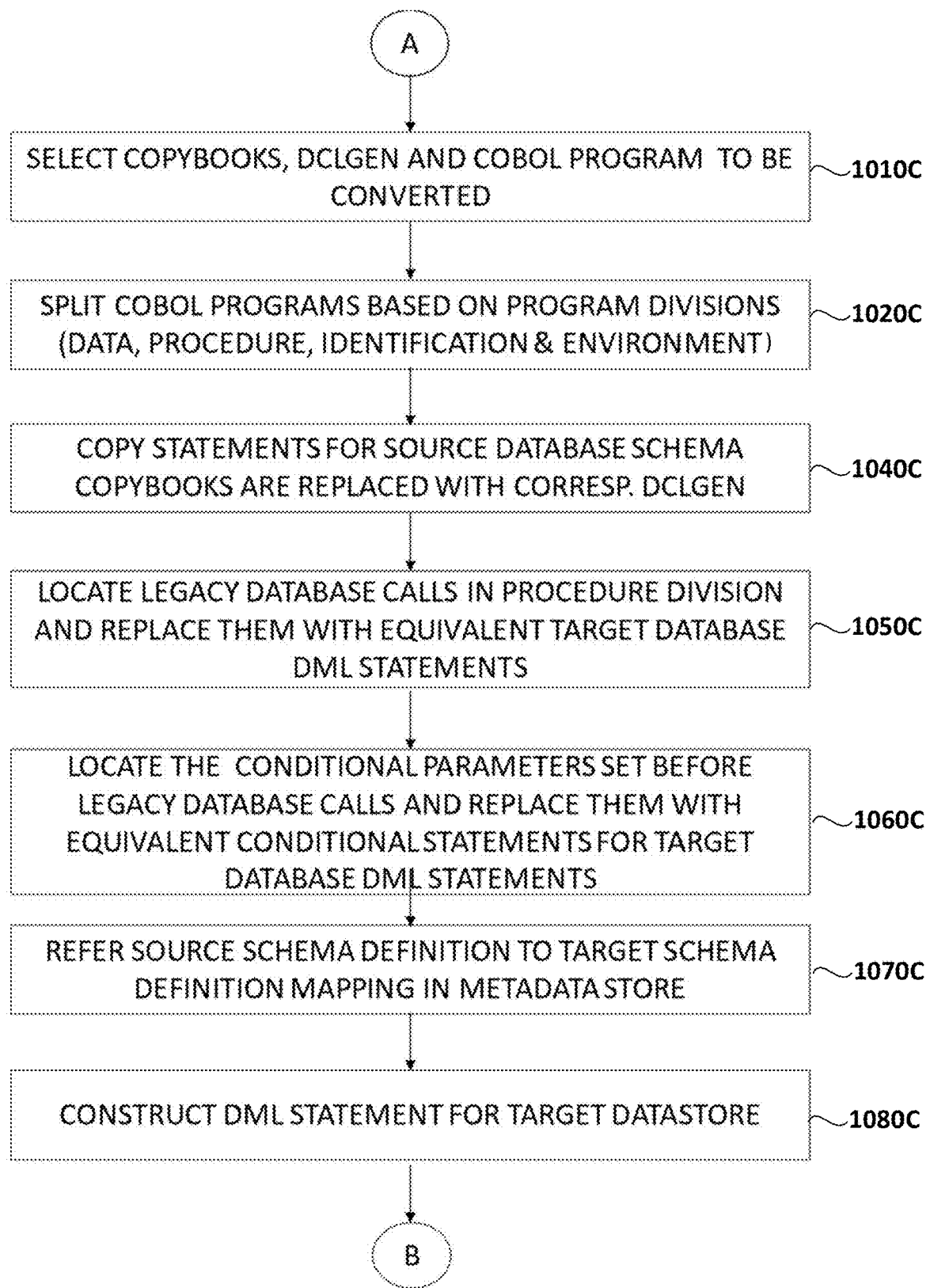
FIG. 10C is a flow diagram of conversion of application programs in an DB management system by mapping cells for the DB management system to DML statements in accordance with an embodiment.

FIG. 10C is a flow diagram of conversion of application programs in an DB management system by mapping cells for the DB management system to DML statements in accordance with an embodiment.

Referring to FIGS. 10A, 10B and 10C, a user selects the copybooks, DCLGEN and the COBOL programs from the legacy datastore to be converted, at 1010A and 1010C.

Then, at 1020A in FIG. 10A and 1020C in FIG. 10C, the database MS migration module splits the COBOL program into four portions based on four divisions of the program: Identification Division, Environment Division, Data Division and Procedure Division.

In the DB management system having an IMS database structure in FIG. 10A, the Data Division copybooks containing legacy datastore segment definitions are replaced with corresponding DCLGEN member names, at 1030A.

Referring back to FIGS. 10A and 10C, during schema conversion, the legacy datastore segments are mapped to target DB management system tables, and DCLGENs are created for each target table. At 1040A in FIG. 10A and 1040C in FIG. 10C, during conversion of the program, the COPY statements for source database schema copybooks are replaced with corresponding DCLGENs. For instance, in the DB management system having an IMS database structure, segment copybooks are replaced with corresponding DCLGENs as shown below:

```
COPY <segment-copybook>
Replaced with:
EXEC SQL
    INCLUDE DCLGEN <member name>
END-EXEC
```

The database MS migration module locates legacy database calls in the procedure division, at 1050A in FIG. 10A and 1050C in FIG. 10C. For instance, in the DB management system having an IMS database structure, CBLTDLI/ AIBTDLI calls in the procedure division, at 1050A in FIG. 10A.

At 1060A in FIG. 10A and 1060C in FIG. 10C, the database MS migration module locates conditional parameters set before the legacy database calls, and replaces the conditional parameters for the target database DML statements. For instance, in the DB management system having an IMS database structure, the database MS migration module, at 1060A in FIG. 10A, locates the declaration of segment search arguments ("SSAs"), which are passed to the CBLTDLI call, in WORKING STORAGE section.

During schema migration, source schema definition is mapped to corresponding target schema definition, at 1070A in FIG. 10A and 1070C in FIG. 10C. By default, the name of target schema definition is the same as that of the source schema definition. However, the database MS migration module allows the user to change the name of the target schema definition, if required. The definition mapping is stored in the metadata store during schema creation, and the definition mapping is referenced during DML generation, at 1070A in FIG. 10A and 1070C in FIG. 10C.

For instance, during schema migration, each segment in a database definition ("DBD") is mapped to corresponding target database tables, in the DB management system having an IMS database structure. By default, the name of target table is same as that of the source segment name. However, the database MS migration module allows the user to change the target table name, if required. The segment-DB management system table mapping is stored in the metadata store during schema creation, and the segment DB management system table mapping is referenced during SQL generation, at 1070A in FIG. 10A.

At 1080A in FIG. 10A and 1080C in FIG. 10C, the database MS migration module constructs DML statements for the target DB management system (i.e., the target datastore).

In the DB management system having an IMS database structure, key/search fields in segment definition/SSA are mapped with key/search column in the table.

According to an embodiment, in the conversion of application programs of an IMS DB by mapping calls for the IMS DB to DML statements (for instance, structured query language ("SQL") statements), the database MS migration module is configured to interpret the IMS command codes such as *C, *D, *F, *L, *N, *P, *Q, *U, *V, (*-), and generate corresponding DML statements.

The mapping of key fields and search fields is described in further detail below.

Mapping of Key Fields—The segment key field is identified by locating the field having keyword SEQ in the segment field definition as shown below:

SEGM NAME=SYNDEPT,BYTES=43,PARENT=0
FIELD NAME=(DNO,SEQ,U),BYTES=3,START=1, TYPE=C

After locating the key field definition of the segment, the database MS migration module retrieves the symbolic name, starting position, and length of the key field. In above example, DNO is the symbolic name of the key field, the length of the key field is 3 bytes, and the key field starts from the first byte. The database MS migration module then locates the corresponding fields in the segment copybook, and maps the corresponding fields as a primary key of the target DB management system table. If the segment is a child segment, the key of the parent segment is added as a foreign key in the target table for child segment.

If key is not defined for a segment, the system adds a sequence number column as a key field in the target table.

Mapping of search fields—The mapping of search field with the search column in a target table is similar to that of key field mapping. In the example below, DNAME is the search field:

SEGM NAME=SYNDEPT,BYTES=43,PARENT=0
FIELD NAME=(DNAME),BYTES=020,START=0004, TYPE=C

After locating the search field in the segment definition, the system retrieves the symbolic name, starting position, and length of the search field. In above example, DNAME is the symbolic name of the search field, the length of the search field is 20 bytes, and the search field starts from the fourth byte. The system then locates the corresponding fields in the segment copybook, and map the corresponding fields as search field for the target DB management system table. The search field is used in the WHERE clause of a DML statement as shown below

SELECT*FROM SYN_DEPT WHERE SYN_D-NAME=:DNAME;

The database MS migration module checks whether the SSA passed to the CBLTDLI call is qualified or unqualified. There are two types of SSAs. One is an unqualified SSA, and other one is qualified SSA. If the ninth byte of a SSA is space, then the SSA is a basic unqualified SSA. If the ninth byte of a SSA is '(', then the SSA is a basic qualified SSA. If the ninth byte is '*', then command codes are used in the SSA. If there is no '(' after the command codes, then the SSA is considered an unqualified SSA with command codes. If there is a '(' after command codes, then the SSA is considered a qualified SSA with command codes.

Below is one embodiment of qualified and unqualified SSAs:

Basic Qualified SSA:

```
01 SSA-SYNDEPT2.
   05  SSA-SYNDEPT2-SEG-NAME    PIC X(08)    VALUE
'SYNDEPT'
      05 SSA-SYNDEPT2-LPAREN    PIC X(01)  VALUE '('.
      05 SSA-SYNDEPT2-DNO       PIC X(08)  VALUE 'DNO   '
      05 SSA-SYNDEPT2-RELOPR    PIC X(02)  VALUE 'EQ'.
      05 SSA-SYNDEPT2-KEY       PIC X(03)  VALUE SPACES.
      05 SSA-SYNDEPT2-RPAREN    PIC X(01)  VALUE ')'.
```

Basic Unqualified SSA:

```
01 SSA-SYNDEPT3.
   05  SSA-SYNDEPT3-SEG-NAME    PIC X(08)    VALUE
'SYNDEPT'
   05 FILLER         PIC X(01)  VALUE SPACES.
```

Qualified SSA with Command Code:

```
01 SSA-TRTMENT.
   05 SSA-TRTMENT-SEG-NAME      PIC X(08) VALUE
'TRTMENT'
   05 SSA-TRTMENT-CC            PIC XXX VALUE '*C'.
   05 SSA-TRTMENT-LPAREN        PIC X(01) VALUE '('.
   05 SSA-TRTMENT-TRTDT         PIC X(08) VALUE 'TRTDT '
   05 SSA-TRTMENT-DNAME         PIC X(08) VALUE 'DNAME '
   05 SSA-TRTMENT-RELOPR        PIC X(02) VALUE 'EQ'.
   05 SSA-TRTMENT-KEY           PIC X(20) VALUE SPACES.
   05 SSA-TRTMENT-RPAREN        PIC X(01) VALUE')'.
```

Unqualified SSA with Command Code

```
01 SSA-TRTMENT.
   05 SSA-TRTMENT-SEG-NAME      PIC X(08)  VALUE
'TRTMENT '
   05 SSA-TRTMENT-CC            PIC XXX   VALUE '*L '.
```

The database MS migration module reads all the key/search field names, relational operators and the key names starting from left parenthesis '(' until right parenthesis ')' is reached for qualified SSAs.

The SSAs are defined in the Working Storage section. Some of the SSA parameters (such as command codes, the left parenthesis '(', and relational operators) can be changed dynamically before the IMS CBLTDLI calls in the program. Therefore, it is necessary to check if any of the SSA parameters are changed before the CBLTDLI call in order to construct a correct DML statement. For example, SSA-SYNDEPT2 is defined as a qualified SSA. The statement MOVE "TO SSA-SYNDEPT2-LPAREN before the CBLTDLI call will make SSA-SYNDEPT2 an unqualified SSA. The database MS migration module checks whether the initial SSA parameters are changed before CBLTDLI call.

The database MS migration module checks the IMS call type (such as GU, GHU, GN, GHN, GNP, GHNP, ISRT, REPL and DLET) and the command codes, if any, and builds the DML statement accordingly. An example of the mapping of a IMS call and corresponding SQL statement is provided below in TABLE 3.

TABLE 3

| IMS Call | Description | SQL Statement |
|---|---|---|
| GU | Get Unique | SELECT |
| GHU | Get Hold Unique | SELECT |
| GN | Get Next | SELECT |
| GHN | Get Hold Next | SELECT |
| GNP | Get Next within Parent | SELECT |
| GHNP | Get Hold Next within Parent | SELECT |
| ISRT | Insert | INSERT |
| REPL | Replace | UPDATE |
| DLET | Delete | DELETE |

In the case of GN, GHN, GNP, GHNP where multiple segment occurrences are retrieved, a cursor will be used and the records will be fetched until the end of cursor is reached.

A cursor is used if multiple records are to be processed sequentially. If a program uses cursor, then the database MS migration module declares a cursor, opens the cursor, fetches records from the cursor until end of cursor is reached, and then closes the cursor.

If multiple segment occurrences are retrieved recursively using IMS calls GN, GHN, GNP or GHNP, these IMS calls will be replaced by declaring a cursor before the loop starts, and the records are fetched in a loop sequentially until end of cursor is reached. See example below for cursor declaration.

If the SSA contains multiple qualifications and Boolean statements, the database MS migration module derives corresponding DML statements by adding relational and Boolean operators in the WHERE clause of the DML statement.

According to an embodiment, in order to generate an DML query, the database MS migration module locates CBLTDLI calls in the program, identifies the IMS call type and maps the IMS call type to a corresponding DML statement. An example of the mapping of IMS calls with SQL statements is shown below in TABLE 4.

TABLE 4

| IMS Call | Description | SQL Statement |
|---|---|---|
| GU | Get Unique | SELECT |
| GHU | Get Hold Unique | SELECT |
| GN | Get Next | SELECT |
| GHN | Get Hold Next | SELECT |
| GNP | Get Next within Parent | SELECT |
| GHNP | Get Hold Next within Parent | SELECT |
| ISRT | Insert | INSERT |
| REPL | Replace | UPDATE |
| DLET | Delete | DELETE |

Then, the segment definition of the segments passed as parameter in CBLTDLI call are located.

Segment name is mapped to target DB management system table. During schema migration, each segment in the DBD is mapped to corresponding target database tables. By default, the name of the target table is the same as that of the source segment name. The database MS migration module allows the user to change the target table name, if required. The segment-DB management system table mapping is stored in the metadata store, and the segment-DB management system table mapping referenced while generating the DML query.

Next, a check is performed as to whether the SSA is a basic SSA or a SSA with command codes, and whether the SSA is a qualified SSA or unqualified SSA. If the ninth byte of the SSA is space, then the SSA is a basic unqualified SSA. If the ninth byte is '(', then the SSA is a basic qualified SSA. If the ninth byte is '*', then command codes are used in the SSA. If there is no '(' after command codes, then the SSA is considered as an unqualified SSA with command codes. If there is a '(' after command codes, then the SSA is considered as a qualified SSA with command codes.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps the corresponding fields as search field for the target DB management system table.

The database MS migration module also checks the relational and Boolean operators used in the SSA, and constructs the DML statement accordingly. An example of the mapping of relational operators in a IMS call, and the corresponding operator in the respective DML statement is shown below in TABLE 5.

TABLE 5

| Symbolic | Alphabetic | Operator in SQL statement |
|---|---|---|
| =b or b= | EQ | = |
| >= or => | GE | >= |
| <= or =< | LE | <= |
| >b or b> | GT | > |
| <b or b< | LT | < |
| ¬= or =¬ | NE | <> or != |

TABLE 6 shows the mapping of Boolean operators in a IMS call, and the corresponding operator in the respective SQL statement.

TABLE 6

| Boolean Operator | Operator in SQL statement |
|---|---|
| * or & or # | AND |
| + or \| | OR |

If the SSA is unqualified, there will not be any WHERE clause in the DML statement.

If command codes are used, the database MS migration module will construct the DML statement based on following criteria shown in TABLE 7.

TABLE 7

| Command Code | Description | Generation of SQL statement |
|---|---|---|
| C | Concatenated key | The keys will be joined using AND Boolean operator in SQL statement. See below example of a GU Call with qualified SSA with command code 'C'. |
| D | Path call | Separate SQL statements will be generated for parent and child tables. See below example of a GU Call with a qualified SSA with command code 'D'. |
| F | First Occurrence | SQL query will be generated to fetch the first row from the table. See below example of a GN call with Command code 'F'. |
| L | Last Occurrence | SQL query will be generated to fetch the last row from the table. See below |

TABLE 7-continued

| Command Code | Description | Generation of SQL statement |
|---|---|---|
|  |  | example of a GN call with Command code 'L'. |
| N | Path call ignore | SQL statement will be generated to update corresponding table. See below example of a call with qualified SSA with command code 'N'. |
| P | Set parentage | SQL query will be generated to retrieve data from corresponding table. Retrieves the parentage at the lowest level. See below example of call with a qualified SSA with command code 'P'. |
| Q | Enqueue segment | Cursor WITH HOLD option or SELECT . . . FOR UPDATE option will be used while generating the SQL statement. See below example of a call with a qualified SSA with command code 'Q'. |
| U | Maintain position at current level | SQL query will be generated by joining parent and child tables. See below example of a GN Call with a qualified SSA with command code 'U'. |
| V | Maintain position at current and all above levels | SQL query will be generated by joining parent and child tables. See below example of GN Call with a qualified SSA with command code 'V'. |
| — | Null command code | SQL statement will be generated without considering previously set command code. See below example of a GU Call with a qualified SSA with the NULL command code '—'. |

The database MS migration module splits the source program into four files, one for each Division. Data Division of the source IMS program is first converted to Data Division of target DB management system program. Procedure Division of the source IMS program is then converted to Procedure Division for target DB management system program. All the four divisions are then merged, and the target program is created.

In an embodiment, the database MS migration module handles IMS calls shown in TABLE 8.

TABLE 8

| IMS Call | Description | SQL Statement |
|---|---|---|
| GU | Get Unique | SELECT |
| GHU | Get Hold Unique | SELECT |
| GN | Get Next | SELECT |
| GHN | Get Hold Next | SELECT |
| GNP | Get Next within Parent | SELECT |
| GHNP | Get Hold Next within Parent | SELECT |
| ISRT | Insert | INSERT |
| REPL | Replace | UPDATE |
| DLET | Delete | DELETE |

The following is an example of Get Unique (GU) Call with qualified SSA without command code, according to an example embodiment.

The GU call is used to directly retrieve segments and to establish a starting position in the database for sequential processing.

For this example, the declaration of SSAs and the CBLTDLI call are as follows.

Declaration of SSAs

```
01 SSA-SYNDEPT2.
   05 SSA-SYNDEPT2-SEG-NAME    PIC X(08)  VALUE
      'SYNDEPT '
   05 SSA-SYNDEPT2-LPAREN      PIC X(01)  VALUE '('.
   05 SSA-SYNDEPT2-DNO         PIC X(08)  VALUE 'DNO     '
   05 SSA-SYNDEPT2-RELOPR      PIC X(02)  VALUE 'EQ'.
   05 SSA-SYNDEPT2-KEY         PIC X(03)  VALUE SPACES.
   05 SSA-SYNDEPT2-RPAREN      PIC X(01)  VALUE ')'.
```

CBLTDLI Call

```
A100-GU-SYNDEPT.
   MOVE 030 to SSA-SYNDEPT2-KEY.
   CALL 'CBLTDLI' USING GU
      PCB-SYN10P    /*PCB Name
      SYNDEPT-IO    /*I/O Area
      SSA-SYNDEPT2  /* Qualified SSA for parent
```

The first 8 bytes in the SSA is the segment name. In the above example, the segment name is SYNDEPT. The segment name is mapped to the corresponding table name.

| Segment | Table |
|---|---|
| SYNDEPT | SYN_DEPT |

The key/search fields of SSA are mapped to the key/search columns in the above table.

Segment Definition in DBD
SEGM NAME=SYNDEPT,BYTES=43,PARENT=0
FIELD  NAME=(DNO,SEQ,U),BYTES=3,START=1, TYPE=C
SSA in Program

```
01 SSA-SYNDEPT2.
   05 SSA-SYNDEPT2-SEG-NAME    PIC X(08)  VALUE
      'SYNDEPT '
   05 SSA-SYNDEPT2-LPAREN      PIC X(01)  VALUE '('.
   05 SSA-SYNDEPT2-DNO         PIC X(08)  VALUE 'DNO     '
   05 SSA-SYNDEPT2-RELOPR      PIC X(02)  VALUE 'EQ'.
   05 SSA-SYNDEPT2-KEY         PIC X(03)  VALUE SPACES.
   05 SSA-SYNDEPT2-RPAREN      PIC X(01)  VALUE ')'.
```

Copybook

```
01 SYNDEPT.
   05 SYN-DEPTNO        PIC 9(03).
   05 SYN-DNAME         PIC X(20).
   05 SYN-LOCN          PIC X(20).
```

The SYN_DEPT table is defined as follows:—

| Column | Data Type | Comments |
|---|---|---|
| SYN_DEPTNO | NUMERIC(3,0) | Primary Key |
| SYN_DNAME | VARCHAR(20) |  |
| SYN_LOC | VARCHAR(20) |  |

Initially, the user creates a mapping sheet with segment name and corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target DB management system column. The database MS migration module also allows the user to change the target table column name if required. The mapping of segment copybook fields and target table columns is stored in metadata store, and the mapping is referenced during SQL query generation.

The key/search column SYN_DEPTNO will be mentioned in the WHERE clause.
Call Details.
Call Type—SELECT
Table name—SYN_DEPT
Search Column—SYN_DEPTNO
Relational Operator—EQ
Search value—SSA-SYNDEPT2-KEY To generate an DML query, the database MS migration module locates CBLTDLI calls in program.

Then, the database MS migration module identifies the IMS call type, and maps the IMS call type to a corresponding DML statement.

| IMS Call | Description | SQL Statement |
|---|---|---|
| GU | Get Unique | SELECT |

Next, the database MS migration module locates the segment definition of the segments passed as parameter in CBLTDLI call. The segment name is mapped to target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module then checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as unqualified SSA with command codes and if there is a '(' after command codes, then the SSA is considered as qualified SSA with command codes. In this example, the SSA is a basic qualified SSA.

If it is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. Here symbolic name is DNO, which is mapped to the segment copybook field SYN-DEPTNO. The copybook field SYN-DEPTNO is internally mapped to table column name SYN_DEPTNO. These mappings are stored in the metadata store during schema creation, and the mappings are referenced during DML query generation.

The database MS migration module also checks the relational and Boolean operators used in the SSA, and constructs the DML statement accordingly. Below is the mapping of relational operators in the IMS call, and the corresponding operator in SQL statement. In this example, '=' is the relational operator.

| Symbolic | Alphabetic | Operator in SQL statement |
|---|---|---|
| =b or b= | EQ | = |

Boolean operators are not used in this example.

If the SSA is unqualified, there will not be any WHERE clause in DML statement. In this example, SSA is a basic qualified SSA and hence WHERE clause is used in the SQL statement.

If command codes are used, the database MS migration module will construct the SQL statement accordingly. Command codes are not used in this example.

The SQL query is constructed as follows using above details.

```
EXEC SQL
    SELECT SYN_DNAME,SYN_LOC INTO
:SYN-DNAME,:SYN-LOC FROM
    SYN_DEPT WHERE SYN_DEPTNO=:SSA-SYNDEPT2-KEY;
END-EXEC
```

The following is an example embodiment of a GU Call with qualified SSA with command code 'C'.

The C command code is used to concatenate the keys.

The declaration of SSAs and the CBLTDLI call are as follows.

Declaration of SSAs.

```
01 SSA-PATIENT.
    05 SSA-PATIENT-SEG-NAME    PIC X(08)  VALUE
        'PATIENT'
    05 SSA-PATIENT-CC      PIC XXX   VALUE ' '.
    05 SSA-PATIENT-LPAREN      PIC X(01)  VALUE '('.
    05 SSA-PATIENT-PATNO       PIC X(08)  VALUE 'PATNO '
    05 SSA-PATIENT-RELOPR      PIC X(02)  VALUE 'EQ'.
    05 SSA-PATIENT-KEY     PIC X(10)  VALUE SPACES.
    05 SSA-PATIENT-RPAREN      PIC X(01)  VALUE ')'.
```

```
01 SSA-ILLNESS.
    05 SSA-ILLNESS-SEG-NAME    PIC X(08)  VALUE
        'ILLNESS '
    05 SSA-ILLNESS-CC      PIC XXX   VALUE ' '.
    05 SSA-ILLNESS-LPAREN      PIC X(01)  VALUE '('.
    05 SSA-ILLNESS-ILLDT       PIC X(08)  VALUE 'ILLDT '
    05 SSA-ILLNESS-RELOPR      PIC X(02)  VALUE 'EQ'.
    05 SSA-ILLNESS-KEY     PIC X(08)  VALUE SPACES.
    05 SSA-ILLNESS-RPAREN      PIC X(01)  VALUE ')'.
```

```
01 SSA-TRTMENT.
    05 SSA-TRTMENT-SEG-NAME    PIC X(08)  VALUE
        'TRTMENT '
    05 SSA-TRTMENT-CC      PIC XXX   VALUE '*C '.
    05 SSA-TRTMENT-LPAREN      PIC X(01)  VALUE '('.
    05 SSA-TRTMENT-TRTDT       PIC X(08)  VALUE 'TRTDT '
    05 SSA-TRTMENT-DNAME       PIC X(08)  VALUE 'DNAME '
    05 SSA-TRTMENT-RELOPR      PIC X(02)  VALUE 'EQ'.
    05 SSA-TRTMENT-KEY     PIC X(20)  VALUE SPACES.
    05 SSA-TRTMENT-RPAREN      PIC X(01)  VALUE ')'.
```

CBLTDLI Call

```
A200-PROCESS.
    MOVE 1000 TO SSA-PATIENT-KEY
    MOVE '12012009' TO SSA-ILLNESS-KEY
    MOVE '01012010JOHN   ' TO SSA-TRTMENT-KEY.
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

| Segment | Table |
|---|---|
| PATIENT | PATIENT |
| ILLNESS | ILLNESS |
| TRTMENT | TRTMENT |

Next, the database MS migration module reads command code from SSA. The database MS migration module reads the command code at column 10 in the SSA of parent segment, and constructs the DML query accordingly. Command code C is used for concatenated keys.

The key/search fields of SSA are mapped to key/search columns in the table.

Segment Definition in DBD
DBD  NAME=MEDICDB,ACCESS=(HDAM,OSAM), RMNAME=(DFSHDC40,2,21000)
DATASET  DD1=MEDICHDB,DEVICE=3380, SIZE=8192,FRSPC=(0,0)
SEGM NAME=PATIENT,BYTES=60,PARENT=0
FIELD NAME=(PATNO,SEQ,U),BYTES=10,START=1
SEGM  NAME=ILLNESS,BYTES=28, PARENT=PATIENT
FIELD NAME=(ILLDT,SEQ,U),BYTES=8,START=1
SEGM  NAME=TRTMENT,BYTES=55, PARENT=ILLNESS
FIELD NAME=(TRTDT,SEQ,M),BYTES=8,START=11
FIELD NAME=(DRNAME,),BYTES=10,START=46
SSA in Program

```
01 SSA-PATIENT.
    05 SSA-PATIENT-SEG-NAME    PIC X(08)  VALUE
       'PATIENT'
    05 SSA-PATIENT-CC          PIC XXX    VALUE ' '.
    05 SSA-PATIENT-LPAREN      PIC X(01)  VALUE '('.
    05 SSA-PATIENT-PATNO       PIC X(08)  VALUE 'PATNO '
    05 SSA-PATIENT-RELOPR      PIC X(02)  VALUE 'EQ'.
    05 SSA-PATIENT-KEY         PIC X(10)  VALUE SPACES.
    05 SSA-PATIENT-RPAREN      PIC X(01)  VALUE ')'.
```

```
01 SSA-ILLNESS.
    05 SSA-ILLNESS-SEG-NAME    PIC X(08)  VALUE
       'ILLNESS '
    05 SSA-ILLNESS-CC          PIC XXX    VALUE ' '.
    05 SSA-ILLNESS-LPAREN      PIC X(01)  VALUE '('.
    05 SSA-ILLNESS-ILLDT       PIC X(08)  VALUE 'ILLDT '
    05 SSA-ILLNESS-RELOPR      PIC X(02)  VALUE 'EQ'.
    05 SSA-ILLNESS-KEY         PIC X(08)  VALUE SPACES.
    05 SSA-ILLNESS-RPAREN      PIC X(01)  VALUE ')'.
```

```
01 SSA-TRTMENT.
    05 SSA-TRTMENT-SEG-NAME    PIC X(08)  VALUE
       'TRTMENT '
    05 SSA-TRTMENT-CC          PIC XXX    VALUE '*C '.
    05 SSA-TRTMENT-LPAREN      PIC X(01)  VALUE '('.
    05 SSA-TRTMENT-TRTDT       PIC X(08)  VALUE 'TRTDT '
    05 SSA-TRTMENT-DNAME       PIC X(08)  VALUE 'DNAME '
    05 SSA-TRTMENT-RELOPR      PIC X(02)  VALUE 'EQ'.
    05 SSA-TRTMENT-KEY         PIC X(20)  VALUE SPACES.
    05 SSA-TRTMENT-RPAREN      PIC X(01)  VALUE ')'.
```

Copybooks

```
01 PATIENT
    05 PATIENTNO    PIC 9(10).
    05 NAME         PIC X(20).
    05 ADDRESS      PIC X(30).
```

```
01 ILLNESS.
    05 ILLDATE      PIC 9(08).
    05 ILLNAME      PIC X(20).
```

```
01 TRTMENT.
    05 SEQNO        PIC 9(10).
    05 TRTMNTDT     PIC 9(10).
    05 MEDICINE     PIC X(20).
    05 QUANTITY     PIC 9(5).
    05 DOCTOR       PIC X(10).
```

The definition of the PATIENT Table is as follows.

| Column | Data Type | Comments |
|---|---|---|
| PATIENTNO | NUMERIC(10,0) | Primary Key |
| NAME | VARCHAR(20) | |
| ADDRESS | VARCHAR(30) | |

The definition of the ILLNESS Table is as follows.

| Column | Data Type | Comments |
|---|---|---|
| ILLDATE | NUMERIC(8,0) | Primary Key |
| ILLNAME | VARCHAR(20) | |
| PATIENTNO | NUMERIC(10,0) | Foreign key |

The definition of the TRTMENT Table is as follows.

| Column | Data Type | Comments |
|---|---|---|
| SEQNO | NUMERIC(10,0) | Primary Key |
| TRTMNTDT | NUMERIC(10,0) | |
| MEDICINE | VARCHAR(20) | |
| QUANTITY | NUMERIC(5,0) | |
| DOCTOR | VARCHAR(10) | |
| ILLDATE | NUMERIC(8,0) | Foreign Key |

Initially, the user creates a mapping sheet with segment name and corresponding copybook name. During schema migration, the database MS migration module reads the segment name from DBD file, locates the segment copybook name in the mapping file, and reads the corresponding segment copybook file. The segment copybook field names are mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during DML query generation.

The call details are as follows.
Call Type—SELECT
Command Code—C
Table names—PATIENT, ILLNESS, TRTMNT
Search Column—PATIENTNO, ILLDATE, TRTMNTDT, DOCTOR
Relational Operator—EQ
Search value—SSA-PATIENT-KEY, SSA-ILLNESS-KEY, SSA-TRTMENT-KEY To generate an DML query, the database MS migration module locates CBLTDLI calls. The database MS migration module identifies the IMS call type, and maps it to corresponding DML statement as shown in the table below. In this example, GU is mapped to SQL SELECT statement.

| IMS Call | Description | SQL Statement |
|---|---|---|
| GU | Get Unique | SELECT |

Next, the database MS migration module locates the segment definition of the segments passed as parameter in CBLTDLI call.

Segment name is mapped to target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as unqualified SSA with command codes and if there is a '(' after command codes, then the SSA is considered as qualified SSA with command codes. In this example, the SSA is a qualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search fields for the target RDBMS table. These mappings are stored in the metadata store during schema creation, and the mappings are referenced during DML query generation.

The database MS migration module also checks the relational and Boolean operators used in the SSA, and constructs the DML statement accordingly. The mapping of relational operators in the IMS call, and the corresponding operator in the DML statement are shown below. In this example, '=' is the relational operator.

| Symbolic | Alphabetic | Operator in SQL statement |
|---|---|---|
| =b or b= | EQ | = |

Boolean operators are not used in this example.

If the SSA is unqualified, there will not be any WHERE clause in the DML statement. In this example, the SSA is a qualified SSA, and hence the WHERE clause is used in the DML statement.

If command codes are used, the database MS migration module will construct the DML statement based on following criteria. Command code 'C' is used in this example,

| Command Code | Description | Generation of SQL statement |
|---|---|---|
| C | Concatenated key | The keys will be joined using AND Boolean operator in SQL statement. |

The SQL query is constructed as follows using above details.

```
EXEX SQL
    SELECT ILLNESS.ILLDATE,MEDICINE,QUANTITY FROM
    ILLNESS,TRTMENT WHERE PATIENTNO=:SSA-PATIENT-KEY
    AND ILLNESS.ILLDATE=:SSA-ILLNESS-KEY AND
    TRTMNTDT=:SSA-TRTMENT-TRTDT AND
    DOCTOR=:SSA-TRTMENT-DNAME AND
    ILLNESS.ILLDATE=TRTMENT.ILLDATE;
END-EXEC
```

The following is an example embodiment of a GU Call with a qualified SSA with command code 'D'.

The D command code is used to retrieve, or insert, a sequence of segments in a hierarchic path with one call rather than retrieving or inserting each segment with a separate call. A call that uses the D command code is called a path call.

The declaration of SSAs and the CBLTDLI call are as follows.
Declaration of SSAs
01 SSA-SYNDEPT3.

```
01 SSA-SYNDEPT3.
    05 SSA-SYNDEPT3-SEG-NAME    PIC X(08)  VALUE 'SYNDEPT'
    05 SSA-SYNDEPT3-CC          PIC XXX    VALUE '*D-'.
    05 SSA-SYNDEPT3-LPAREN      PIC X(01)  VALUE '('.
    05 SSA-SYNDEPT3-DNO         PIC X(08)  VALUE 'DNO    '
    05 SSA-SYNDEPT3-RELOPR      PIC X(02)  VALUE 'EQ'.
    05 SSA-SYNDEPT3-KEY         PIC X(03)  VALUE SPACES.
    05 SSA-SYNDEPT3-RPAREN      PIC X(01)  VALUE ')'.
```

01 SSA-SYNEMP2.

```
01 SSA-SYNEMP2.
    05 SSA-SYNEMP2-SEG-NAME     PIC X(08)  VALUE 'SYNEMP '
    05 SSA-SYNEMP2-LPAREN       PIC X(01)  VALUE '('.
    05 SSA-SYNEMP2-ENO          PIC X(08)  VALUE 'ENO    '
    05 SSA-SYNEMP2-RELOPR       PIC X(02)  VALUE 'EQ'.
```

-continued

```
05 SSA-SYNEMP2-KEY       PIC X(05)  VALUE SPACES.
05 SSA-SYNEMP2-RPAREN    PIC X(01)  VALUE ')'.
```

CBLTDLI Call

```
A200-GU-DEPTEMP.
    MOVE 030 to SSA-SYNDEPT2-KEY.
    MOVE 10001 to SSA-SYNEMP2-KEY.
    CALL 'CBLTDLI' USING GU
        PCB-SYN10P      /*PCB Name
        SYNEMP          /*I/O Area
        SSA-SYNDEPT3    /* Qualified SSA for parent
        SSA-SYNEMP2     /* Qualified SSA for child
```

During schema migration, each segment in the DBD is mapped to corresponding target database tables. By default, the name of target table is same as that of the source segment name. The database MS migration module allows the user to change the target table name if required. The Segment-RDBMS table mapping is stored in the metadata store during schema creation, and the mapping is referenced during DML generation.

The segment names are mapped with corresponding table names.

| Segment | Table |
|---|---|
| SYNDEPT | SYN_DEPT |
| SYNEMP | SYN_EMP |

Then, the database MS migration module reads command code from the SSA. In particular, the database MS migration module reads the command code at column 10 in the SSA of parent segment, and constructs the DML query accordingly. Command code D is for path call.

Next, the database MS migration module maps key/search fields of the SSA with key/search columns in the table.

Segment Definition in DBD
SEGM    NAME=SYNDEPT,BYTES=(00043,00043), PARENT=0,RULES=(,HERE)
FIELD   NAME=(DNO,SEQ,U),BYTES=03, START=00001,TYPE=C
SEGM NAME=SYNEMP,BYTES=(60,60),TYPE=DIR, PARENT=((SYNDEPT,SNGL)),RULES=(,FIRST)
FIELD   NAME=(ENO),BYTES=005,START=00001, TYPE=C SSA in Program
01 SSA-SYNDEPT3.

```
01 SSA-SYNDEPT3.
   05 SSA-SYNDEPT3-SEG-NAME   PIC X(08)  VALUE
      'SYNDEPT '
   05 SSA-SYNDEPT3-CC         PIC XXX    VALUE '*D-'.
   05 SSA-SYNDEPT3-LPAREN     PIC X(01)  VALUE '('.
   05 SSA-SYNDEPT3-DNO        PIC X(08)  VALUE 'DNO     '
   05 SSA-SYNDEPT3-RELOPR     PIC X(02)  VALUE 'EQ'.
   05 SSA-SYNDEPT3-KEY        PIC X(03)  VALUE SPACES.
   05 SSA-SYNDEPT3-RPAREN     PIC X(01)  VALUE ')'.
```

01 SSA-SYNEMP2.

```
01 SSA-SYNEMP2.
   05 SSA-SYNEMP2-SEG-NAME    PIC X(08)  VALUE
      'SYNEMP '
   05 SSA-SYNEMP2-LPAREN      PIC X(01)  VALUE '('.
   05 SSA-SYNEMP2-ENO         PIC X(08)  VALUE 'ENO     '
   05 SSA-SYNEMP2-RELOPR      PIC X(02)  VALUE 'EQ'.
   05 SSA-SYNEMP2-KEY         PIC X(05)  VALUE SPACES.
   05 SSA-SYNEMP2-RPAREN      PIC X(01)  VALUE ')'.
```

Copybooks
01 SYNDEPT.

| | |
|---|---|
| 05 SYN-DEPTNO | PIC 9(03). |
| 05 SYN-DNAME | PIC X(20). |
| 05 SYN-LOC | PIC X(20). |

01 SYNEMP.

| | |
|---|---|
| 05 SYN-EMPNO | PIC 9(05). |
| 05 SYN-ENAME | PIC X(20). |
| 05 SYN-DESIGNATION | PIC X(20). |
| 05 SYN-MANAGER | PIC 9(05). |
| 05 SYN-SALARY | PIC 9(05)V9(02). |
| 05 SYN-DEPTNO | PIC 9(03). |

The SYN_DEPT Table is defined as follows.

| Column | Data Type | Comments |
|---|---|---|
| SYN_DEPTNO | NUMERIC(3,0) | Primary Key |
| SYN_DNAME | VARCHAR(20) | |
| SYN_LOC | VARCHAR(20) | |

The SYN_EMP Table is defined as follows.

| Column | Data Type | Comments |
|---|---|---|
| SYN_EMPNO | NUMERIC(5,0) | Primary Key |
| SYN_ENAME | VARCHAR(20) | |
| SYN_DESIGNATION | VARCHAR(20) | |
| SYN_MANAGER | NUMERIC(5,0) | |
| SYN_SALARY | NUMERIC(7,2) | |
| SYN_DEPTNO | NUMERIC(3,0) | Foreign Key |

Initially, the user creates a mapping sheet with segment name and corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during DML query generation.

Call Details.
Call Type—SELECT
Command Code—D
Table names—SYN_DEPT, SYN_EMP
Search Column—SYN_DEPTNO, SYN_EMPNO
Relational Operator—EQ
Search value—SSA-SYNDEPT3-KEY, SSA-SYNEMP2-KEY To generate a DML query, the database MS migration module locates CBLTDLI calls. The database MS migration module then identifies the IMS call type, and maps the IMS call type to the corresponding DML statement as shown below. In this example, GU is mapped to SQL SELECT statement.

| IMS Call | Description | SQL Statement |
|----------|-------------|---------------|
| GU | Get Unique | SELECT |

Next, the database MS migration module locates the segment definition of the segments passed as parameter in CBLTDLI call.

Segment name is then mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating the DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as unqualified SSA with command codes and if there is a '(' after command codes, then the SSA is considered as a qualified SSA with command codes. In this example, the SSA is a qualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps the corresponding fields as search fields for the target RDBMS table. These mappings are stored in metadata store during schema creation, and the mappings are referenced during DML query generation.

The database MS migration module also checks the relational and Boolean operators used in the SSA, and constructs the SQL statement accordingly. The mapping of relational operators in IMS call and corresponding operator in SQL statement are shown below. In this example, '=' is the relational operator.

| Symbolic | Alphabetic | Operator in SQL statement |
|----------|------------|---------------------------|
| =b or b= | EQ | = |

Boolean operators are not used in this example.

If the SSA is unqualified, there will not be any WHERE clause in the DML statement. In this example, the SSA is a qualified SSA with command code. In this example, the SSA is a qualified SSA, and hence the WHERE clause is used in the DML statement.

If command codes are used, the database MS migration module will construct the DML statement based on following criteria. Command code 'D' is used in this example,

| Command Code | Description | Generation of SQL statement |
|--------------|-------------|------------------------------|
| D | Path call | Separate SQL statements will be generated for parent and child tables. |

The SQL queries are constructed as follows using the above details.

```
EXEC SQL
    SELECT SYN_DNAME,SYN_LOC INTO
    :SYN-DNAME,:SYN-LOC FROM SYN_DEPT WHERE
    SYN_DEPTNO=:SSA-SYNDEPT3-KEY;
END-EXEC
```

```
EXEC SQL
    SELECT
    SYN_ENAME,SYN_DESIGNATION,SYN_MANAGER,SYN_SALARY INTO
    :SYN-ENAME,:SYN-DESIGNATION,:SYN-MANAGER,:SYN-SALARY FROM
    SYN_EMP WHERE SYN_DEPTNO=:SSA-SYNDEPT3-KEY AND
    SYN_EMPNO=:SSA-SYNEMP2-KEY;
END-EXEC
```

The following is an example of a GN call with Command code 'F'.

F command code is used to start the search with the first occurrence of a certain segment type or to insert a new segment as the first occurrence in a chain of segments.

The declaration of SSAs and CBLTDLI call are as follows.

Declaration of SSAs
01 SSA-SYNDEPT3.

```
01 SSA-SYNDEPT3.
    05 SSA-SYNDEPT3-SEG-NAME    PIC X(08)   VALUE
    'SYNDEPT'
    05 SSA-SYNDEPT3-CC          PIC XXX     VALUE '*F-'.
```

CBLTDLI Call

```
A200-GN-DEPT.
    CALL 'CBLTDLI' USING GN
        PCB-SYN10P       /*PCB Name
        SYNEMP-IO        /*I/O Area
        SSA-SYNDEPT3     /* SSA for parent
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

The database MS migration module maps the segment names with corresponding table names

| Segment | Table |
|---------|-------|
| SYNDEPT | SYN_DEPT |

The SYN_DEPT Table is defined as follows.

| Column | Data Type | Comments |
|--------|-----------|----------|
| SYN_DEPTNO | NUMERIC(3,0) | |
| | Primary Key | |
| SYN_DNAME | VARCHAR(20) | |
| SYN_LOC | VARCHAR(20) | |

Initially, the user creates a mapping sheet with a segment name and a corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in the target RDBMS column. The database MS migration module also allows the user to change the target table column name if required. The mapping of segment copybook fields and target table columns is stored in the metadata store, and the mapping is referenced during DML query generation.

Next, the database MS migration module reads command code from the SSA. The database MS migration module reads the command code at column 10 in the SSA of parent segment, and constructs the DML query accordingly.

Call Details.
Call Type—SELECT
Command Code—F
Table names—SYN_DEPT

To generate an DML query, the database MS migration module locates CBLTDLI calls. Then, the database MS migration module identify the IMS call type, and maps the IMS call type to a corresponding DML statement as shown below. In this example, GN is mapped to SQL SELECT statement.

| IMS Call | Description | SQL Statement |
|----------|-------------|---------------|
| GN | Get Next | SELECT |

Next, the database MS migration module locates the segment definition of the segments passed as parameter in CBLTDLI call.

Segment name is mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module checks whether the SSA is a basic SSA or SSA with command codes, and checks whether the SSA is a qualified SSA or unqualified SSA. If the 9th byte of SSA is space, then The SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is an unqualified SSA with command code.

If it is a qualified SSA, the database MS migration module locates the key/search field from the segment definition. The database MS migration module retrieves the symbolic name, starting position, and length of the search field. The database MS migration module then locates the corresponding fields in the segment copybook, and maps them as a search field for the target RDBMS table. These mappings are stored in the metadata store during schema creation, and the mappings are referenced during DML query generation.

The database MS migration module also checks the relational and Boolean operators used in the SSA, and constructs the DML statement accordingly. In this example, relational and Boolean operators are not used in the SSA.

If the SSA is unqualified, there will not be any WHERE clause in the DML statement. In this example, the SSA is an unqualified SSA, and hence a WHERE clause is not used in the DML statement.

If command codes are used, the database MS migration module will construct the DML statement based on following criteria. Command code 'F' is used in this example,

| Command Code | Description | Generation of SQL statement |
|--------------|-------------|------------------------------|
| F | First Occurrence | SQL query will be generated to fetch the first row from the table. |

The SQL queries are constructed as follows using above details.

```
EXEC SQL
    SELECT SYN_DNAME,SYN_LOC INTO
    :SYN-DNAME,SYN-LOC FROM SYN_DEPT ORDER BY
    SYN_DEPTNO FETCH FIRST ROW ONLY;
END-EXEC
```

The following is an example embodiment of a GN call with Command code 'L'.

L command code is used to retrieve the last occurrence of a particular segment type, or to insert a segment as the last occurrence of a segment type.

The declaration of SSAs and the CBLTDLI call are as follows.

Declaration of SSAs.
01 SSA-SYNDEPT3.

```
01 SSA-SYNDEPT3.
    05 SSA-SYNDEPT3-SEG-NAME      PIC X(08)  VALUE
    'SYNDEPT'
    05 SSA-SYNDEPT3-CC            PIC XXX    VALUE '*L-'.
```

CBLTDLI Call

```
A200-GN-DEPT.
    CALL 'CBLTDLI' USING GN
        PCB-SYN10P    /*PCB Name
        SYNEMP-IO    /*I/O Area
        SSA-SYNDEPT3    /* SSA for parent
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

The database MS migration module maps the segment names with corresponding table names

| Segment | Table |
|---------|-------|
| SYNDEPT | SYN_DEPT |

The SYN_DEPT Table is defined as follows.

| Column | Data Type | Comments |
|--------|-----------|----------|
| SYN_DEPTNO | NUMERIC(3,0) | Primary Key |
| SYN_DNAME | VARCHAR(20) | |
| SYN_LOC | VARCHAR(20) | |

Initially, the user creates a mapping sheet with segment name and corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during DML query generation.

The database MS migration module then reads command code from SSA. The database MS migration module reads the command code at column 10 in the SSA of the parent segment, and constructs the DML query accordingly.
Call Details.
Call Type—SELECT
Command Code—L
Table names—SYN_DEPT
To generate a DML query, the database MS migration module locates CBLTDLI calls. Then, the database MS migration module identifies the IMS call type and map it to corresponding DML statement as shown below. In this example, GN is mapped to SQL SELECT statement.

| IMS Call | Description | SQL Statement |
|----------|-------------|---------------|
| GN | Get Next | SELECT |

The database MS migration module locates the segment definition of the segments passed as parameter in the CBLTDLI call.

Segment name is then mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is an unqualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. These mappings are stored in the metadata store during schema creation, and the mappings are referenced during DML query generation.

The database MS migration module also checks the relational and Boolean operators used in the SSA, and constructs the DML statement accordingly. In this example, relational and Boolean operators are not used in the SSA.

If the SSA is unqualified, there will not be any WHERE clause in the DML statement. In this example, the SSA is an unqualified SSA, and hence a WHERE clause is not used in the DML statement.

If command codes are used, the database MS migration module will construct the DML statement based on following criteria. Command code 'L' is used in this example,

| Command Code | Description | Generation of SQL statement |
|--------------|-------------|------------------------------|
| L | Last Occurrence | SQL query will be generated to fetch the last row from the table. |

The SQL queries are constructed as follows using above details.

```
EXEC SQL
    SELECT SYN_DNAME,SYN_LOC INTO
    :SYN-DNAME,SYN-LOC FROM SYN_DEPT ORDER BY
    SYN_DEPTNO FETCH LAST ROW ONLY;
END-EXEC
```

The following is an example embodiment of a call with qualified SSA with command code 'N'.

The N command code prevents from replacing a segment on a path call. It is used in conjunction with the D command code. It lets the application program to process multiple segments using one call. Alone, the D command code retrieves a path of segments in I/O area. With the N command code, the D command code lets you distinguish which segments you want to replace.

The declaration of SSAs and CBLTDLI call are as follows.
Declaration of SSA's.
SSA in Program
01 SSA-SYNDEPT3.

```
01 SSA-SYNDEPT3.
    05 SSA-SYNDEPT3-SEG-NAME    PIC X(08)  VALUE
    'SYNDEPT '
    05 SSA-SYNDEPT3-CC       PIC XXX    VALUE ' '.
    05 SSA-SYNDEPT3-LPAREN   PIC X(01)  VALUE '('.
    05 SSA-SYNDEPT3-DNO      PIC X(08)  VALUE 'DNO     '
    05 SSA-SYNDEPT3-RELOPR   PIC X(02)  VALUE 'EQ'.
    05 SSA-SYNDEPT3-KEY      PIC X(03)  VALUE SPACES.
    05 SSA-SYNDEPT3-RPAREN   PIC X(01)  VALUE ')'.
```

01 SSA-SYNEMP2.

```
05  SSA-SYNEMP2-SEG-NAME    PIC X(08) VALUE 'SYNEMP '
05  SSA-SYNEMP2-LPAREN      PIC X(01) VALUE '('.
05  SSA-SYNEMP2-ENO         PIC X(08) VALUE 'ENO     '
05  SSA-SYNEMP2-RELOPR      PIC X(02) VALUE 'EQ'.
05  SSA-SYNEMP2-KEY         PIC X(05) VALUE SPACES.
05  SSA-SYNEMP2-RPAREN      PIC X(01) VALUE ')'.
```

CBLTDLI Call

```
A100-REPL-SYNDEPT.
    MOVE 030 TO SSA-SYNDEPT2-KEY.
    MOVE '*D-' TO SSA-SYNDEPT3-CC
        CALL 'CBLTDLI' USING GHU
            PCB-SYN10P              /*PCB Name
            SYNDAT-IO               /*I/O Area
            SSA-SYNDEPT3            /* Qualified SSA for parent
            SSA-SYNEMP2             /* Qualified SSA for child
MOVE 100 TO SSA-SYNEMP2-ENO.
MOVE 'MANAGER' TO SYN-DESIGNATION.
MOVE '*N-' TO SSA-SYNDEPT3-CC
CALL 'CBLTDLI' USING REPL
        PCB-SYN10P              /*PCB Name
        SYNEMP                  /*I/O Area
        SSA-SYNDEPT3            /* SSA for parent
        SSA-SYNDEPT2            /* SSA for CHILD
```

During schema migration, each segment in the DBD is mapped to corresponding target database tables. By default, the name of target table is same as that of the source segment name. The database MS migration module allows the user to change the target table name if required. The Segment-RDBMS table mapping is stored in the metadata store during schema creation, and the mapping is referenced during DML generation.

The database MS migration module maps the segment names with corresponding table names

| Segment | Table |
|---|---|
| SYNDEPT | SYN_DEPT |
| SYNEMP | SYN_EMP |

The SYN_DEPT Table is defined as follows.

| Column | Data Type | Comments |
|---|---|---|
| SYN_DEPTNO | NUMERIC(3,0) | Primary Key |
| SYN_DNAME | VARCHAR(20) | |
| SYN_LOC | VARCHAR(20) | |

The SYN_EMP Table is defined as follows.

| Column | Data Type | Comments |
|---|---|---|
| SYN_EMPNO | NUMERIC(5,0) | Primary Key |
| SYN_ENAME | VARCHAR(20) | |
| SYN_DESIGNATION | VARCHAR(20) | |
| SYN_MANAGER | NUMERIC(5,0) | |
| SYN_SALARY | NUMERIC(7,2) | |
| SYN_DEPTNO | NUMERIC(3,0) | Foreign Key |

Initially, the user creates a mapping sheet with a segment name and a corresponding copybook name. During schema migration, the database MS migration module reads the segment name from DBD file, locates the segment copybook name in the mapping file, and reads the corresponding segment copybook file. The segment copybook field names are typically mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during DML query generation.

Call Details.
Call Type—UPDATE
Command Code—N
Table name—SYN_EMP

To generate an DML query, the database MS migration module locates CBLTDLI calls. The database MS migration module then identifies the IMS call type, and maps the IMS call type to a corresponding DML statement as shown below. In this example, REPL is mapped to SQL UPDATE statement.

| IMS Call | Description | SQL Statement |
|---|---|---|
| REPL | Replace | UPDATE |

The database MS migration module locates the segment definition of the segments passed as parameter in CBLTDLI call.

Segment name is then mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module checks whether the SSA is a basic SSA or SSA with command codes, and checks whether the SSA is a qualified SSA or unqualified SSA. If the 9th byte of SSA is space, then the SSAF is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes. If there is a '(' after command codes, then the SSA is considered as a qualified SSA with command codes. In this example, the SSA is a qualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search fields for the target RDBMS table. These mappings are stored in the metadata store during schema creation, and the mappings are referenced during DML query generation.

The database MS migration module also checks the relational and Boolean operators used in the SSA, and constructs the DML statement accordingly. In this example, '=' is the relational operator.

| Symbolic | Alphabetic | Operator in SQL statement |
|---|---|---|
| =b or b= | EQ | = |

Boolean operators are not used in this example.

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code 'N' is used in this example,

| Command Code | Description | Generation of SQL statement |
|---|---|---|
| N | Path call ignore | SQL statement will be generated to update corresponding table. |

The SQL queries are constructed as follows using above details.

```
EXEC SQL
    UPDATE SYN_EMP SET SYN_DESIGNATION=:SYN-DESIGNATION
    WHERE
    SYN_EMPNO=:SSA-SYNEMP2-KEY;
END-EXEC
```

The following is an example embodiment of a call with a qualified SSA and command code 'P'.

Usually, IMS sets parentage at the level of the lowest segment that is accessed during a call. P command code is used to set parentage at a higher level. P command code can be used in a GU, GN, or GNP call.

The declaration of SSAs and

Declaration of SSAs.

01 SSA-PATIENT.

| 05 | SSA-PATIENT-SEG-NAME | PIC X(08) VALUE 'PATIENT' |
| 05 | SSA-PATIENT-CC | PIC XXX VALUE ' '. |
| 05 | SSA-PATIENT-LPAREN | PIC X(01) VALUE '('. |
| 05 | SSA-PATIENT-PATNO | PIC X(08) VALUE 'PATNO ' |
| 05 | SSA-PATIENT-RELOPR | PIC X(02) VALUE 'EQ'. |
| 05 | SSA-PATIENT-KEY | PIC X(10) VALUE SPACES. |
| 05 | SSA-PATIENT-RPAREN | PIC X(01) VALUE ')'. |

01 SSA-ILLNESS.

| 05 | SSA-ILLNESS-SEG-NAME | PIC X(08) VALUE 'ILLNESS ' |
| 05 | SSA-ILLNESS-CC | PIC XXX VALUE ' '. |
| 05 | SSA-ILLNESS-LPAREN | PIC X(01) VALUE '('. |
| 05 | SSA-ILLNESS-ILLDT | PIC X(08) VALUE 'ILLDT ' |
| 05 | SSA-ILLNESS-RELOPR | PIC X(02) VALUE 'GE'. |
| 05 | SSA-ILLNESS-KEY | PIC X(08) VALUE SPACES. |
| 05 | SSA-ILLNESS-RPAREN | PIC X(01) VALUE ')'. |

01 SSA-TRTMENT.

| 05 | SSA-TRTMENT-SEG-NAME | PIC X(08) VALUE 'TRTMENT ' |
| 05 | SSA-TRTMENT-CC | PIC XXX VALUE ' '. |
| 05 | SSA-TRTMENT-LPAREN | PIC X(01) VALUE '('. |
| 05 | SSA-TRTMENT-TRTDT | PIC X(08) VALUE 'TRTDT ' |
| 05 | SSA-TRTMENT-RELOPR | PIC X(02) VALUE 'EQ'. |
| 05 | SSA-TRTMENT-KEY | PIC X(10) VALUE SPACES. |
| 05 | SSA-TRTMENT-RPAREN | PIC X(01) VALUE ')'. |

CBLTDLI Call

```
A200-PROCESS.
    MOVE '*P ' TO SSA-PATIENT-CC.
    MOVE '01012010' TO SSA-ILLNESS-KEY.
        CALL 'CBLTDLI' USING GN
            PCB-SYNPTP   /*PCB Name
            SYNIO        /*I/O Area
            SSA-PATIENT  /* SSA for parent
                SSA-ILLNESS /* SSA for first level child
```

The above GN call locates the patients whose ILLDATE>='01012010'.

```
CALL 'CBLTDLI' USING GNP
    PCB-SYNPTP   /*PCB Name
```

-continued

```
SYNIO         /*I/O Area
SSA-TRTMENT   /* SSA for second level child
```

The GNP call retrieves the patient's treatment details

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

The database MS migration module maps the segment names with corresponding table names

| Segment | Table |
|---------|-------|
| PATIENT | PATIENT |
| ILLNESS | ILLNESS |
| TRTMENT | TRTMENT |

The database MS migration module reads command code from SSA. The database MS migration module reads the command code at column 10 in the SSA of the parent segment, and constructs the DML query accordingly.

Then, the database MS migration module maps key/search fields of SSA with key/search columns in table.

Segment Definition in DBD
DBD   NAME=MEDICDB,ACCESS=(HDAM,OSAM),
      RMNAME=(DFSHDC40,2,21000)
DATASET    DD1=MEDICHDB,DEVICE=3380,
      SIZE=8192,FRSPC=(0,0)
SEGM NAME=PATIENT,BYTES=60,PARENT=0
FIELD NAME=(PATNO,SEQ,U),BYTES=10,START=1
SEGM            NAME=ILLNESS,BYTES=28,
      PARENT=PATIENT
FIELD NAME=(ILLDT,SEQ,U),BYTES=8,START=1
SEGM            NAME=TRTMENT,BYTES=55,
      PARENT=ILLNESS
FIELD NAME=(TRTDT,SEQ,M),BYTES=8,START=11
SSA in Program
01 SSA-PATIENT.

```
05  SSA-PATIENT-SEG-NAME    PIC X(08) VALUE 'PATIENT'
05  SSA-PATIENT-CC          PIC XXX VALUE ' '.
05  SSA-PATIENT-LPAREN      PIC X(01) VALUE '('.
05  SSA-PATIENT-PATNO       PIC X(08) VALUE 'PATNO '
05  SSA-PATIENT-RELOPR      PIC X(02) VALUE 'EQ'.
05  SSA-PATIENT-KEY         PIC X(10) VALUE SPACES.
05  SSA-PATIENT-RPAREN      PIC X(01) VALUE ')'.
```

01 SSA-ILLNESS.

```
05  SSA-ILLNESS-SEG-NAME    PIC X(08) VALUE 'ILLNESS '
05  SSA-ILLNESS-CC          PIC XXX VALUE ' '.
05  SSA-ILLNESS-LPAREN      PIC X(01) VALUE '('.
05  SSA-PATIENT-CC          PIC XXX VALUE ' '.
05  SSA-ILLNESS-ILLDT       PIC X(08) VALUE 'ILLDT '
05  SSA-ILLNESS-RELOPR      PIC X(02) VALUE 'GE'.
05  SSA-ILLNESS-KEY         PIC X(08) VALUE SPACES.
05  SSA-ILLNESS-RPAREN      PIC X(01) VALUE ')'.
```

01 SSA-TRTMENT.

```
05  SSA-TRTMENT-SEG-NAME    PIC X(08) VALUE 'TRTMENT '
05  SSA-TRTMENT-CC          PIC XXX VALUE ' '.
05  SSA-TRTMENT-LPAREN      PIC X(01) VALUE '('.
05  SSA-TRTMENT-TRTDT       PIC X(08) VALUE 'TRTDT '
05  SSA-TRTMENT-RELOPR      PIC X(02) VALUE 'EQ'.
05  SSA-TRTMENT-KEY         PIC X(10) VALUE SPACES.
05  SSA-TRTMENT-RPAREN      PIC X(01) VALUE ')'.
```

Copybooks
01 PATIENT.

```
05 PATIENTNO    PIC 9(10).
05 NAME         PIC X(20).
05 ADDRESS      PIC X(30).
```

01 ILLNESS.

```
05 ILLDATE      PIC 9(08).
05 ILLNAME      PIC X(20).
```

01 TRTMENT.

```
05 SEQNO        PIC 9(10),
05 TRTMNTDT     PIC 9(10),
05 MEDICINE     PIC X(20),
05 QUANTITY     PIC 9(5),
05 DOCTOR       PIC X(10),
```

The PATIENT Table is defined as follows.

| Column | Data Type | Comments |
|--------|-----------|----------|
| PATIENTNO | NUMERIC(10,0) | Primary Key |
| NAME | VARCHAR(20) | |
| ADDRESS | VARCHAR(30) | |

The ILLNESS Table is defined as follows.

| Column | Data Type | Comments |
|--------|-----------|----------|
| ILLDATE | NUMERIC(8,0) | Primary Key |
| ILLNAME | VARCHAR(20) | |
| PATIENTNO | NUMERIC(10,0) | Foreign key |

The TRTMENT Table is defined as follows.

| Column | Data Type | Comments |
|--------|-----------|----------|
| SEQNO | NUMERIC(10,0) | Primary Key |
| TRTMNTDT | NUMERIC(10,0) | |
| MEDICINE | VARCHAR(20) | |
| QUANTITY | NUMERIC(5,0) | |
| DOCTOR | VARCHAR(10) | |
| ILLDATE | NUMERIC(8,0) | Foreign Key |

Initially, the user creates a mapping sheet with the segment name and the corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in a target RDBMS column. The database MS migration module also allows the user to change the target table column name if required. The mapping of segment copybook fields and target table columns is stored in the metadata store, and the mapping is referenced during DML query generation.

Call Details.
Call Type—SELECT
Command Code—P
Table names—TRTMNT
Search Column—ILLDATE,
Relational Operator—GE
Search value—SSA-ILLNESS-KEY To generate a DML query, the database MS migration module locates CBLTDLI calls. The database MS migration module then identified the IMS call type, and maps the IMS call type to a corresponding DML statement as shown below. In this example, a GN call followed by a GNP call is used, and the calls are mapped to SQL SELECT statement.

| IMS Call | Description | SQL Statement |
|---|---|---|
| GN | Get Next | SELECT |
| GNP | Get Next within Parent | SELECT |

Next, the database MS migration module locates the segment definition of the segments passed as parameter in CBLTDLI call.

Segment name is mapped to a target RDBMS table. During schema migration, each segment in the DBD is mapped to corresponding target database tables. By default, the name of the target table is same as that of the source segment name. The database MS migration module allows the user to change the target table name if required. The segment-RDBMS table mapping is stored in the metadata store, and the mapping is referenced while generating a DML query.

The database MS migration module checks whether the SSA is a basic SSA or SSA with command codes, and the database MS migration module checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a qualified SSA with a command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. These mappings are stored in the metadata store during schema creation and the mappings are referenced during DML query generation.

The database MS migration module also checks the relational and Boolean operators used in the SSA and constructs the DML statement accordingly. In this example, '>=' is the relational operator.

| Symbolic | Alphabetic | Operator in SQL statement |
|---|---|---|
| >= or => | GE | >= |

Boolean Operators are not Used in this Example

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code 'P' is used in this example,

| Command Code | Description | Generation of SQL statement |
|---|---|---|
| P | Set parentage | SQL query will be generated to retrieve data from corresponding table. |

GN and GNP calls can be combined and replaced with the following SQL query.

```
EXEX SQL
    SELECT ILLDATE,TRTMNTDT,MEDICINE,QUANTITY,DOCTOR FROM
    TRTMENT WHERE ILLDATE>=:SSA-ILLNESS-KEY;
END-EXEC
```

The following is an example embodiment of a call with a qualified SSA with command code 'Q'.

The Q command code tells the IMS that the application program needs to work with a segment and that no other tasks can be allowed to modify the segment until the program has finished.

The declaration of SSAs and the CBLTDLI call are as follows.

Declaration of SSAs.
01 SSA-PATIENT.

| 05 | SSA-PATIENT-SEG-NAME | PIC X(08) VALUE 'PATIENT' |
| 05 | SSA-PATIENT-CC | PIC XXX VALUE ' '. |
| 05 | SSA-PATIENT-LPAREN | PIC X(01) VALUE '('. |
| 05 | SSA-PATIENT-PATNO | PIC X(08) VALUE 'PATNO '. |
| 05 | SSA-PATIENT-RELOPR | PIC X(02) VALUE 'EQ'. |
| 05 | SSA-PATIENT-KEY | PIC X(10) VALUE SPACES. |
| 05 | SSA-PATIENT-RPAREN | PIC X(01) VALUE ')'. |

01 SSA-ILLNESS.

| 05 | SSA-ILLNESS-SEG-NAME | PIC X(08) VALUE 'ILLNESS ' |
| 05 | SSA-ILLNESS-CC | PIC XXX VALUE ' '. |
| 05 | SSA-ILLNESS-LPAREN | PIC X(01) VALUE '('. |
| 05 | SSA-ILLNESS-ILLDT | PIC X(08) VALUE 'ILLDT '. |
| 05 | SSA-ILLNESS-RELOPR | PIC X(02) VALUE 'EQ'. |

-continued

| 05 | SSA-ILLNESS-KEY | PIC X(08) VALUE SPACES. |
| 05 | SSA-ILLNESS-RPAREN | PIC X(01) VALUE ')'. |

01 SSA-TRTMENT.

| 05 | SSA-TRTMENT-SEG-NAME | PIC X(08) VALUE 'TRTMENT ' |
| 05 | SSA-TRTMENT-CC | PIC XXX VALUE ' '. |
| 05 | SSA-TRTMENT-LPAREN | PIC X(01) VALUE '('. |
| 05 | SSA-TRTMENT-TRTDT | PIC X(08) VALUE 'TRTDT ' |
| 05 | SSA-TRTMENT-RELOPR | PIC X(02) VALUE 'EQ'. |
| 05 | SSA-TRTMENT-KEY | PIC X(10) VALUE SPACES. |
| 05 | SSA-TRTMENT-RPAREN | PIC X(01) VALUE ')'. |

CBLTDLI Call

```
A200-PROCESS.
    MOVE '*QA' TO SSA-TRTMENT-CC.
    MOVE '01012010' TO SSA-TRTMENT-KEY.
    CALL 'CBLTDLI' USING GN
        PCB-SYNPTP   /*PCB Name
        SYNIO        /*I/O Area
        SSA-PATIENT  /* SSA for parent
            SSA-ILLNESS  /* SSA for first level child
            SSA-TRTMENT  /* SSA for second level
                         child
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

The database MS migration module maps the segment names with corresponding table names

| Segment | Table |
| --- | --- |
| PATIENT | PATIENT |
| ILLNESS | ILLNESS |
| TRTMENT | TRTMENT |

Then, the database MS migration module reads command code from the SSA. The database MS migration module reads the command code at column 10 in the SSA of the parent segment, and constructs the DML query accordingly.

The database MS migration module maps key/search fields of the SSA with key/search columns in the table.

Segment Definition in DBD

DBD NAME=MEDICDB,ACCESS=(HDAM,OSAM), RMNAME=(DFSHDC40,2,21000)

DATASET DD1=MEDICHDB,DEVICE=3380, SIZE=8192,FRSPC=(0,0)

SEGM NAME=PATIENT,BYTES=60,PARENT=0

FIELD NAME=(PATNO,SEQ,U),BYTES=10,START=1

SEGM NAME=ILLNESS,BYTES=28, PARENT=PATIENT

FIELD NAME=(ILLDT,SEQ,U),BYTES=8,START=1

SEGM NAME=TRTMENT,BYTES=55, PARENT=ILLNESS

FIELD NAME=(TRTDT,SEQ,M),BYTES=8,START=11

SSA in Program

01 SSA-PATIENT.

| 05 | SSA-PATIENT-SEG-NAME | PIC X(08) VALUE 'PATIENT' |
| 05 | SSA-PATIENT-CC | PIC XXX VALUE ' '. |
| 05 | SSA-PATIENT-LPAREN | PIC X(01) VALUE '('. |
| 05 | SSA-PATIENT-PATNO | PIC X(08) VALUE 'PATNO ' |
| 05 | SSA-PATIENT-RELOPR | PIC X(02) VALUE 'EQ'. |
| 05 | SSA-PATIENT-KEY | PIC X(10) VALUE SPACES. |
| 05 | SSA-PATIENT-RPAREN | PIC X(01) VALUE ')'. |

01 SSA-ILLNESS.

| 05 | SSA-ILLNESS-SEG-NAME | PIC X(08) VALUE 'ILLNESS ' |
| 05 | SSA-ILLNESS-CC | PIC XXX VALUE ' '. |
| 05 | SSA-ILLNESS-LPAREN | PIC X(01) VALUE '('. |
| 05 | SSA-PATIENT-CC | PIC XXX VALUE ' '. |
| 05 | SSA-ILLNESS-ILLDT | PIC X(08) VALUE 'ILLDT ' |
| 05 | SSA-ILLNESS-RELOPR | PIC X(02) VALUE 'GE'. |
| 05 | SSA-ILLNESS-KEY | PIC X(08) VALUE SPACES. |
| 05 | SSA-ILLNESS-RPAREN | PIC X(01) VALUE ')'. |

01 SSA-TRTMENT.

| 05 | SSA-TRTMENT-SEG-NAME | PIC X(08) VALUE 'TRTMENT ' |
| 05 | SSA-TRTMENT-CC | PIC XXX VALUE ' '. |
| 05 | SSA-TRTMENT-LPAREN | PIC X(01) VALUE '('. |
| 05 | SSA-TRTMENT-TRTDT | PIC X(08) VALUE 'TRTDT ' |
| 05 | SSA-TRTMENT-RELOPR | PIC X(02) VALUE 'EQ'. |
| 05 | SSA-TRTMENT-KEY | PIC X(10) VALUE SPACES. |
| 05 | SSA-TRTMENT-RPAREN | PIC X(01) VALUE ')'. |

Copybooks
01 PATIENT.

|  |  |
|---|---|
| 05 PATIENTNO | PIC 9(10), |
| 05 NAME | PIC X(20), |
| 05 ADDRESS | PIC X(30), |

01 ILLNESS.

|  |  |
|---|---|
| 05 ILLDATE | PIC 9(08), |
| 05 ILLNAME | PIC X(20), |

01 TRTMENT.

|  |  |
|---|---|
| 05 SEQNO | PIC 9(10), |
| 05 TRTMNTDT | PIC 9(10), |
| 05 MEDICINE | PIC X(20), |
| 05 QUANTITY | PIC 9(5), |
| 05 DOCTOR | PIC X(10), |

The PATIENT Table is defined as follows.

| Column | Data Type | Comments |
|---|---|---|
| PATIENTNO | NUMERIC(10,0) | Primary Key |
| NAME | VARCHAR(20) | |
| ADDRESS | VARCHAR(30) | |

The ILLNESS Table is defined as follows.

| Column | Data Type | Comments |
|---|---|---|
| ILLDATE | NUMERIC(8,0) | Primary Key |
| ILLNAME | VARCHAR(20) | |
| PATIENTNO | NUMERIC(10,0) | Foreign key |

The TRTMENT Table is defined as follows.

| Column | Data Type | Comments |
|---|---|---|
| SEQNO | NUMERIC(10,0) | Primary Key |
| TRTMNTDT | NUMERIC(10,0) | |
| MEDICINE | VARCHAR(20) | |
| QUANTITY | NUMERIC(5,0) | |
| DOCTOR | VARCHAR(10) | |
| ILLDATE | NUMERIC(8,0) | Foreign Key |

Initially, the user creates a mapping sheet with a segment name and a corresponding copybook name. During schema migration, the database MS migration module reads the segment name from DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during the DML query generation.
  Call Details.
  Call Type—SELECT
  Command Code—Q
  Table names—TRTMNT
  Search Column—TRTMNTDT
  Relational Operator—GE
  Search value—SSA-TRTMENT-KEY To generate a DML query, the database MS migration module locates CBLTDLI calls. The database MS migration module then identifies the IMS call type, and maps the IMS call type to a corresponding DML statement as shown below. In this example, a GN call is mapped to a SQL SELECT statement.

| IMS Call | Description | SQL Statement |
|---|---|---|
| GN | Get Next | SELECT |

Next, the database MS migration module locates the segment definition of the segments passed as parameter in CBLTDLI call.

Segment name is mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating the DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a qualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. These mappings are stored in the metadata store during schema creation, and the mappings are referenced during DML query generation.

The database MS migration module also checks the relational and Boolean operators used in the SSA, and constructs the DML statement accordingly. Below is the mapping of relational operators in the IMS call and the corresponding operator in the DML statement. In this example, '>=' is the relational operator.

| Symbolic | Alphabetic | Operator in SQL statement |
|---|---|---|
| >= | GE | >= |

Boolean operators are not used in this example.

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code 'Q' is used in this example,

| Command Code | Description | Generation of SQL statement |
|---|---|---|
| Q | Enqueue segment | Cursor WITH HOLD option or SELECT... FOR UPDATE option will be used while generating the SQL statement. |

The Cursor will be declared as follows

```
EXEX SQL
    DECLARE CURSOR TRTCURSOR WITH HOLD FOR
    SELECT TRTMNTDT,MEDICINE,QUANTITY,DOCTOR,ILLDATE
    FROM TRTMENT WHERE TRTMNTDT>=:SSA-TRTMENT-KEY;
END-EXEC
```

The following is an example embodiment of a GN Call with a qualified SSA with command code 'U'.

The U command code prevents position from being moved from a segment during a search of its hierarchic dependents.

The declaration of SSAs and CBLTDLI call are as follows.
Declaration of SSAs.
01 SSA-PATIENT.

```
05   SSA-PATIENT-SEG-NAME      PIC X(08) VALUE 'PATIENT'
05   SSA-PATIENT-CC            PIC XXX VALUE ' '.
05   SSA-PATIENT-LPAREN        PIC X(01) VALUE '('.
05   SSA-PATIENT-PATNO         PIC X(08) VALUE 'PATNO '
05   SSA-PATIENT-RELOPR        PIC X(02) VALUE 'EQ'.
05   SSA-PATIENT-KEY           PIC X(10) VALUE SPACES.
05   SSA-PATIENT-RPAREN        PIC X(01) VALUE ')'.
```

01 SSA-ILLNESS.

```
05   SSA-ILLNESS-SEG-NAME      PIC X(08) VALUE 'ILLNESS '
05   SSA-ILLNESS-CC            PIC XXX VALUE ' '.
05   SSA-ILLNESS-LPAREN        PIC X(01) VALUE '('.
05   SSA-ILLNESS-ILLDT         PIC X(08) VALUE 'ILLDT '
05   SSA-ILLNESS-RELOPR        PIC X(02) VALUE 'EQ'.
05   SSA-ILLNESS-KEY           PIC X(08) VALUE SPACES.
05   SSA-ILLNESS-RPAREN        PIC X(01) VALUE ')'.
```

01 SSA-TRTMENT.

```
05   SSA-TRTMENT-SEG-NAME      PIC X(08) VALUE 'TRTMENT '
05   SSA-TRTMENT-CC            PIC XXX VALUE ' '.
05   SSA-TRTMENT-LPAREN        PIC X(01) VALUE '('.
05   SSA-TRTMENT-TRTDT         PIC X(08) VALUE 'TRTDT '
05   SSA-TRTMENT-RELOPR        PIC X(02) VALUE 'EQ'.
05   SSA-TRTMENT-KEY           PIC X(10) VALUE SPACES.
05   SSA-TRTMENT-RPAREN        PIC X(01) VALUE ')'.
```

CBLTDLI Call

```
A200-PROCESS.
    MOVE 10005 TO SSA-PATIENT-KEY.
    MOVE '01012010' TO SSA-ILLNESS-KEY.
    CALL 'CBLTDLI' USING GU
```

```
        PCB-SYNPTP   /*PCB Name
        SYNIO        /*I/O Area
        SSA-PATIENT  /* SSA for parent
            SSA-ILLNESS /* SSA for first level child
```

The above GU call retrieves the illness segment of patient 10005 for ILLDATE '01012010'. To retrieve all the treatment segment occurrences that are associated with the ILLNESS segment, the below GN call is issued with command code 'U'.

```
MOVE '*U ' TO SSA-PATIENT-KEY.
MOVE '*U ' TO SSA-ILLNESS-KEY.
CALL 'CBLTDLI' USING GN
    PCB-SYNPTP   /*PCB Name
    SYNIO        /*I/O Area
    SSA-PATIENT  /* SSA for parent
        SSA-ILLNESS /* SSA for first level child
        SSA-TRTMENT /* SSA for second level child
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during the DML generation.

The database MS migration module maps the segment names with corresponding table names

| Segment | Table |
|---|---|
| PATIENT | PATIENT |
| ILLNESS | ILLNESS |
| TRTMENT | TRTMENT |

The database MS migration module reads a command code from SSA. The database MS migration module reads the command code at column 10 in the SSA of the parent segment, and constructs the DML query accordingly. Command code U is to maintain position at the current level.

The database MS migration module maps key/search fields of SSA with key/search columns in table.

Segment definition in DBD
  DBD   NAME=MEDICDB,ACCESS=(HDAM,OSAM),
      RMNAME=(DFSHDC40,2,21000)

```
DATASET     DD1=MEDICHDB,DEVICE=3380,
    SIZE=8192,FRSPC=(0,0)
SEGM NAME=PATIENT,BYTES=60,PARENT=0
FIELD NAME=(PATNO,SEQ,U),BYTES=10,START=1
SEGM            NAME=ILLNESS,BYTES=28,
    PARENT=PATIENT
FIELD NAME=(ILLDT,SEQ,U),BYTES=8,START=1
SEGM            NAME=TRTMENT,BYTES=55,
    PARENT=ILLNESS
FIELD NAME=(TRTDT,SEQ,M),BYTES=8,START=11
SSA in Program
01 SSA-PATIENT.
```

```
01 SSA-PATIENT.
    05 SSA-PATIENT-SEG-NAME    PIC X(08)   VALUE
    'PATIENT'
    05 SSA-PATIENT-CC       PIC XXX   VALUE ' '.
    05 SSA-PATIENT-LPAREN     PIC X(01)  VALUE '('.
    05 SSA-PATIENT-PATNO      PIC X(08)  VALUE 'PATNO '
    05 SSA-PATIENT-RELOPR     PIC X(02)  VALUE 'EQ'.
    05 SSA-PATIENT-KEY        PIC X(10)  VALUE SPACES.
    05 SSA-PATIENT-RPAREN     PIC X(01)  VALUE ')'.
```

01 SSA-ILLNESS.

```
01 SSA-ILLNESS.
    05 SSA-ILLNESS-SEG-NAME    PIC X(08)   VALUE
    'ILLNESS '
    05 SSA-ILLNESS-CC       PIC XXX   VALUE ' '.
    05 SSA-ILLNESS-LPAREN     PIC X(01)  VALUE '('.
    05 SSA-PATIENT-CC       PIC XXX   VALUE ' '.
    05 SSA-ILLNESS-ILLDT      PIC X(08)  VALUE 'ILLDT '
    05 SSA-ILLNESS-RELOPR     PIC X(02)  VALUE 'EQ'.
    05 SSA-ILLNESS-KEY        PIC X(08)  VALUE SPACES
    05 SSA-ILLNESS-RPAREN     PIC X(01)  VALUE ')'.
```

01 SSA-TRTMENT.

```
05 SSA-TRTMENT-SEG-NAME    PIC X(08) VALUE 'TRTMENT '
05 SSA-TRTMENT-CC          PIC XXX VALUE ' '.
05 SSA-TRTMENT-LPAREN      PIC X(01) VALUE '('.
05 SSA-TRTMENT-TRTDT       PIC X(08) VALUE 'TRTDT   '
05 SSA-TRTMENT-RELOPR      PIC X(02) VALUE 'EQ'.
05 SSA-TRTMENT-KEY         PIC X(10) VALUE SPACES.
05 SSA-TRTMENT-RPAREN      PIC X(01) VALUE ')'.
```

Copybooks
01 PATIENT.

```
    05 PATIENTNO       PIC 9 (10).
    05 NAME            PIC X (20).
    05 ADDRESS         PIC X (30).
```

01 ILLNESS.

```
    05 ILLDATE         PIC 9 (08).
    05 ILLNAME         PIC X (20).
```

01 TRTMENT.

```
    05 SEQNO           PIC 9 (10).
    05 TRTMNTDT        PIC 9 (10).
    05 MEDICINE        PIC X (20).
    05 QUANTITY        PIC 9 (5).
    05 DOCTOR          PIC X (10).
```

The PATIENT Table is defined as follows.

| Column | Data Type | Comments |
| --- | --- | --- |
| PATIENTNO | NUMERIC (10, 0) | Primary Key |
| NAME | VARCHAR (20) | |
| ADDRESS | VARCHAR (30) | |

The ILLNESS Table is defined as follows.

| Column | Data Type | Comments |
| --- | --- | --- |
| ILLDATE | NUMERIC (8, 0) | Primary Key |
| ILLNAME | VARCHAR (20) | |
| PATIENTNO | NUMERIC (10, 0) | Foreign key |

The TRTMENT Table is defined as follows.

| Column | Data Type | Comments |
| --- | --- | --- |
| SEQNO | NUMERIC (10, 0) | Primary Key |
| TRTMNTDT | NUMERIC (10, 0) | Primary Key |
| MEDICINE | VARCHAR (20) | |
| QUANTITY | NUMERIC (5, 0) | |
| DOCTOR | VARCHAR (1, 0) | |
| ILLDATE | NUMERIC (8, 0) | Foreign Key |

Initially, the user creates a mapping sheet with a segment name and a corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If a segment field name contains hyphens, they will be replaced with underscores in target RDBMS column. The database MS migration module also allows the user to change the target table column name if required. The mapping of segment copybook fields and target table columns is stored in the metadata store, and the mapping is referenced during DML query generation.

Call Details.

Call Type—SELECT

Command Code—U

Table names—PATIENT, ILLNESS, TRTMNT

Search Column—PATIENTNO, ILLDATE,

Relational Operator—EQ

Search value—SSA-PATIENT-KEY, SSA-ILLNESS-KEY

To generate an DML query, the database MS migration module locates CBLTDLI calls, and identifies the IMS call type and maps the IMS call type to a corresponding DML statement as shown below. In this example, the GN call is used and the GN call is mapped to a SQL SELECT statement.

| IMS Call | Description | SQL Statement |
|---|---|---|
| GN | Get Next | SELECT |

The database MS migration module locates the segment definition of the segments passed as parameter in CBLTDLI call.

Segment name is mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating a DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a qualified SSA with command code.

If it is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search fields for the target RDBMS table. These mappings are stored in the metadata store during schema creation, and the mappings are referenced during DML query generation.

The database MS migration module also checks the relational and Boolean operators used in the SSA, and constructs the DML statement accordingly. In this example, '=' is the relational operator.

| Symbolic | Alphabetic | Operator in SQL statement |
|---|---|---|
| =b or b= | EQ | = |

Boolean Operators are not Used in this Example

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code 'U' is used in this example,

| Command Code | Description | Generation of SQL statement |
|---|---|---|
| U | Maintain position at this level | SQL query will be generated by joining parent and child tables. |

GU and GN calls can be combined and replaced with the below SQL query.

```
EXEC SQL
    SELECT ILLNESS.ILLDATE,TRTMNTDT,MEDICINE,QUANTITY,DOCTOR
    FROK ILLNESS,TRTMENT WHERE PATIENTNO=:SSA-PATIENT-KEY and
    ILLNESS.ILLDATE=:SSA-ILLNESS-KEY and
    ILLNESS.ILLDATE=TRTMENT.ILLDATE;
END-EXEC
```

The following is an example embodiment of a GN Call with a qualified SSA with command code 'V'.

Using the V command code on an SSA is similar to using a U command code in that SSA and all preceding SSAs. Specifying the V command code for a segment level tells IMS that you want to use the position that is established at that level and above as qualification for the call.

The declaration of SSAs and CBLTDLI call are as follows.

Declaration of SSAs.

01 SSA-PATIENT.

| | |
|---|---|
| 05 SSA-PATIENT-SEG-NAME | PIC X(08) VALUE 'PATIENT' |
| 05 SSA-PATIENT-CC | PIC XXX VALUE ' '. |
| 05 SSA-PATIENT-LPAREN | PIC X(01) VALUE '('. |
| 05 SSA-PATIENT-PATNO | PIC X(08) VALUE 'PATNO   ' |
| 05 SSA-PATIENT-RELOPR | PIC X(02) VALUE 'EQ'. |
| 05 SSA-PATIENT-KEY | PIC X(10) VALUE SPACES. |
| 05 SSA-PATIENT-RPAREN | PIC X(01) VALUE ')'. |

01 SSA-ILLNESS.

| | |
|---|---|
| 05 SSA-ILLNESS-SEG-NAME | PIC X(08) VALUE 'ILLNESS ' |
| 05 SSA-ILLNESS-CC | PIC XXX VALUE ' '. |
| 05 SSA-ILLNESS-LPAREN | PIC X(01) VALUE '('. |
| 05 SSA-ILLNESS-ILLDT | PIC X(08) VALUE 'ILLDT   ' |
| 05 SSA-ILLNESS-RELOPR | PIC X(02) VALUE 'EQ'. |
| 05 SSA-ILLNESS-KEY | PIC X(08) VALUE SPACES. |
| 05 SSA-ILLNESS-RPAREN | PIC X(01) VALUE ')'. |

01 SSA-TRTMENT.

| | |
|---|---|
| 05 SSA-TRTMENT-SEG-NAME | PIC X(08) VALUE 'TRTMENT ' |
| 05 SSA-TRTMENT-CC | PIC XXX VALUE ' '. |
| 05 SSA-TRTMENT-LPAREN | PIC X(01) VALUE '('. |
| 05 SSA-TRTMENT-TRTDT | PIC X(08) VALUE 'TRTDT   ' |
| 05 SSA-TRTMENT-RELOPR | PIC X(02) VALUE 'EQ'. |
| 05 SSA-TRTMENT-KEY | PIC X(10) VALUE SPACES. |
| 05 SSA-TRTMENT-RPAREN | PIC X(01) VALUE ')'. |

CBLTDLI Call

```
A200-PROCESS.
    MOVE 10005 TO SSA-PATIENT-KEY.
    MOVE '01012010' TO SSA-ILLNESS-KEY.
        CALL 'CBLTDLI' USING GU
            PCB-SYNPTP    /*PCB Name
```

```
        SYNIO      /*I/O Area
        SSA-PATIENT    /* SSA for parent
            SSA-ILLNESS    /* SSA for first level child
                SSA-TRTMENT    /* SSA for second level child
```

The above GU call retrieves the illness segment of patient 10005 for ILLDATE '01012010'. To retrieve all the treatment segment occurrences that are associated with the ILLNESS segment, the below GN call is issued with command code 'V'.

```
        MOVE '*V ' TO SSA-ILLNESS-KEY.
        CALL 'CBLTDLI' USING GN
            PCB-SYNPTP    /*PCB Name
            SYNIO    /*I/O Area
            SSA-PATIENT    /* SSA for parent
                SSA-ILLNESS    /* SSA for first level child
                SSA-TRTMENT    /* SSA for second level child
```

During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during the DML generation.

The database MS migration module maps the segment names with corresponding table names

| Segment | Table |
|---------|-------|
| PATIENT | PATIENT |
| ILLNESS | ILLNESS |
| TRTMENT | TRTMENT |

The database MS migration module reads command code from SSA. In particular, the database MS migration module reads the command code at column 10 in the SSA of parent segment, and constructs the DML query accordingly. Command code V is used to maintain position at the current level and all above levels.

The database MS migration module then maps key/search fields of SSA with key/search columns in the table.

Segment Definition in DBD
DBD   NAME=MEDICDB,ACCESS=(HDAM,OSAM),
    RMNAME=(DFSHDC40,2,21000)
DATASET   DD1=MEDICHDB,DEVICE=3380,
    SIZE=8192,FRSPC=(0,0)
SEGM NAME=PATIENT,BYTES=60,PARENT=0
FIELD NAME=(PATNO,SEQ,U),BYTES=10,START=1
SEGM             NAME=ILLNESS,BYTES=28,
    PARENT=PATIENT
FIELD NAME=(ILLDT,SEQ,U),BYTES=8,START=1
SEGM             NAME=TRTMENT,BYTES=55,
    PARENT=ILLNESS
FIELD NAME=(TRTDT,SEQ,M),BYTES=8,START=11
SSA in Program
01 SSA-PATIENT.

```
05 SSA-PATIENT-SEG-NAME     PIC X(08) VALUE 'PATIENT'
05 SSA-PATIENT-CC           PIC XXX VALUE ' '.
05 SSA-PATIENT-LPAREN       PIC X(01) VALUE '('.
05 SSA-PATIENT-PATNO        PIC X(08) VALUE 'PATNO   '
05 SSA-PATIENT-RELOPR       PIC X(02) VALUE 'EQ'.
05 SSA-PATIENT-KEY          PIC X(10) VALUE SPACES.
05 SSA-PATIENT-RPAREN       PIC X(01) VALUE ')'.
```

01 SSA-ILLNESS.

```
05 SSA-ILLNESS-SEG-NAME     PIC X(08) VALUE 'ILLNESS '
05 SSA-ILLNESS-CC           PIC XXX VALUE ' '.
05 SSA-ILLNESS-LPAREN       PIC X(01) VALUE '('.
05 SSA-ILLNESS-CC           PIC XXX VALUE ' '.
05 SSA-ILLNESS-ILLDT        PIC X(08) VALUE 'ILLDT   '
05 SSA-ILLNESS-RELOPR       PIC X(02) VALUE 'EQ'.
05 SSA-ILLNESS-KEY          PIC X(08) VALUE SPACES.
05 SSA-ILLNESS-RPAREN       PIC X(01) VALUE ')'.
```

01 SSA-TRTMENT.

```
05 SSA-TRTMENT-SEG-NAME     PIC X(08) VALUE 'TRTMENT '
05 SSA-TRTMENT-CC           PIC XXX VALUE ' '.
05 SSA-TRTMENT-LPAREN       PIC X(01) VALUE '('.
05 SSA-TRTMENT-TRTDT        PIC X(08) VALUE 'TRTDT   '
05 SSA-TRTMENT-RELOPR       PIC X(02) VALUE 'EQ'.
05 SSA-TRTMENT-KEY          PIC X(10) VALUE SPACES.
05 SSA-TRTMENT-RPAREN       PIC X(01) VALUE ')'.
```

Copybooks
01 PATIENT.

```
05 PATIENTNO    PIC 9 (10).
05 NAME         PIC X (20).
05 ADDRESS      PIC X (30).
```

01 ILLNESS.

```
05 ILLDATE      PIC 9 (08).
05 ILLNAME      PIC X (20).
```

01 TRTMENT.

```
05 SEQNO        PIC 9 (10).
05 TRTMNTDT     PIC 9 (10).
05 MEDICINE     PIC X (20).
05 QUANTITY    PIC 9 (5).
05 DOCTOR       PIC X (10).
```

The PATIENT Table is defined as follows.

| Column | Data Type | Comments |
|--------|-----------|----------|
| PATIENTNO | NUMERIC (10, 0) | Primary Key |
| NAME | VARCHAR (20) | |
| ADDRESS | VARCHAR (30) | |

The ILLNESS Table is defined as follows.

| Column | Data Type | Comments |
|--------|-----------|----------|
| ILLDATE | NUMERIC (8, 0) | Primary Key |
| ILLNAME | VARCHAR (20) | |
| PATIENTNO | NUMERIC (10, 0) | Foreign key |

The TRTMENT Table is defined as follows.

| Column | Data Type | Comments |
|---|---|---|
| SEQNO | NUMERIC (10, 0) | Primary Key |
| TRTMNTDT | NUMERIC (10, 0) | |
| MEDICINE | VARCHAR (20) | |
| QUANTITY | NUMERIC (5, 0) | |
| DOCTOR | VARCHAR (10) | |
| ILLDATE | NUMERIC (8, 0) | Foreign Key |

Initially, the user creates a mapping sheet with a segment name and a corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata store, and the mapping is referenced during the DML query generation.

Call Details.
Call Type—SELECT
Command Code—V
Table names—PATIENT, ILLNESS, TRTMNT
Search Column—PATIENTNO, ILLDATE,
Relational Operator—EQ
Search value—SSA-PATIENT-KEY, SSA-ILLNESS-KEY To generate a DML query, the database MS migration module locates CBLTDLI calls.

The database MS migration module identifies the IMS call type, and maps the database MS migration module to a corresponding DML statement as shown below. In this example, the GU/GN call is used, and the GU/GN call is mapped to a SQL SELECT statement.

| IMS Call | Description | SQL Statement |
|---|---|---|
| GU | Get Unique | SELECT |
| GN | Get Next | SELECT |

The database MS migration module then locates the segment definition of the segments passed as parameter in CBLTDLI call.

Segment name is mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating the DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a qualified SSA with command code.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. These mappings are stored in the metadata store during schema creation, and the mappings are referenced during DML query generation.

The database MS migration module also checks the relational and Boolean operators used in the SSA and constructs the DML statement accordingly. In this example, '=' is the relational operator.

| Symbolic | Alphabetic | Operator in SQL statement |
|---|---|---|
| =b or b= | EQ | = |

Boolean operators are not used in this example.

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code 'V' is used in this example,

| Command Code | Description | Generation of SQL statement |
|---|---|---|
| V | Maintain position at this and all above levels | SQL query will be generated by joining parent and child tables. Please refer example 6.10 |

GU and GN calls can be combined and replaced with the below SQL query.

```
EXEX SQL
    SELECT ILLNESS.ILLDATE,TRTMNTDT,MEDICINE, QUANTITY,DOCTOR
    FROM ILLNESS,TRTMENT WHERE PATIENTNO=:SSA-PATIENT-KEY AND
    ILLNESS.ILLDATE=:SSA-ILLNESS-KEY AND
    ILLNESS.ILLDATE=TRTMENT.ILLDATE;
END-EXEC
```

The following is an example embodiment of a GU Call with a qualified SSA with the NULL command code '-'.

The Null command code resets the command code previously used in the SSA.

The declaration of SSAs and the CBLTDLI call are as follows.
Declaration of SSAs 01 SSA-SYNDEPT3.

| | |
|---|---|
| 05 SSA-SYNDEPT3-SEG-NAME | PIC X(08) VALUE 'SYNDEPT' |
| 05 SSA-SYNDEPT3-CC | PIC XXX VALUE '*--'. |
| 05 SSA-SYNDEPT3-LPAREN | PIC X(01) VALUE '('. |
| 05 SSA-SYNDEPT3-DNO | PIC X(08) VALUE 'DNO ' |
| 05 SSA-SYNDEPT3-RELOPR | PIC X(02) VALUE 'EQ'. |
| 05 SSA-SYNDEPT3-KEY | PIC X(03) VALUE SPACES. |
| 05 SSA-SYNDEPT3-RPAREN | PIC X(01) VALUE ')'. |

01 SSA-SYNDEPT3.

| | |
|---|---|
| 05 SSA-SYNEMP2-SEG-NAME | PIC X(08) VALUE 'SYNEMP ' |
| 05 SSA-SYNEMP2-LPAREN | PIC X(01) VALUE '('. |
| 05 SSA-SYNEMP2-ENO | PIC X(08) VALUE 'ENO ' |
| 05 SSA-SYNEMP2-RELOPR | PIC X(02) VALUE 'EQ'. |
| 05 SSA-SYNEMP2-KEY | PIC X(05) VALUE SPACES. |
| 05 SSA-SYNEMP2-RPAREN | PIC X(01) VALUE ')'. |

CBLTDLI Call

```
A200-GU-DEPTEMP.
    MOVE 030 to SSA-SYNDEPT3-KEY.
    MOVE 10001 to SSA-SYNEMP2-KEY.
    CALL 'CBLTDLI' USING GU
        PCB-SYN10P   /*PCB Name
        SYNEMP   /*I/O Area
        SSA-SYNDEPT3   /* Qualified SSA for parent
        SSA-SYNEMP2/* Qualified SSA for child
```

The database MS migration module maps the segment names with corresponding table names. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

| Segment | Table |
|---|---|
| SYNDEPT | SYN_DEPT |
| SYNEMP | SYN_EMP |

The database MS migration module reads command code from the SSA. The database MS migration module reads the command code at column 10 in the SSA of parent segment, and constructs the DML query accordingly. Command code '-' is NULL command code.

The database MS migration module then aps key/search fields of the SSA with key/search columns in the table.
Segment Definition in DBD
SEGM  NAME=SYNDEPT,BYTES=(00043,00043), PARENT=0,RULES=(,HERE)
FIELD  NAME=(DNO,SEQ,U),BYTES=03, START=00001,TYPE=C
SEGM NAME=SYNEMP,BYTES=(60,60),TYPE=DIR, PARENT=((SYNDEPT,SNGL)),RULES=(,FIRST)
FIELD  NAME=(ENO),BYTES=005,START=00001, TYPE=C
SSA in Program

01 SSA-SYNDEPT3.

| | |
|---|---|
| 05 SSA-SYNDEPT3-SEG-NAME | PIC X(08) VALUE 'SYNDEPT ' |
| 05 SSA-SYNDEPT3-CC | PIC XXX VALUE '*--'. |
| 05 SSA-SYNDEPT3-LPAREN | PIC X(01) VALUE '('. |
| 05 SSA-SYNDEPT3-DNO | PIC X(08) VALUE 'DNO ' |
| 05 SSA-SYNDEPT3-RELOPR | PIC X(02) VALUE 'EQ'. |
| 05 SSA-SYNDEPT3-KEY | PIC X(03) VALUE SPACES. |
| 05 SSA-SYNDEPT3-RPAREN | PIC X(01) VALUE ')'. |

01 SSA-SYNEMP2.

| | |
|---|---|
| 05 SSA-SYNEMP2-SEG-NAME | PIC X(08) VALUE 'SYNEMP ' |
| 05 SSA-SYNEMP2-LPAREN | PIC X(01) VALUE '('. |
| 05 SSA-SYNEMP2-ENO | PIC X(08) VALUE 'ENO ' |
| 05 SSA-SYNEMP2-RELOPR | PIC X(02) VALUE 'EQ'. |
| 05 SSA-SYNEMP2-KEY | PIC X(05) VALUE SPACES. |
| 05 SSA-SYNEMP2-RPAREN | PIC X(01) VALUE ')'. |

Copybooks
01 SYNDEPT.

| | |
|---|---|
| 05 SYN-DEPTNO | PIC 9 (03). |
| 05 SYN-DNAME | PIC X (20). |
| 05 SYN-LOC | PIC X (20). |

01 SYNEMP.

| | |
|---|---|
| 05 SYN-EMPNO | PIC 9 (05). |
| 05 SYN-ENAME | PIC X (20). |
| 05 SYN-DESIGNATION | PIC X (20). |
| 05 SYN-MANAGER | PIC 9 (05). |
| 05 SYN-SALARY | PIC 9 (05) V9 (02). |
| 05 SYN-DEPTNO | PIC 9 (03). |

The SYN_DEPT Table is defined as follows.

| Column | Data Type | Comments |
|---|---|---|
| SYN_DEPTNO | NUMERIC(3, 0) | Primary Key |
| SYN_DNAME | VARCHAR(20) | |
| SYN_LOC | VARCHAR(20) | |

The SYN_EMP Table is defined as follows.

| Column | Data Type | Comments |
|---|---|---|
| SYN_EMPNO | NUMERIC(5, 0) | Primary Key |
| SYN_ENAME | VARCHAR(20) | |
| SYN_DESIGNATION | VARCHAR(20) | |
| SYN_MANAGER | NUMERIC(5, 0) | |
| SYN_SALARY | NUMERIC(7, 2) | |
| SYN_DEPTNO | NUMERIC(3, 0) | Foreign Key |

Initially, the user creates a mapping sheet with a segment name and a corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in a target RDBMS column. The database MS migration module also allows the user to change the target table column name if required. The mapping of segment copybook fields and target table columns is stored in the metadata store, and the mapping is referenced during DML query generation.

Call Details.
Call Type—SELECT
Command Code—'-'
Table names—SYN_DEPT, SYN_EMP
Search Column—SYN_DEPTNO, SYN_EMPNO
Relational Operator—EQ
Search value—SSA-SYNDEPT3-KEY, SSA-SYN-EMP2-KEY To generate a DML query, the database MS migration module locates CBLTDLI calls. The database MS migration module then identifies the IMS call type, and maps it to a corresponding DML statement as shown below. In this example, GU is mapped to a SQL SELECT statement.

| IMS Call | Description | SQL Statement |
|---|---|---|
| GU | Get Unique | SELECT |

Next, the database MS migration module locates the segment definition of the segments passed as parameter in CBLTDLI call.

Segment name is then mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata Store, and the mapping is referenced while generating DML query.

The database MS migration module checks whether the SSA is a basic SSA or SSA with command codes, and checks whether the SSA is a qualified SSA or an unqualified SSA. If the 9th byte of SSA is space, then the SSA is a basic unqualified SSA. If the 9th byte is '(', then the SSA is a basic qualified SSA. If the 9th byte is, then command codes are used in the SSA. If there is no '(' after command codes, then the SSA is considered as an unqualified SSA with command codes. If there is a '(' after command codes, then the SSA is considered as a qualified SSA with command codes. In this example, the SSA is a qualified SSA with command.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. In this example, the symbolic name is DNO, and the symbolic name is mapped to segment copybook field SYN-DEPTNO. The copybook field SYN-DEPTNO is internally mapped to table column name SYN_DEPTNO. These mappings are stored in the metadata store during schema creation, and the mappings are referenced during DML query generation.

The database MS migration module also checks the relational and Boolean operators used in the SSA, and constructs the DML statement accordingly. Below are the mapping of relational operators in the IMS call, and the corresponding operator in the DML statement. In this example, '=' is the relational operator.

| Symbolic | Alphabetic | Operator in SQL statement |
|---|---|---|
| =b or b= | EQ | = |

Boolean operators are not used in this example.

If the SSA is unqualified, there will not be any WHERE clause in the DML statement. In this example, the SSA is a qualified SSA, and hence a WHERE clause is used in the DML statement.

If command codes are used, the database MS migration module will construct the DML statement based on following criteria. Command code '-' is used in this example,

| Command Code | Description | Generation of SQL statement |
|---|---|---|
| — | Null command code | SQL statement will be generated without considering previously set command code. |

The SQL statement will be constructed as follows.

```
EXEC SQL
    SELECT SYN_ENAME,SYN_DESIGNATION,SYN_MANAGER,SYN_SALARY
    INTO :SYN-ENAME,:SYN-DESIGNATION,:SYN-MANAGER,:SYN-SALARY
    FROM SYN_EMP WHERE SYN_DEPTNO=:SSA-SYNDEPT3-KEY AND
    SYN_EMPNO=:SSA-SYNEMP2-KEY;
END-EXEC
```

The following is an example embodiment of an ISRT call.
ISRT call is used to add segment occurrences to a database.
The declaration of SSAs and CBLTDLI call are as follows.
Declaration of SSAs.
01 SSA-SYNDEPT2.

```
05 SSA-SYNDEPT2-SEG-NAME    PIC X(08) VALUE 'SYNDEPT'
05 SSA-SYNDEPT2-LPAREN      PIC X(01) VALUE '('.
05 SSA-SYNDEPT2-DNO         PIC X(08) VALUE 'DNO  '
05 SSA-SYNDEPT2-RELOPR      PIC X(02) VALUE 'EQ'.
05 SSA-SYNDEPT2-KEY         PIC X(03) VALUE SPACES.
05 SSA-SYNDEPT2-RPAREN      PIC X(01) VALUE ')'.
```

01 SSA-SYNDEPT3.

```
05 SSA-SYNDEPT3-SEG-NAME    PIC X(08)  VALUE 'SYNDEPT'
05 FILLER    PIC X(01)  VALUE SPACES.
```

CBLTDLI Call

```
A100-REPL-SYNDEPT.
    CALL 'CBLTDLI' USING GHU
        PCB-SYN10P    /*PCB Name
```

```
        SYNDEPT-IO    /*I/O Area
        SSA-SYNDEPT2  /* Qualified SSA for parent
    MOVE 100 TO SYN-DEPTNO.
      MOVE 'FINANCE' TO SYN-DNAME.
      MOVE 'MUMBAI' TO SYN-LOC.
      CALL 'CBLTDLI' USING ISRT
        PCB-SYN10P    /*PCB Name
        SYNDEPT-IO    /*I/O Area
        SSA-SYNDEPT3  /* Unqualified SSA for parent
```

The database MS migration module then maps the segment names with corresponding table names During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

| Segment | Table    |
|---------|----------|
| SYNDEPT | SYN_DEPT |

The SYN_DEPT Table is defined as follows.

| Column      | Data Type     | Comments    |
|-------------|---------------|-------------|
| SYN_DEPTNO  | NUMERIC(3, 0) | Primary Key |
| SYN_DNAME   | VARCHAR(20)   |             |
| SYN_LOC     | VARCHAR(20)   |             |

Initially, the user creates a mapping sheet with a segment name and a corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If the segment field names contain hyphens, they will be replaced with underscores in a target RDBMS column. The database MS migration module also allows the user to change the target table column name if required. The mapping of segment copybook fields and target table columns is stored in the metadata store, and the mapping is referenced during DML query generation.

Call Details.
Call Type—INSERT
Table name—SYN_DEPT

To generate an DML query, the database MS migration module locates CBLTDLI calls. The database MS migration module identifies the IMS call type, and maps the IMS call type to a corresponding DML statement as shown below. In this example, ISRT is mapped to the SQL INSERT statement.

| IMS Call | Description | SQL Statement |
|----------|-------------|---------------|
| ISRT     | Insert      | INSERT        |

The database MS migration module then locates the segment definition of the segments passed as parameter in CBLTDLI call.

Next, the segment name is mapped to the target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating the DML statement.

The SQL queries are constructed as follows using above details.

```
EXEC SQL
    INSERT INTO
    SYN_DEPT(SYN_DEPTNO,SYN_DNAME,SYN_LOC)VALUES(:SYN-
    DEPTNO,:S YN-DNAME,:SYN-LOC);
END-EXEC
```

The following is an example embodiment of a REPL call.
REPL call is used to update a segment occurrence.
The declaration of SSAs and CBLTDLI call are as follows.

Declaration of SSAs
01 SS A-SYNDEPT2.

```
05 SSA-SYNDEPT2-SEG-NAME       PIC X(08)  VALUE
                                          'SYNDEPT'
05 SSA-SYNDEPT2-LPAREN         PIC X(01)  VALUE '('.
05 SSA-SYNDEPT2-DNO            PIC X(08)  VALUE 'DNO  '
05 SSA-SYNDEPT2-RELOPR         PIC X(02)  VALUE 'EQ'.
05 SSA-SYNDEPT2-KEY            PIC X(03)  VALUE SPACES.
05 SSA-SYNDEPT2-RPAREN         PIC X(01)  VALUE ')'.
```

01 SS A-SYNDEPT1

```
05 SSA-SYNDEPT3-SEG-NAME    PIC X(08)  VALUE 'SYNDEPT'
05 FILLER    PIC X(01)  VALUE SPACES.
```

CBLTDLI Call

```
A100-REPL-SYNDEPT.
    MOVE 030 TO SSA-SYNDEPT2-KEY.
       CALL 'CBLTDLI' USING GHU
         PCB-SYN10P   /*PCB Name
         SYNDEPT-IO   /*I/O Area
         SSA-SYNDEPT2 /* Qualified SSA for parent
       MOVE 'FINANCE' TO SYNDNAME OF SYNDEPT-IO.
       MOVE 'MUMBAI' TO SYNLOC OF SYNDEPT-IO.
       CALL 'CBLTDLI' USING REPL
         PCB-SYN10P   /*PCB Name
         SYNDEPT-IO   /*I/O Area
         SSA-SYNDEPT3 /* Unqualified SSA for parent
```

The database MS migration module maps the segment names with corresponding table names. During schema migration, each segment in the DBD is mapped to corresponding target database tables. By default, the name of target table is the same as that of the source segment name.

The database MS migration module allows the user to change the target table name if required. The segment-RDBMS table mapping is stored in the metadata store during schema creation, and the mapping is referenced during DML generation.

| Segment | Table |
|---|---|
| SYNDEPT | SYN_DEPT |

The SYN_DEPT Table is defined as follows.

| Column | Data Type | Comments |
|---|---|---|
| SYN_DEPTNO | NUMERIC(3, 0) | Primary Key |
| SYN_DNAME | VARCHAR(20) | |
| SYN_LOC | VARCHAR(20) | |

Initially, the user creates a mapping sheet with segment name and corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in target RDBMS column. The database MS migration module also allows the user to change the target table column name if required. The mapping of segment copybook fields and target table columns is stored in the metadata, store and the mapping is referenced during DML query generation.

Call Details.
Call Type—UPDATE
Table name—SYN_DEPT

To generate an DML query, the database MS migration module locates CBLTDLI calls. The database MS migration module identifies the IMS call type, and maps the IMS call type to a corresponding DML statement as shown below. In this example, the GHU call is followed by a REPL call.

| IMS Call | Description | SQL Statement |
|---|---|---|
| GHU | Get Hold Unique | SELECT |
| REPL | Replace | UPDATE |

The database MS migration module then locates the segment definition of the segments passed as parameter in CBLTDLI call.

Next, the segment name is mapped to a target RDBMS table. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store, and the mapping is referenced while generating the DML query.

The database MS migration module checks whether the SSA is a basic SSA or SSA with command codes, and checks whether the SSA is a qualified SSA or unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a basic qualified SSA.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search field for the target RDBMS table. In this example, the symbolic name is DNO, and the symbolic name is mapped to segment copybook field SYN-DEPTNO. The copybook field SYN-DEPTNO is internally mapped to table column name SYN_DEPTNO. These mappings are stored in the metadata store during schema creation, and the mappings are referenced during DML query generation.

The database MS migration module also checks the relational and Boolean operators used in the SSA, and constructs the DML statement accordingly. Below are the mapping of relational operators in the IMS call and the corresponding operator in the DML statement. In this example, '=' is the relational operator.

| Symbolic | Alphabetic | Operator in SQL statement |
|---|---|---|
| =b or b= | EQ | = |

In this example, Boolean operators are not used in the SSA for the GHU call.

If the SSA is unqualified, there will not be any WHERE clause in the DML statement. In this example, the SSA for the GHU call is a basic qualified SSA, and hence a WHERE clause is used in the DML UPDATE statement.

If command codes are used, the database MS migration module will construct the DML statement accordingly. Command codes are not used in this example, The SQL statement is constructed as follows using above details.

```
EXEC SQL
    UPDATE SYN_DEPT SET SYN_DNAME=:SYNDNAME,
    SYN_LOC=:SYNLOC WHERE
    SYN_DEPTNO=:SSA-SYNDEPT2-KEY;
END-EXEC
```

The following is an example embodiment of a DLET call.

A DLET call is used to delete a segment occurrence.

The declaration of SSAs and the CBLTDLI call are as follows.

Declaration of SSAs
01 SSA-SYNDEPT2.

| | |
|---|---|
| 05 SSA-SYNDEPT2-SEG-NAME | PIC X(08)  VALUE 'SYNDEPT' |
| 05 SSA-SYNDEPT2-LPAREN | PIC X(01)  VALUE '('. |
| 05 SSA-SYNDEPT2-DNO | PIC X(08)  VALUE 'DNO  ' |
| 05 SSA-SYNDEPT2-RELOPR | PIC X(02)  VALUE 'EQ'. |
| 05 SSA-SYNDEPT2-KEY | PIC X(03)  VALUE SPACES. |
| 05 SSA-SYNDEPT2-RPAREN | PIC X(01)  VALUE ')'. |

01 SSA-SYNDEPT3.

```
05 SSA-SYNDEPT3-SEG-NAME    PIC X(08)   VALUE 'SYNDEPT'
05 FILLER    PIC X(01)   VALUE SPACES.
```

CBLTDLI Call

```
A100-REPL-SYNDEPT.
    MOVE 030 TO SSA-SYNDEPT2-KEY.
    CALL 'CBLTDLI' USING GHU
        PCB-SYN10P    /*PCB Name
        SYNDEPT-IO    /*I/O Area
        SSA-SYNDEPT2  /* Qualified SSA for parent
    CALL 'CBLTDLI' USING DLET
        PCB-SYN10P    /*PCB Name
        SYNDEPT-IO    /*I/O Area
        SSA-SYNDEPT3  /* Unqualified SSA for parent
```

The database MS migration module maps the segment names with corresponding table names. During schema migration, each segment in the DBD is mapped to corresponding target database tables. By default, the name of target table is same as that of the source segment name. The database MS migration module allows the user to change the target table name if required. The segment-RDBMS table mapping is stored in the metadata store during schema creation, and the mapping is referenced during DML generation.

| Segment | Table |
| --- | --- |
| SYNDEPT | SYN_DEPT |

The SYN_DEPT Table is defined as follows.

| Column | Data Type | Comments |
| --- | --- | --- |
| SYN_DEPTNO | NUMERIC (3, 0) | Primary Key |
| SYN_DNAME | VARCHAR (20) | |
| SYN_LOC | VARCHAR (20) | |

Initially, the user creates a mapping sheet with a segment name and a corresponding copybook name. During schema migration, the database MS migration module reads the segment name from the DBD file, locates the segment copybook name in the mapping file, and reads the corresponding segment copybook file. The segment copybook field names are usually mapped as-is to target table column names unless there are any hyphens in the segment field name. If segment field name contains hyphens, they will be replaced with underscores in a target RDBMS column. The database MS migration module also allows the user to change the target table column name if required. The mapping of segment copybook fields and target table columns is stored in the metadata store, and the mapping is referenced during DML query generation.

Call details
Call Type—DELETE
Table name—SYN_DEPT

To generate a DML query, the database MS migration module locates CBLTDLI calls. The database MS migration module identifies the IMS call type, and maps the IMS call type to a corresponding DML statement as shown below. In this example, a GHU call is followed by a DLET call.

| IMS Call | Description | SQL Statement |
| --- | --- | --- |
| GHU | Get Hold Unique | SELECT |
| DLET | Delete | DELETE |

The database MS migration module locates the segment definition of the segments passed as parameter in CBLTDLI call.

Segment name is then mapped to a target RDBMS table. During schema migration, each segment in the DBD is then mapped to corresponding target database tables. By default, the name of target table is same as that of the source segment name. The database MS migration module allows the user to change the target table name if required. The segment-RDBMS table mapping is stored in the metadata store, and the mapping is referenced while generating DML query.

The database MS migration module checks whether the SSA is a basic SSA or SSA with command codes, and checks whether the SSA is a qualified SSA or an unqualified SSA. If the 9th byte of SSA is space, then the SSA is a basic unqualified SSA. If the 9th byte is '(', then the SSA is a basic qualified SSA. If the 9th byte is '*', then command codes are used in the SSA. If there is no '(' after command codes, then the SSA is considered as an unqualified SSA with command codes and if there is a '(' after command codes, then the SSA is considered as a qualified SSA with command codes. In this example, the SSA is a basic qualified SSA.

If the SSA is a qualified SSA, the database MS migration module locates the key/search field from the segment definition. The database MS migration module retrieves the symbolic name, starting position, and length of the search field. The database MS migration module then locates the corresponding fields in the segment copybook, and maps them as search fields for the target RDBMS table. In this example, the symbolic name is DNO, which is mapped to segment copybook field SYN-DEPTNO. The copybook field SYN-DEPTNO is internally mapped to table column name SYN_DEPTNO. These mappings are stored in the metadata store during schema creation, and the mappings are referenced during DML query generation.

The database MS migration module also checks the relational and Boolean operators used in the SSA, and constructs the DML statement accordingly. Below are the mapping of relational operators in the IMS call and the corresponding operator in the DML statement. In this example, '=' is the relational operator.

| Symbolic | Alphabetic | Operator in SQL statement |
| --- | --- | --- |
| =b or b= | EQ | = |

In this example, Boolean operators are not used in the SSA for the GHU call.

If the SSA is unqualified, there will not be any WHERE clause in the DML statement. In this example, the SSA for the GHU call is a basic qualified SSA, and hence a WHERE clause is used in the DML statement.

If command codes are used, the database MS migration module will construct the DML statement accordingly. Command codes are not used in this example.

The SQL statement is constructed as follows using above details.

```
EXEC SQL
    DELETE FROM SYN_DEPT WHERE
    SYN_DEPTNO=:SSA-SYNDEPT2-KEY;
END-EXEC
```

Next, the conversion of a COBOL language in a virtual storage access method ("VSAM") program to COBOL-RDBMS program will be described.

To convert code in an INPUT-OUTPUT section of a VSAM file, a FILE-CONTROL paragraph in the INPUT-OUTPUT section associates each file in the COBOL program with an external data set, and specifies file organization, access mode, and other information. The database MS migration module reads the logical file name and DD name, organization, and access mode of VSAM file from the INPUT-OUTPUT section, and then removes the VSAM file related details from the program.

For instance, the code in the INPUT-OUTPUT section of the VSAM file is converted as follows.

```
SELECT logical-file-name ASSIGN TO ddname
ORGANIZATION IS INDEXED
ACCESS MODE IS RANDOM/DYNAMIC/SEQUENTIAL
```

For example,

```
SELECT EMP-FILE ASSIGN TO EMP
ORGANIZATION IS INDEXED/NONINDEXD/RELATIVE
ACCESS MODE IS RANDOM
RECORD KEY IS SYN-EMPNO
FILE STATUS IS WS-STAT.
```

In the above example, EMP-FILE is the logical file name, EMP is the DD name, and SYN-EMPNO is the key field.

The DD name EMP is mapped to the physical file TZNT.EMP.DAT in JCL/Proc as shown below.

```
//EMP  DD DSN=TZNT.EMP.DAT,
//     DISP=SHR
```

To convert code in a DATA DIVISION/FILE section of the VSAM file, the database MS migration module locates the file definition ("FD") entry for the VSAM file in the EMP-FILE. In the example shown below, the VSAM file structure is mentioned just below the FD entry. If the VSAM file structure is in a copybook, the copybook name will be mentioned just below FD entry. The system removes FD entries and the VSAM file structure/copybook from the FILE Section, and replace them with a SQL INCLUDE statement, as shown below.

The following is an example of VSAM related code in the FILE section.

```
FD EMP-FILE
   BLOCK CONTAINS 0 RECORDS
   RECORDING MODE V
   DATA RECORD IS EMPREC-REC
01 EMPREC-REC.
   10 SYN-EMPNO    PIC X(5).
   10 SYN-ENAME    PIC X(20).
   10 SYN-DESIGNATION PIC X(20).
   10 SYN-MANAGER  PIC X(5).
   10 SYN-SALARY   PIC 9(7).
```

The VSAM related code in the FILE is to be replaced with the following code.

```
EXEC SQL
   INCLUDE <DCLGEN member name>
END-EXEC
```

To covert code in a PROCEDURE DIVISION, the database MS migration module replaces VSAM file operations with equivalent SQL statements as shown in the table below.

| VSAM Statement | Description | SQL Statement |
|---|---|---|
| READ | Read data from datastore | SELECT |
| WRITE | Write data to datastore | INSERT |
| REWRITE | Update data in datastore | UPDATE |
| DELETE | Delete data from datastore | DELETE |

According to an embodiment, in the conversion of a READ statement in a COBOL-VSAM program, the statement in the COBOL-VSAM program to read the file is as follows.

MOVE 1001 TO EMP-NO.
READ EMP-FILE

The database MS migration module converts the READ statement to SQL statement as shown below.

```
EXEC SQL
   SELECT SYN_ENAME, SYN_DESIGNATION,
   SYN_MANAGER,
   SYN_SALARY FROM SYN_EMP WHERE
   SYN_EMPNO=:EMP-NO;
END-EXEC
```

According to an embodiment, in the conversion of a WRITE statement in a COBOL-VSAM program, the VSAM write statement is as follows.

WRITE EMP-FILE

The database MS migration module will convert the WRITE statement to a SQL statement as shown below.

```
EXEC SQL
   INSERT INTO SYN_EMP(SYN_EMPNO,SYN_ENAME,
   SYN_DESIGNATION, SYN_MANAGER, SYN_SALARY)
   VALUES(:SYN-EMPNO,:SYN-ENAME, :SYN-DESIGNATION,
   :SYN-MANAGER, :SYN-SALARY);
END-EXEC
```

According to an embodiment, in the conversion of a REWRITE statement, there is a READ statement before a REWRITE statement in the VSAM program, as follows.

MOVE 1001 TO EMP-NO.
READ EMP-FILE
MOVE 'MANAGER' SYN-DESIGNATION
REWRITE EMP-REC.

The database MS migration module replaces the above statements with a SQL UPDATE statement as follows.

```
EXEC SQL
   UPDATE SYN_EMP SET SYN_DESIGNATION =
   :SYN-DESIGNATION
   WHERE SYN_EMPNO=:EMP-NO;
END-EXEC
```

According to an embodiment, in the conversion of a DELETE statement, there is a READ statement before a DELETE statement in the VSAM program, as follows.
MOVE 1001 TO EMP-NO.
READ EMP-FILE
DELETE EMP-REC.

The database MS migration module replaces the above statements with a SQL DELETE statement, as follows.

```
EXEC SQL
    DELETE FROM SYN_EMP WHERE SYN_EMPNO=:EMP-NO;
END-EXEC
```

Next, the conversion of an integrated database management system ("IDMS") to RDBMS program will be described.

The database MS migration module automatically converts IDMS calls to SQL statements as shown below.

| IDMS Call | SQL Statement |
| --- | --- |
| OBTAIN CALC | SELECT... WHERE... |
| FIND CALC | SELECT... WHERE... |
| GET | SELECT... WHERE... |
| OBTAIN NEXT... WITHIN Set | FETCH next with Cursor |
| OBTAIN FIRST/LAST/PRIOR/OWNER... WITHIN Set | Code re-factoring with FETCH... Cursor, SELECT... WHERE |
| FIND/OBTAIN... USING SORT KEY... | SELECT... WHERE... |
| STORE | INSERT |
| MODIFY | UPDATE |
| ERASE | DELETE |

According to an embodiment, the FIND/OBTAIN CALC statement is used to accesses a record based on the value of the record's CALC key.

In conversion of a FIND/OBTAIN CALC statement, the following statement initializes the CALC key field in a SUPPLIER record in the IDMS, and retrieves the specified occurrence of the SUPPLIER record.
MOVE 10001 TO SUPPID.
OBTAIN CALC SUPPLIER.

The database MS migration module identifies the key field and record name from the above statements, and maps them to a target RDBMS key field and a table name, respectively. The database MS migration module then constructs the SQL statement as follows.

```
EXEC SQL
    SELECT SUPPNAME,QTY FROM SUPPLIER WHERE SUPPID=10001;
END-EXEC
```

According to an embodiment, the MODIFY statement replaces element values of a record occurrence in the database with new element values defined in the dialog's record buffer.

In conversion of the MODIFY statement, the below statements update the supplier name in a SUPPLIER record in the IDMS.
MOVE 10001 TO SUPPID.
OBTAIN CALC SUPPLIER.
MOVE SNAME TO SUPPNAME.
MODIFY SUPPLIER.

The database MS migration module identifies the key field and the record name from the above statements and maps them to a target RDBMS key field and a table name, respectively. The database MS migration module then constructs the SQL UPDATE statement as follows.

```
EXEC SQL
    UPDATE SUPPLIER SET SUPPNAME=:SNAME WHERE SUPPID=10001;
END-EXEC
```

According to an embodiment, an ERASE statement deletes a record from database.

In conversion of the ERASE statement, the below statements delete the record with SUPPID as 10001 from the IDMS.
MOVE 10001 TO SUPPID.
OBTAIN CALC SUPPLIER.
ERASE SUPPLIER.

The system identifies the key field and record name from above statements and map it with the target RDBMS key field and table name. The system then constructs the SQL DELETE statement as follows.

```
EXEC SQL
    DELETE FROM SUPPLIER WHERE SUPPID=10001;
END-EXEC
```

Next, the conversion of ADABAS (an acronym for adaptable database system by SOFTWARE AG) to RDBMS program will be described.

The table below shows some of the ADABAS call statements and their equivalent SQL statements as converted by the system.

| IDMS Call | SQL Statement |
| --- | --- |
| READ | SELECT... WHERE... |
| READ...PHYSICAL | SELECT... |
| FIND | SELECT... WHERE... |
| FIND UNIQUE... | SELECT SINGLE... |
| FIND NUMBER... | SELCT COUNT (*)... |
| HISTOGRAM | SELECT COUNT (*)... WHERE ... |
| STORE | INSERT |

According to an embodiment, a FIND statement is used to find records that meets criteria mentioned in a WITH clause. For instance, the below statements finds the employee record that meets criteria mentioned.
FIND EMPLOYEES WITH NAME='SANYA' AND AGE EQ 25 THRU 35
OBTAIN EMP-ID NAME AGE In conversion of a FIND/OBTAIN statement, the above program statements will be converted by the system and a target SQL statement will be constructed as below:

```
EXEC-SQL
    SELECT EMP-ID, NAME, AGE
    FROM EMPLOYEES
    WHERE NAME = 'SANYA'
    AND AGE BETWEEN 25 AND 35;
END-EXEC
```

According to an embodiment, a STORE statement is used to add a new record into an ADABAS file.

The below STORE statement is used to create a new record in EMPLOYEES file.

```
STORE RECORD IN EMPLOYEES
    WITH EMP-ID='J1178'
         NAME='JOANE'
         AGE=27
```
The STORE statement is converted by the system into its equivalent SQL statement as follows.

```
EXEC-SQL
    INSERT INTO EMPLOYEES (EMP-ID, NAME, AGE)
    VALUES ('J1178', 'JOANE', 27);
END-EXEC
```

Now, data extraction and data upload will be described in further detail.

In an embodiment, the database MS migration module creates program to extract data from a legacy datastore, scripting language (for example, JCL) to run the data extraction program, and scripting language for uploading the data into database. The database MS migration module uses the metadata files created during schema conversion to create the scripting language (for example, JCLs) and data extraction program.

The following examples are for the creation of data extract JCLs, upload JCLs and data migration programs for IMS to RDBMS conversion. However, embodiments of such databases and data migration applies to other legacy datastores (for instance, IMS, VSAM, ADABAS, IDMS and similar datastores), as well.

The following example is JCL to run a data extraction program.

```
//SYNEXTR JOB (U),'Data Extraction',CLASS=A,MSGCLASS=S
//   NOTIFY=&SYSUID
//STEP01  EXEC  PGM=DFSRRC00,PARM=(DLI,EXTPGM,EXTPSB,
, ,)
//STEPLIB  DD DSN=IMS.RESLIB,DISP=SHR
//IMS     DD DSN=IMS2.PSBLIB,DISP=SHR
//        DD DSN=IMS2.DBDLIB,DISP=SHR
//DDCARD   DD DSN=DATASET,DISP=(OLD,KEEP)
//DFSVSAMP DD DUMMY
//IMSLOGR  DD DUMMY
//IEFRDER  DD DUMMY
//SYSPRINT DD SYSOUT=*
//SYSUDUMP DD SYSOUT=*
//IMSERR   DD SYSOUT=*
```

The following example is a data extraction program.

```
IDENTIFICATION DIVISION.
PROGRAM-ID.  EXTPGM.
ENVIRONMENT DIVISION
INPUT-OUTPUT SECTION.
FILE-CONTROL
    SELECT OUTPUT-FILE         ASSIGN TO SYNFILE.
DATA DIVISION.
FILE SECTION
******************************************************
*Output Extract file declaration
******************************************************
FD OPTFILE
    BLOCK CONTAINS 0 RECORDS
    RECORDING MODE V
    DATA RECORD IS OPTFILE-RECORD.
    FILE STATUS IS OPTFILE-STATUS.
 01 OPTFILE-RECORD              PIC X(500).
WORKING-STORAGE SECTION.
 01 OPTFILE-STATUS              PIC X(2) VALUE SPACES.
    88 OPTFILE-SUCCESS                   VALUE '00'.
 01 SYNDEPT-UNQUALIFIED-SSA.
    03 SYNDEPT-SEG-NAME         PIC X(08) VALUE 'SYNDEPT '.
    03 FILLER                   PIC X(01) VALUE ' '.
 01 RECORD-DATA-OPTFILE
    05 RECORD-BYTES             PIC X(02) VALUE '01'.
    05 SEGMENT-IO-AREA PIC X(500).
PROCEDURE DIVISION.
1000-MAIN.
    OPEN OUTPUT OPTFILE
    IF DEPTFILE-SUCCESS NOT TRUE
        DISPLAY 'OUTPUT FILE OPENING ERROR: OPTFILE'.
        GO TO 1000-EXIT
    END-IF.
    ENTRY 'DLITCBL'             USING IO-PCB
                                    ALT-PCB
                                    EXP-PCB
                                    LZB02P-PCB.
            CALL 'CBLTDLI'      USING GU
                                    SYNDEPT-PCB
                                    SEGMENT-IO-AREA
                                SYNDEPT-UNQUALIFIED-SSA.
    PERFORM 1100-PROCESS-PARA THRU 1100-EXIT UNTIL STATUS-
CODE
        OF SYNDEPT-PCB <> 'GB'.
    CLOSE OPTFILE.
1000-EXIT.
    GOBACK.
1100-PROCESS-PARA.
            EVALUATE SEG-NAME-FB OF SYNDEPT-PCB
            WHEN 'SYNDEPT'
            MOVE SEGMENT-IO-AREA TO SYNDEPT-IO-AREA
```

```
                MOVE '01'              TO RECORD-BYTE
                PERFORM 1200-FORMAT-SYNDEPT THRU 1200-EXIT.
                    WHEN 'SYNEMP'
                MOVE SEGMENT-IO-AREA TO SYNEMP-IO-AREA
                MOVE '02'              TO RECORD-BYTE
                PERFORM 1300-FORMAT-SYNEMP THRU 1300-EXIT.
            END-EVALUATE.
            PERFORM 1400-WRITE-FILE THRU 1400-EXIT
                INITIALIZE SEGMENT-IO-AREA.
                CALL 'CBLTDLI'         USING GN
                                             SYNDEPT-PCB
                                             SEGMENT-INPUT-DATA
                                             DEPT-UNQUALIFIED-SSA.
        1100-EXIT.
            EXIT.
        1200-FORMAT-SYNDEPT.
       *FORMAT SYNDEPT RECORD
           .
           .
        1200-EXIT.
            EXIT.
        1300-FORMAT-SYNDEPT.
       *FORMAT SYNEMP RECORD
           .
           .
        1300-EXIT.
            EXIT.
        1400-WRITE-FILE.
       *WRITE OUTPUT FILE
            WRITE OPTFILE-RECORD.
           .
        1300-EXIT.
            EXIT.
```

The following example is a data upload JCL.

```
//SYNUPLD JOB (U),'Data Upload',CLASS=A,MSGCLASS=S
//  NOTIFY=&SYSUID
//**********************************************************************
*
//LOAD001 EXEC PGM=DSNUTILB,REGION=1024K,
//   PARM='SSID, DSNTEX'
//STEPLIB DD DSN=XXXX.SDSNLOAD,DISP=SHR
//*
//**********************************************************************
**
//* DATA SETS USED BY THE UTILITY          *
//**********************************************************************
**
//SORTOUT DD UNIT=SYSDA,SPACE=(4000,(20,20),,,ROUND)
//SORTWK01 DD UNIT=SYSDA,SPACE=(4000,(20,20),,,ROUND)
//SYSDISC DD UNIT=SYSDA,SPACE=(4000,(20,20),,,ROUND)
//SYSERR DD UNIT=SYSDA,SPACE=(4000,(20,20),ROUND)
//SYSMAP DD UNIT=SYSDA,SPACE=(4000,(20,20),,,ROUND)
//SYSRECAC DD DSN=&HLQ.DBD.MEDCID.EXTRACT,DISP=SHR
//SYSUT1 DD UNIT=SYSDA,SPACE=(4000,(20,20),,,ROUND)
//SYSPRINT DD SYSOUT=*
//UTPRINT DD SYSOUT=*
//SYSIN DD *
LOAD DATA INDDN(SYSRECAC)
    RESUME YES
    INTO TABLE DEPT WHEN (1:4)='0001'
    (
    DEPTNO          POSITION(5) NUMERIC(3),
    DNAME           POSITION(9) CHAR(20)
    )
//*
```

In an embodiment, the database MS migration module remediates JCLs/PROCs such that instead of running legacy data programs, the database MS migration module can run programs accessing the target DB management system (e.g., DB2 or ORACLE RDBMS). The database MS migration module also remediates JCL's/PROC's to execute utilities of the target DB management system, rather than legacy datastore utilities like back-up, restore, or a similar utility. If the target database is ORACLE RDBMS, the database MS migration module automatically migrates JCL's to SPRING BATCH.

Now, conversion of job control language ("JCL")/Procedures ("PROC") will be described in further detail.

JCLs/PROCs are a set of statements inside a JCL grouped together to perform a particular function.

The following is an example embodiment of software code of the source JCL that runs an IMS program.

```
//SYNJCL2 JOB (U),'Example',CLASS=A,MSGCLASS=S
//   NOTIFY=&SYSUID
```

Figure 11A:
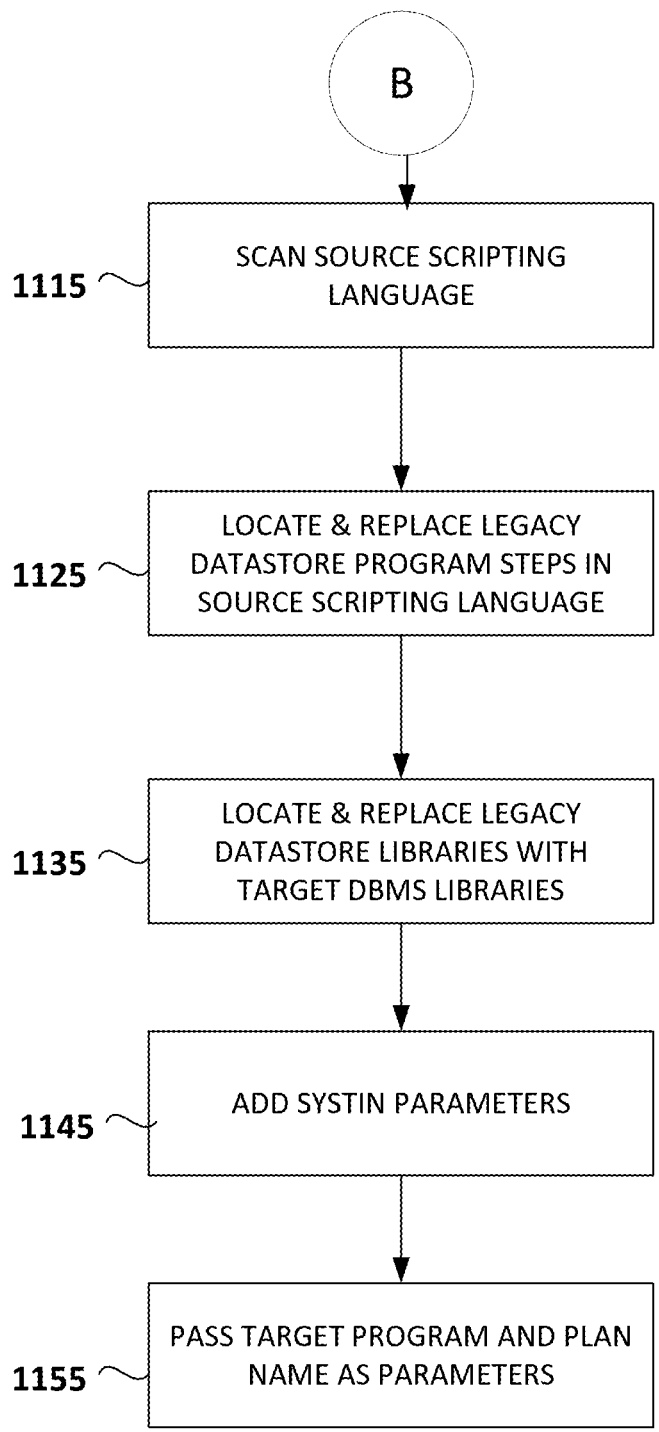
FIG. 11A is a flow diagram of JCL conversion according to an embodiment.
Figure 11B:
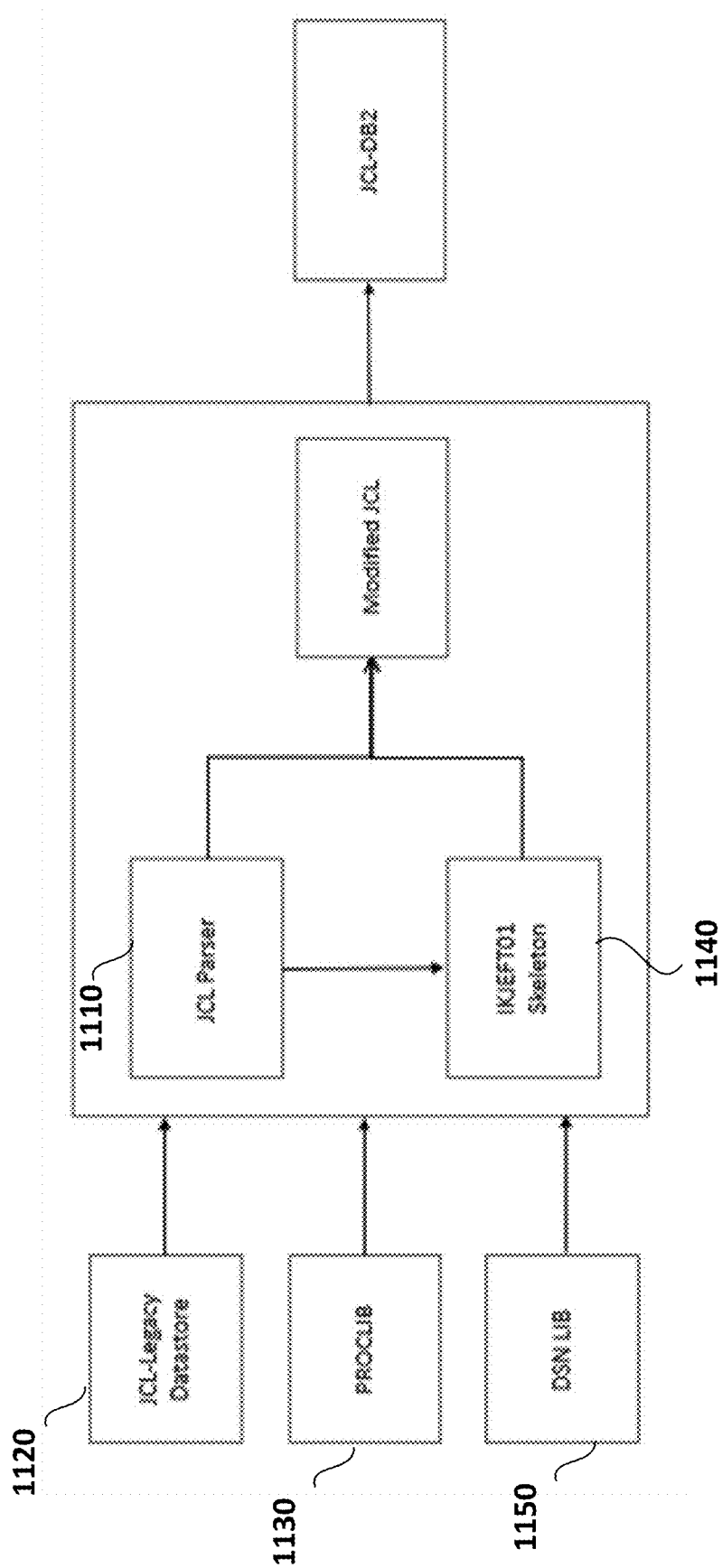
FIG. 11B is diagram of a system configured for JCL conversion according to an embodiment.

Referring to FIGS. 11A and 11B, at 1115, JCL parser 1110 scans the source JCL-Legacy Datastore 1120 and PROC 1130. At 1125, the JCL parser 1110 locates the steps containing legacy datastore program/DFSRRC00, and the database MS migration module replaces the steps containing legacy datastore program/DFSRRC00 with a IKJEFT01 skeleton 1140.

The JCL parser 1110 then locates the legacy datastore related libraries, and replaces the legacy datastore related libraries with target DB management system libraries stored in the DSN library file 1150, at 1135. The database MS migration module, at 1145, also adds the SYSTIN parameters to the JCL/PROC step. At 1155, the database MS migration module passes the target program name and plan name as parameters, generating JCL-DB2.

The following is an example embodiment of software code instructing the database MS migration module to read the source JCL and PROC, and to replace legacy datastore related codes in the legacy datastore with equivalent target DB related code in the target DB management system.

```
//SYNJCL2 JOB (U),DB2 Run',CLASS=A,MSGCLASS=S
//         NOTIFY=&SYSUID
//STEP030 EXEC PGM=IKJEFT01,DYNAMNBR=20
//********************************************************************
//********************************************************************
//VIW5101 DD DSN=FEVI.WZS53160.W144SABS,
//              DISP=(OLD,DELETE,KEEP)
//VIW5102 DD DSN=FEVI.WZS53170.W144FABS,
//              DISP=(,CATLG,DELETE),
//              UNIT=DISK,
//              SPACE=(27998,(6000,600),RLSE),
//              DCB=(LRECL=535,BLKSIZE=27998,RECFM=VB)
//STEPLIB       DD DSN=DSN510.SDSNLOAD,DISP=SHR
//              DD DSN=SYS1.DSN510.SDSNEXIT,DISP=SHR
//              DD DSN=DSN510.RUNLIB.LOAD,DISP=SHR
//DBRMLIB DD DSN=IBMMFS.MACC.DBRM,DISP=SHR
//SYSTSPRT DD SYSOUT=A
//SYSPRINT DD SYSOUT=A
//SYSUDUMP DD SYSOUT=A
//SYSTSIN DD *
    DSN SYSTEM(DSN)
        RUN PROGRAM(VIP510) PLAN(VIP510) -
LIB('IBMMFS.MACC.LOAD') <= LOAD LIB
    END
/*
```

-continued

```
//STEP01  EXEC  PGM=DFSRRC00,PARM=(DLI,VIP510,VIP5PSB, ,
,)
//STEPLIB  DD DSN=IMS.RESLIB,DISP=SHR
//IMS      DD DSN=IMS2.PSBLIB,DISP=SHR
//         DD DSN=IMS2.DBDLIB,DISP=SHR
//DDCARD   DD DSN=DATASET,DISP=(OLD,KEEP)
//DFSVSAMP DD DUMMY
//IMSLOGR  DD DUMMY
//IEFRDER  DD DUMMY
//SYSPRINT DD SYSOUT=*
//SYSUDUMP DD SYSOUT=*
//IMSERR   DD SYSOUT=*
```

According to an embodiment, during JCL conversion, the database MS migration module reads the source JCL and Procedure, and replaces legacy datastore related codes with equivalent target DB related code as explained in further detail below.

FIG. 11A is a flow diagram of JCL conversion according to an embodiment.

FIG. 11B is diagram of a system for JCL conversion according to an embodiment.

Although the examples above pertain to DB2, the database MS migration module is capable of generating scripting language for any target DB management system.

According to some embodiments, the following can be used to further improve performance of the database MS migration module: an in-memory database, database parallel execution framework, an in-memory data grid, caching and/or parallel processing framework.

An in-memory database is a database management system that primarily (or substantially) depends on main memory for data storage. In-memory databases are faster than disk databases because their internal optimization algorithms are faster and they execute fewer CPU instructions. In-memory databases are used in high-volume environments where response time is critical.

Database parallel execution framework enables an user to either explicitly choose a specific degree of parallelism, or to rely on RDBMS (or other legacy datastore) for automatically control of the degree of parallelism. Database parallel execution framework speeds up operations by dividing a task into smaller sub-tasks. Operations that can be executed in parallel include data loads, queries, DML statements and similar operations.

In an embodiment, an in-memory data grid (IMDG) is a data structure that resides in random access memory (RAM) and is distributed among multiple servers. In yet another embodiment, an in-memory data grid (IMDG) is a data structure having a significant portion (or component) of which resides in random access memory (RAM) and is distributed among multiple servers. In another embodiment, an in-memory data grid (IMDG) is a data structure having a significant portion (or component) of which resides in random access memory (RAM) or dynamic random-access memory (DRAM) and is distributed among multiple servers.

IMDGs are easily scalable and can support hundreds of thousands of data updates per second. Some exemplary platforms of an IMDG include, for instance, GEMFIRE, INFINISPAN, HAZELCAST IMDG, APACHE IGNITE and similar platforms.

The performance of the database MS migration module can be enhanced by the use of IMDGs and in-memory databases as data can be read from and written to memory much faster than with a disk. IMDGs and in-memory databases are easily scalable, and upgrades can be easily implemented. IMDGs and in-memory databases allow for faster decision making, greater productivity and improved customer service.

The performance of the database MS migration module can be enhanced by caching. A cache is a type of extremely fast memory that acts as a buffer between RAM and CPU. It holds frequently accessed data and instructions so that they are immediately available for processing when needed. Caching is the process of storing data or instructions in a cache and it is used to increase the speed of data access.

The performance of the database MS migration module can be enhanced by a parallel processing framework. Parallel processing is a method of simultaneously breaking up and running program tasks on multiple microprocessors, thereby reducing processing time. Parallel processing may be accomplished via a computer with two or more processors, or via a computer network. Parallel processing frameworks are, for instance, APACHE SPARK and AKKA.

Figure 12:
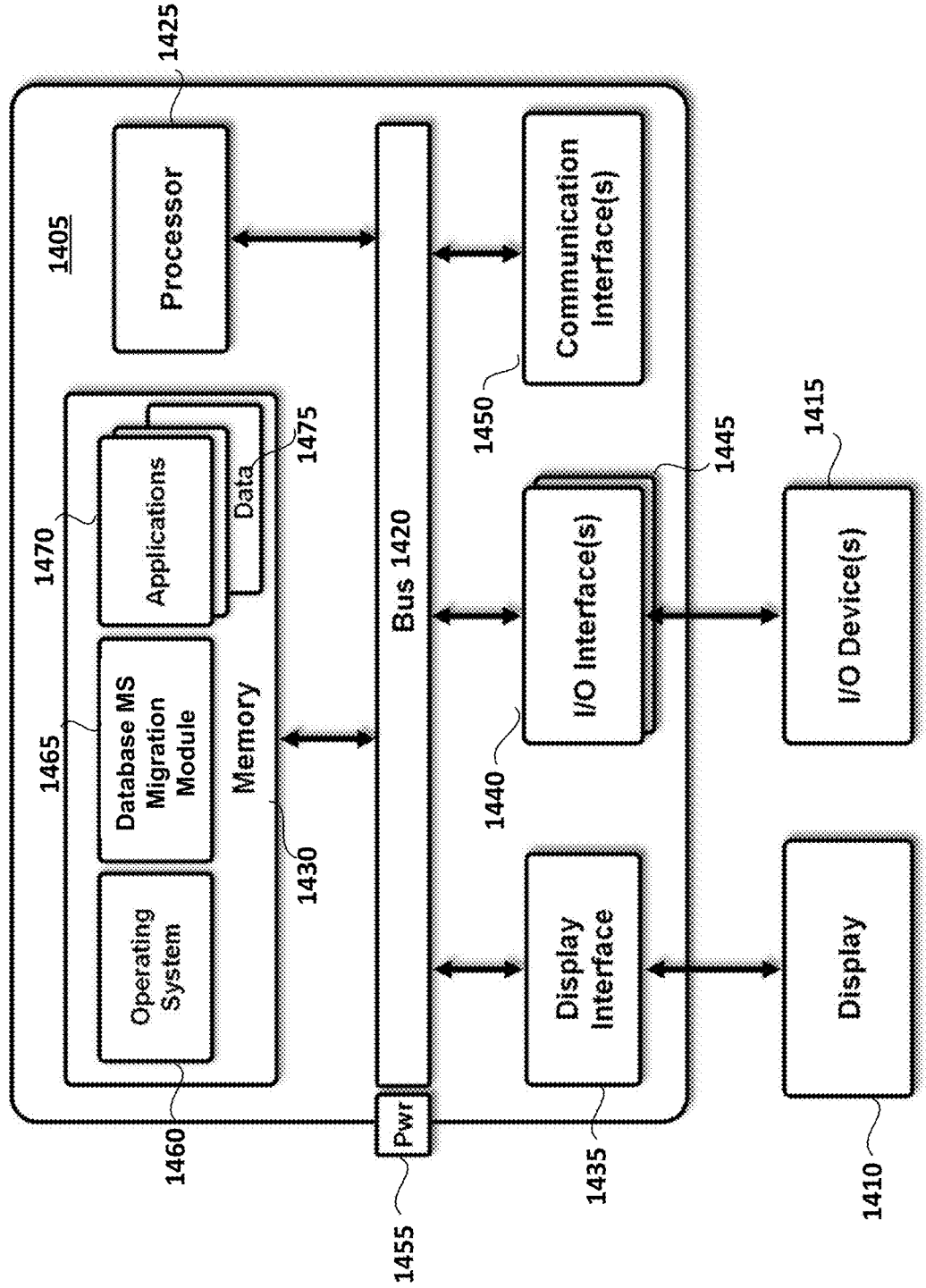

FIG. 12 illustrates a block diagram of an electronic device in accordance with an embodiment.

Referring to FIG. 12, electronic device 1400 includes computer 1405, display 1410, and, in some embodiments, one or more I/O devices 1415.

Electronic device 1400 can be a stationary electronic device (such as, for example, a desktop computer) or a portable electronic device (such as, for example, a laptop, tablet, etc.). Computer 1405 includes bus 1420, processor 1425, memory 1430, display interface 1435, one or more I/O interfaces 1440, 1445 and one or more communication interfaces 1450. Generally, display interface 1435 is coupled to display 1410, I/O interface 1440 is coupled to I/O device 1415 using a wired or wireless connection, and communication interface 1450 can be connected to antenna (not shown) and coupled to network (not shown) using a wireless connection. If electronic device 1400 is a stationary electronic device, communication interface 1450 can be connected to the network using a wired or a wireless connection. One of the I/O interfaces 1440, 1445 can be connected to the antenna.

Bus 1420 is a communication system that transfers data between processor 1425, memory 1430, display interface 1435, I/O interfaces 1440,1445, and communication interface 1450, as well as other components not depicted in FIG. 12. Power connector 1455 is coupled to bus 1420 and a power supply (not shown), such as a battery, etc.

Processor 1425 includes one or more general-purpose or application-specific microprocessors to perform computation and control functions for computer 1405. Processor 1425 can include a single integrated circuit, such as a micro-processing device, or multiple integrated circuit devices and/or circuit boards working in cooperation to accomplish the functions of processor 1425. In addition, processor 1425 can execute computer programs, such as operating system 1460, database MS migration module 1465, other applications 1470, or data 1475 stored within memory 1430.

Memory 1430 stores information and instructions for execution by processor 1425. Memory 1430 can contain various components for retrieving, presenting, modifying, and storing data. For example, memory 1430 can store software modules that provide functionality if executed by processor 1425. The modules can include an operating system 1460 that provides operating system functionality for computer 1405. The modules can also include database MS migration module 1465 that provides the learning and processing functions described above. Applications 1470 can include other applications that cooperate with database MS migration module 1465. Data 1475 can include training data of the multiple programming languages, information associated with the natural human language communication, languages semantics, programming languages references, domain specific contexts, programming language contextual trained data, metadata and other references (such as references required for the communication and to make decisions).

Generally, memory 1430 can include a variety of non-transitory computer-readable medium that can be accessed by processor 1425. In the various embodiments, memory 1430 can include a volatile medium, a nonvolatile medium, both volatile and nonvolatile mediums, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include a volatile memory (e.g., random access memory ("RAM"), dynamic RAM ("DRAM"), static RAM ("SRAM"), synchronous dynamic random access memory ("SDRAM")), or a non-volatile memory (e.g., read only memory ("ROM"), flash memory, cache memory, programmable read-only memory ("PROM"), erasable programmable read-only memory ("EPROM"), electrically erasable programmable read-only memory ("EEPROM")), registers, hard disk, a removable disk, a compact disk read-only memory ("CD-ROM"), or any other form of a storage medium known in the art.

Display interface 1435 is coupled to display 1410.

I/O interfaces 1440,1445 are configured to transmit and/or receive data from I/O devices 1415. I/O interfaces 1440, 1445 enable connectivity between processor 1425 and I/O devices 1415 by encoding data to be sent from processor 1425 to I/O devices 1415, and decoding data received from I/O devices 1415 for processor 1425. Generally, data can be sent over wired and/or a wireless connections. For example, I/O interfaces 1440,1445 can include one or more wired communications interfaces, such as USB or Ethernet, and/or one or more wireless communications interfaces, coupled to one or more antennas, such as Wi-Fi, cellular, BLUETOOTH, cloud-based interface, or similar platforms.

Display 1410 can be a liquid crystal display (LCD) of a laptop, a tablet, or a similar device.

Generally, I/O device 1415 is a device configured to provide input to computer 1405, and/or output from computer 1405. I/O device 1415 is operably connected to computer 1405 using either a wireless connection or a wired connection. I/O device 1415 can include a local processor coupled to a communication interface that is configured to communicate with computer 1405 using the wired or wireless connection.

For example, I/O device 1415 can be an input device such as a touchscreen for display 1410, a touchpad, a keypad or keyboard, etc.

I/O device 1415 can be an output device, such as one or more audio speakers. Processor 1425 can transmit an audio signal to a speaker (I/O device 1415) through an audio interface (I/O interface 1440), which in turn outputs audio effects.

According to embodiments, the database MS migration module disclosed in the instant application is configured to interpret the IMS command codes such as *C, *D, *F, *L, *N, *P, *Q, *U, *V, *(-) (see TABLE 7), and generate corresponding SQL queries. The conversion of IMS calls with command codes are explained in detail above in the examples mentioned in conjunction with the commands codes provided in TABLE 7.

According to embodiments, the database MS migration module is configured to automatically establish entity integrity and/or referential integrity while creating target DB management schemas. The database MS migration module also is also configured to add, or change, entity integrity and/or referential integrity.

According to embodiments, the database MS migration module also is configured to add constraints (e.g., Check, Not Null, Unique). The database MS migration module is also configured to insert default values, index, or perform database normalization.

According to embodiments, the database MS migration module is configured to perform code optimization.

The database MS migration module is also capable of handling data type casting, space trimming, changing the size of the target table columns, adding or removing columns, drag and drop features etc.

According to embodiments, the database MS migration module performs data migration based on database optimization.

According to embodiments, the database MS migration module is configured to convert IMS calls to corresponding SQL statements based on target schema.

If the SSA contains multiple qualifications and Boolean statements, the database MS migration module is configured to derive corresponding SQL statements by adding relational and/or Boolean operators in the WHERE clause of the SQL statement. Although example embodiments pertain to legacy datastore to RDBMS conversion, the embodiments are not limited thereto, and can used to convert a legacy datastore to NoSQL DB or BigData.

Several embodiments have been specifically illustrated and/or described. However, it will be appreciated that modifications and variations of the disclosed embodiments are covered by the above teachings and within the purview of the appended claims without departing from the spirit and intended scope of the invention.

Abbreviations

| Abbreviation | Description |
| --- | --- |
| DBD | Database Definition |
| DCLGEN | Declaration Generator |
| DDL | Data Definition Language |
| DL/I | Data Language/One or Data Language/Interface |
| DDM | Data Definition Model |
| IMS | Information Management System |
| JCL | Job Control Language |
| PCB | Program Communication Block |
| RDBMS | Relational Database Management System |
| SQL | Structured Query Language |
| SSA | Segment Search Argument |
| IDMS | Integrated Database Management System |
| IDD | Integrated Data Dictionary |

What is claimed is:

1. A system configured for migration of a legacy datastore, the system comprising:
a processor; and
a memory storing a program for execution by the processor, the program including instructions for
converting legacy datastore information from a legacy datastore to target database system information, wherein the target database system information belongs to a target database management system,
mapping a legacy datastore call to at least one data manipulation language (DML) statement, the legacy datastore call requesting the legacy datastore information, and
generating scripting language for the target database management system using the at least one DML statement; and
wherein the converting of the legacy datastore information includes,
reading the legacy datastore information from a corresponding copybook from the legacy datastore, wherein the legacy datastore information is to be migrated from a source database management system, and
if a predetermined number of OCCURS clauses are present in the legacy datastore information,
creating a separate child table, and
adding a primary key of a parent table as a foreign key in the separate child table and a sequence number field as a key in the separate child table;
or
if a predetermined number of REDEFINES clauses are present in the legacy datastore information,
creating a separate child table for each REDEFINES clause of the predetermined number of REDEFINES clauses, and
adding a primary key of a parent table as a foreign key in the separate child table and a sequence number field as a key in the separate child table of said each REDEFINES clause of the predetermined number of REDEFINES clauses;
or
if a predetermined number of multi-value (MU) or periodic group (PE) clauses are present in the legacy datastore information,
creating a separate child table, and
adding a primary key of a parent table as a foreign key in the separate child table and a sequence number field as a key in the separate child table;

or
wherein the generating of the scripting language for the target database management system using the at least one DML statement further includes
identifying steps containing legacy datastore program by reading at least one source statement in source scripting language, and
replacing steps containing the legacy datastore program with skeleton data;
or
identifying legacy datastore programming steps in a scripting language (SL) procedure, and replacing the legacy datastore programming steps that are identified with a terminal monitor program in the SL procedure.

2. The system of claim 1, wherein the target database management system is a NoSQL database.

3. The system of claim 1, wherein the target database management system is a relational database management system (RDBMS) or a non-relational database management system.

4. The system of claim 1, wherein the converting of the legacy datastore information includes,
if said predetermined number of OCCURS clauses are present in the legacy datastore information,
said creating said separate child table, and
said adding said primary key of said parent table as said foreign key in the separate child table and said sequence number field as said key in the separate child table.

5. The system of claim 1, wherein the converting of the legacy datastore information includes,
if said predetermined number of REDEFINES clauses are present in the legacy datastore information,
said creating said separate child table for each REDEFINES clause of the predetermined number of REDEFINES clauses, and
said adding said primary key of said parent table as said foreign key in the separate child table and sequence number field as said key in the separate child table of said each REDEFINES clause of the predetermined number of REDEFINES clauses.

6. The system of claim 1, wherein the mapping of the legacy datastore call to the at least one DML statement includes
retrieving a qualified segment search argument (SSA), wherein the qualified SSA specifies the legacy datastore information, and wherein the legacy datastore information is a segment definition, and
constructing at least one DML statement from command code in the qualified SSA.

7. The system of claim 1, wherein
the generating of the scripting language for the target database management system using the at least one DML statement includes replacing the legacy datastore call with the at least one DML statement, and
the at least one DML statement is equivalent to the legacy datastore call.

8. The system of claim 1, wherein the generating of the scripting language for the target database management system using the at least one DML statement further includes
said identifying steps containing said legacy datastore program by reading said at least one source statement in said source scripting language,
said replacing steps containing the legacy datastore program with said skeleton data.

9. The system of claim 1, wherein the generating of the scripting language for the target database management system using the at least one DML statement includes said
identifying legacy datastore programming steps in said scripting language (SL) procedure, and
said replacing the legacy datastore programming steps that are identified with said terminal monitor program in the SL procedure.

10. The system of claim 1, wherein the converting of the legacy datastore information includes,
if said predetermined number of multi-value (MU) or periodic group (PE) clauses are present in the legacy datastore information,
said creating said separate child table, and
said adding said primary key of said parent table as said foreign key in the separate child table and said sequence number field as said key in the separate child table.

11. The system of claim 1, wherein the mapping of the legacy datastore call to the at least one DML statement includes
reading an integrated data dictionary (IDD) file to obtain a record structure, and
identifying at least one selected from relationships, keys and data types based on the record structure.

12. The system of claim 1, wherein
the generating of the scripting language for the target database management system using the at least one DML statement includes generating a data extraction program that extracts the legacy datastore information from the legacy datastore, and
the scripting language runs the data extraction program and uploads the legacy datastore information into the target database management system.

13. The system of claim 1, wherein the instructions further include at least one selected from storing in an in-memory database or using an in-memory data grid, using database parallel execution framework or parallel processing framework, and storing data in a cache.

14. A method of migration of a legacy datastore, the method comprising:
converting legacy datastore information from the legacy datastore to target database system information, wherein the target database system information belongs to a target database management system,
mapping a legacy datastore call to at least one data manipulation language (DML) statement, the legacy datastore call requesting the legacy datastore information, and
generating scripting language for the target database management system using the at least one DML statement;
wherein the converting of the legacy datastore information includes,
reading the legacy datastore information from a corresponding copybook from the legacy datastore, wherein the legacy datastore information is to be migrated from a source database management system, and
if a predetermined number of OCCURS clauses are present in the legacy datastore information,
creating a separate child table, and
adding a primary key of a parent table as a foreign key in the separate child table and a sequence number field as a key in the separate child table;

or
if a predetermined number of REDEFINES clauses are present in the legacy datastore information,
creating a separate child table for each REDEFINES clause of the predetermined number of REDEFINES clauses, and
adding a primary key of a parent table as a foreign key in the separate child table and a sequence number field as a key in the separate child table of said each REDEFINES clause of the predetermined number of REDEFINES clauses;
or
if a predetermined number of multi-value (MU) or periodic group (PE) clauses are present in the legacy datastore information,
creating a separate child table, and
adding a primary key of a parent table as a foreign key in the separate child table and a sequence number field as a key in the separate child table;
or
wherein the generating of the scripting language for the target database management system using the at least one DML statement further includes
identifying steps containing legacy datastore program by reading at least one source statement in source scripting language, and replacing steps containing the legacy datastore program with skeleton data;
or
identifying legacy datastore programming steps in a scripting language (SL) procedure, and replacing the legacy datastore programming steps that are identified with a terminal monitor program in the SL procedure.

15. The method of claim 14, wherein the target database management system is a NoSQL database.

16. The method of claim 14, wherein the target database management system is a relational database management system (RDBMS) or a non-relational database management system.

17. The method of claim 14, wherein the converting of the legacy datastore information includes,
if said predetermined number of OCCURS clauses are present in the legacy datastore information,
said creating said separate child table, and
said adding said primary key of said parent table as said foreign key in the separate child table and said sequence number field as said key in the separate child table.

18. The method of claim 14, wherein the converting of the legacy datastore information includes,
if said predetermined number of REDEFINES clauses are present in the legacy datastore information,
said creating said separate child table for each REDEFINES clause of the predetermined number of REDEFINES clauses, and
said adding said primary key of said parent table as said foreign key in the separate child table and said sequence number field as said key in the separate child table of said each REDEFINES clause of the predetermined number of REDEFINES clauses.

19. The method of claim 14, wherein the mapping of the legacy datastore call to the at least one DML statement includes
retrieving a qualified segment search argument (SSA), wherein the qualified SSA specifies the legacy datastore information, and wherein the legacy datastore information is a segment definition, and
constructing at least one DML statement from command code in the qualified SSA.

20. The method of claim 14, wherein
the generating of the scripting language for the target database management system using the at least one DML statement includes replacing the legacy datastore call with the at least one DML statement, and
the at least one DML statement is equivalent to the legacy datastore call.

21. The method of claim 14, wherein the generating of the scripting language for the target database management system using the at least one DML statement further includes
said identifying steps containing said legacy datastore program by reading said at least one source statement in said source scripting language,
said replacing steps containing the legacy datastore program with said skeleton data.

22. The method of claim 14, wherein the generating of the scripting language for the target database management system using the at least one DML statement includes said identifying legacy datastore programming steps in said scripting language (SL) procedure, and said replacing the legacy datastore programming steps that are identified with said terminal monitor program in the SL procedure.

23. The method of claim 14, wherein the converting of the legacy datastore information includes,
if said predetermined number of multi-value (MU) or periodic group (PE) clauses are present in the legacy datastore information,
said creating said separate child table, and
said adding said primary key of said parent table as said foreign key in the separate child table and said sequence number field as said key in the separate child table.

24. The method of claim 14, wherein the mapping of the legacy datastore call to the at least one DML statement includes
reading an integrated data dictionary (IDD) file to obtain a record structure, and
identifying at least one selected from relationships, keys and data types based on the record structure.

25. The method of claim 14, wherein
the generating of the scripting language for the target database management system using the at least one DML statement includes generating a data extraction program that extracts the legacy datastore information from the legacy datastore, and
the scripting language runs the data extraction program and uploads the legacy datastore information into the target database management system.

26. The method of claim 14, further comprising storing in an in-memory database or using an in-memory data grid, using database parallel execution framework or parallel processing framework, and storing data in a cache.

27. A non-transitory computer readable medium having instructions embodied thereon that, when executed by a processor, cause the processor to perform operations comprising:
converting legacy datastore information from a legacy datastore to target database system information, wherein the target database system information belongs to a target database management system,
mapping a legacy datastore call to at least one data manipulation language (DML) statement, the legacy datastore call requesting the legacy datastore information, and generating scripting language for the target database management system using the at least one DML, statement;

wherein the converting of the legacy datastore information includes, reading the legacy datastore information from a corresponding copybook from the legacy datastore, wherein the legacy datastore information is to be migrated from a source database management system, and if a predetermined number of OCCURS clauses are present in the legacy datastore information, creating a separate child table, and adding a primary key of a parent table as a foreign key in the separate child table and a sequence number field as a key in the separate child table;

or if a predetermined number of REDEFINES clauses are present in the legacy datastore information, creating a separate child table for each REDEFINES clause of the predetermined number of REDEFINES clauses, and adding a primary key of a parent table as a foreign key in the separate child table and a sequence number field as a key in the separate child table of said each REDEFINES clause of the predetermined number of REDEFINES clauses;

or if a predetermined number of multi-value (MU) or periodic group (PE) clauses are present in the legacy datastore information, creating a separate child table, and adding a primary key of a parent table as a foreign key in the separate child table and a sequence number field as a key in the separate child table;

or wherein the generating of the scripting language for the target database management system using the at least one DML statement further includes identifying steps containing legacy datastore program by reading at least one source statement in source scripting language, and replacing steps containing the legacy datastore program with skeleton data;

or identifying legacy datastore programming steps in a scripting language (SL) procedure, and replacing the legacy datastore programming steps that are identified with a terminal monitor program in the SL procedure.

28. The non-transitory computer readable medium of claim 27, wherein the target database management system is a NoSQL database.

29. The non-transitory computer readable medium of claim 27, wherein the target database management system is a relational database management system (RDBMS) or a non-relational database management system.

30. The non-transitory computer readable medium of claim 27, wherein the converting of the legacy datastore information includes, if said predetermined number of OCCURS clauses are present in the legacy datastore information, said creating said separate child table, and said adding said primary key of said parent table as said foreign key in the separate child table and said sequence number field as said key in the separate child table, and if said predetermined number of REDEFINES clauses are present in the legacy datastore information, said creating said separate child table for each REDEFINES clause of the predetermined number of REDEFINES clauses, and said adding said primary key of said parent table as said foreign key in the separate child table and said sequence number field as said key in the separate child table of said each REDEFINES clause of the predetermined number of REDEFINES clauses.

31. The non-transitory computer readable medium of claim 27, wherein the mapping of the legacy datastore call to the at least one DML statement includes retrieving a qualified segment search argument (SSA), wherein the qualified SSA specifies the legacy datastore information, and wherein the legacy datastore information is a segment definition, and constructing the at least one DML statement from command code in the qualified SSA.

32. The non-transitory computer readable medium of claim 27, wherein the generating of the scripting language for the target database management system using the at least one DML statement includes replacing the legacy datastore call with the at least one DML statement, and the at least one DML statement is equivalent to the legacy datastore call.

33. The non-transitory computer readable medium of claim 27, wherein the generating of the scripting language for the target database management system using the at least one DML statement further includes said identifying steps containing said legacy datastore program by reading said at least one source statement in said source scripting language, said replacing steps containing the legacy datastore program with said skeleton data.

34. The non-transitory computer readable medium of claim 27, wherein the generating of the scripting language for the target database management system using the at least one DML statement includes said identifying said legacy datastore programming steps in said scripting language (SL) procedure, and replacing the legacy datastore programming steps that are identified with said terminal monitor program in the SL procedure.

35. The non-transitory computer readable medium of claim 27, wherein the converting of the legacy datastore information includes, if said predetermined number of multi-value (MU) or periodic group (PE) clauses are present in the legacy datastore information, said creating said separate child table, and said adding said primary key of said parent table as said foreign key in the separate child table and said sequence number field as said key in the separate child table.

36. The non-transitory computer readable medium of claim 27, wherein the mapping of the legacy datastore call to the at least one DML statement includes reading an integrated data dictionary (IDD) file to obtain a record structure, and identifying at least one selected from relationships, keys and data types based on the record structure.

37. The non-transitory computer readable medium of claim 27, wherein the generating of the scripting language for the target database management system using the at least one DML statement includes generating a data extraction program that extracts the legacy datastore information from the legacy datastore, and the scripting language runs the data extraction program and uploads the legacy datastore information into the target database management system.

38. The non-transitory computer readable medium of claim 27, wherein the instructions further include at least one selected from storing in an in-memory database or using an in-memory data grid, using database parallel execution framework or parallel processing framework, and storing data in a cache.

* * * * *